United States Patent [19]

Yokogawa

[11] Patent Number: 5,225,981

[45] Date of Patent: Jul. 6, 1993

[54] LANGUAGE ANALYZER FOR MORPHEMICALLY AND SYNTACTICALLY ANALYZING NATURAL LANGUAGES BY USING BLOCK ANALYSIS AND COMPOSITE MORPHEMES

[75] Inventor: Toshihiko Yokogawa, Yokohama, Japan

[73] Assignee: Ricoh Company, Ltd., Tokyo, Japan

[21] Appl. No.: 714,990

[22] Filed: Jun. 16, 1991

Related U.S. Application Data

[63] Continuation of Ser. No. 104,423, Oct. 5, 1987, abandoned.

[30] Foreign Application Priority Data

| Oct. 3, 1986 | [JP] | Japan | 61-234327 |
| Oct. 3, 1986 | [JP] | Japan | 61-234328 |
| Oct. 11, 1986 | [JP] | Japan | 61-240215 |
| Oct. 15, 1986 | [JP] | Japan | 61-243197 |
| Oct. 17, 1986 | [JP] | Japan | 61-245196 |
| Oct. 21, 1986 | [JP] | Japan | 61-248431 |
| Oct. 24, 1986 | [JP] | Japan | 61-251916 |
| Oct. 27, 1986 | [JP] | Japan | 61-253763 |
| Oct. 27, 1986 | [JP] | Japan | 61-255512 |

[51] Int. Cl.$^5$ ............................................. G06F 15/38
[52] U.S. Cl. .................................................... 364/419
[58] Field of Search ......................................... 364/419

[56] References Cited

U.S. PATENT DOCUMENTS

| 4,775,956 | 10/1988 | Kaji et al. ....................... | 364/419 |
| 4,962,452 | 10/1990 | Nogami et al. ................. | 364/419 |

FOREIGN PATENT DOCUMENTS

| 0168814 | 1/1986 | European Pat. Off. . |
| 0175357 | 3/1986 | European Pat. Off. . |
| 0180888 | 5/1986 | European Pat. Off. . |
| 0200359 | 10/1955 | Japan . |

OTHER PUBLICATIONS

Fujitsu Scientific & Technical Journal: vol. 21, nr. 3, Jul. 1985; pp. 317-329; entitled "ATLAS: Automatic Translation System"; H. Uchida et al.

Patent Abstracts of Japan; vol. 9; nr. 86(P-349([1809], Apr. 16, 1985; & JP-A-59 214 979 (Hitachi) Apr. 12, 1984.

*Primary Examiner*—Gail O. Hayes
*Attorney, Agent, or Firm*—Oblon, Spivak, McClelland, Maier & Neustadt

[57] ABSTRACT

A language analyzer includes a dictionary having stored therein dictionary data including morpheme data for words, compound words and phrases, and a parsing analyzer for conducting morphological analysis for an inputted sentence by referring to the dictionary. The dictionary contain data for the coupling degree indicating the coupling degree between each of words constituting the compound words or phrases and the parsing analyzer refers to the dictionary for the respective words contained in said inputted sentence and, when a plurality of dictionary data are retrieved for one word in combination with other words, selects the combination of words of a higher coupling degree by referring to the data for said coupling degree.

22 Claims, 79 Drawing Sheets

Fig.3

| Entry | Highest preference flag | Arrangement of grammatical information, etc. | | |
|---|---|---|---|---|
| | | Part of speech | Inflection | Others |
| ┊ | ┊ | | | |
| get | 0 | verb | root | |
| get ⌴ up | 1 | verb | root | |
| ┊ | ┊ | | | |
| house | 0 | noun / verb | singular / root | |
| ┊ | ┊ | | | |
| up | 0 | adverb | root | |
| up ⌴ to | 1 | preposition | no change | |
| ┊ | ┊ | | | |
| white | 0 | adjective | root | |
| white ⌴ house | 0 | noun | singular | |
| whiter | 0 | adjective | comparative | |
| ┊ | ┊ | | | |

1018

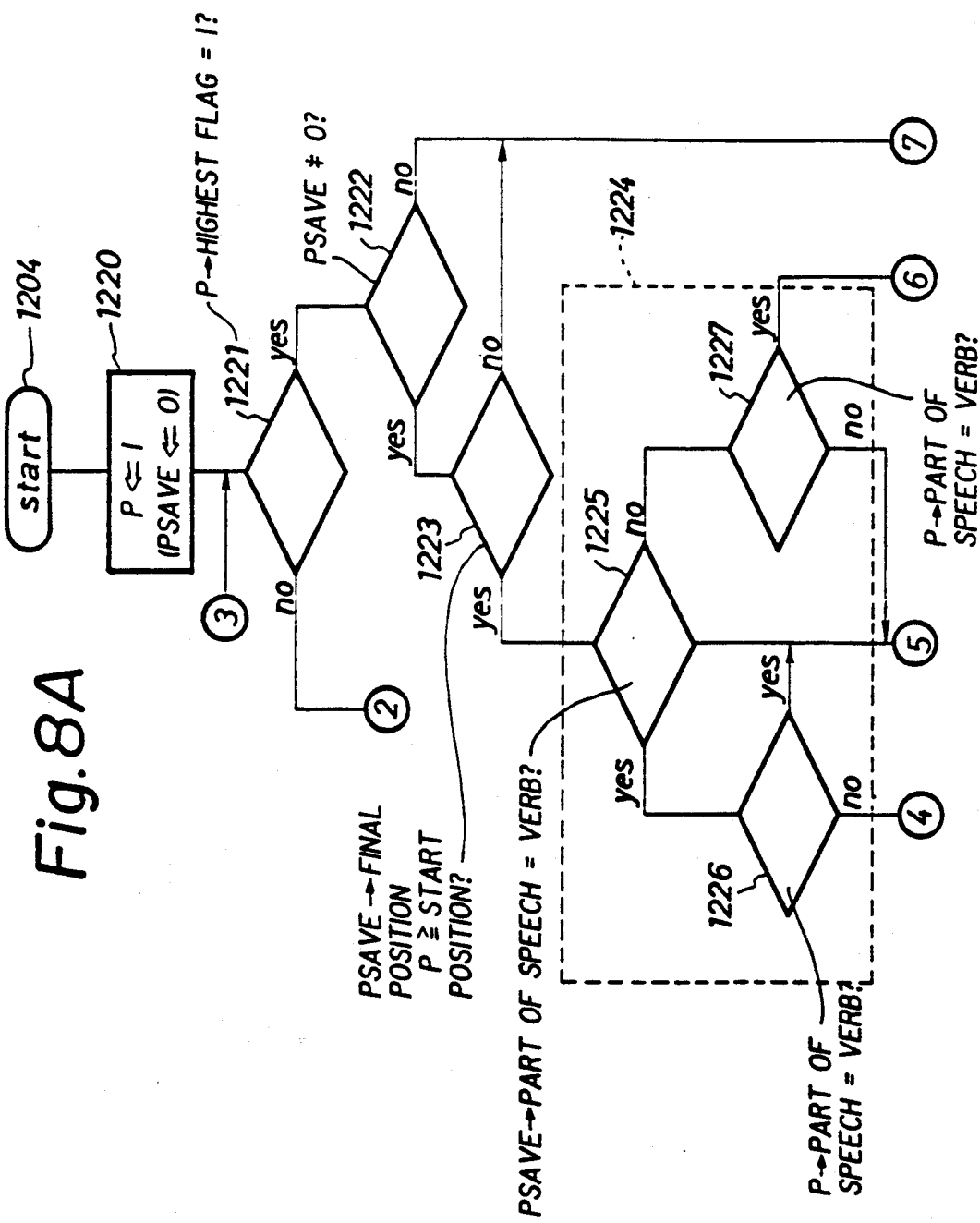

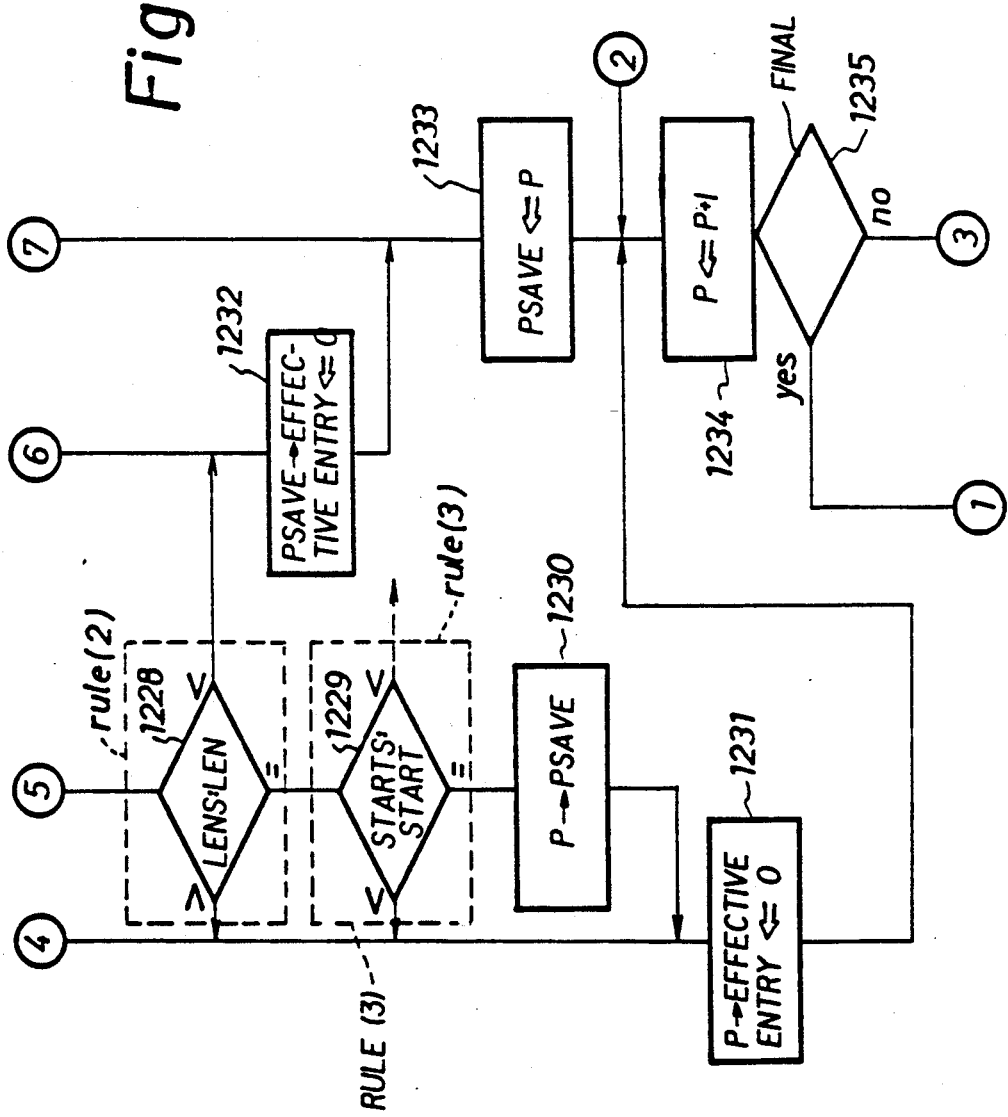

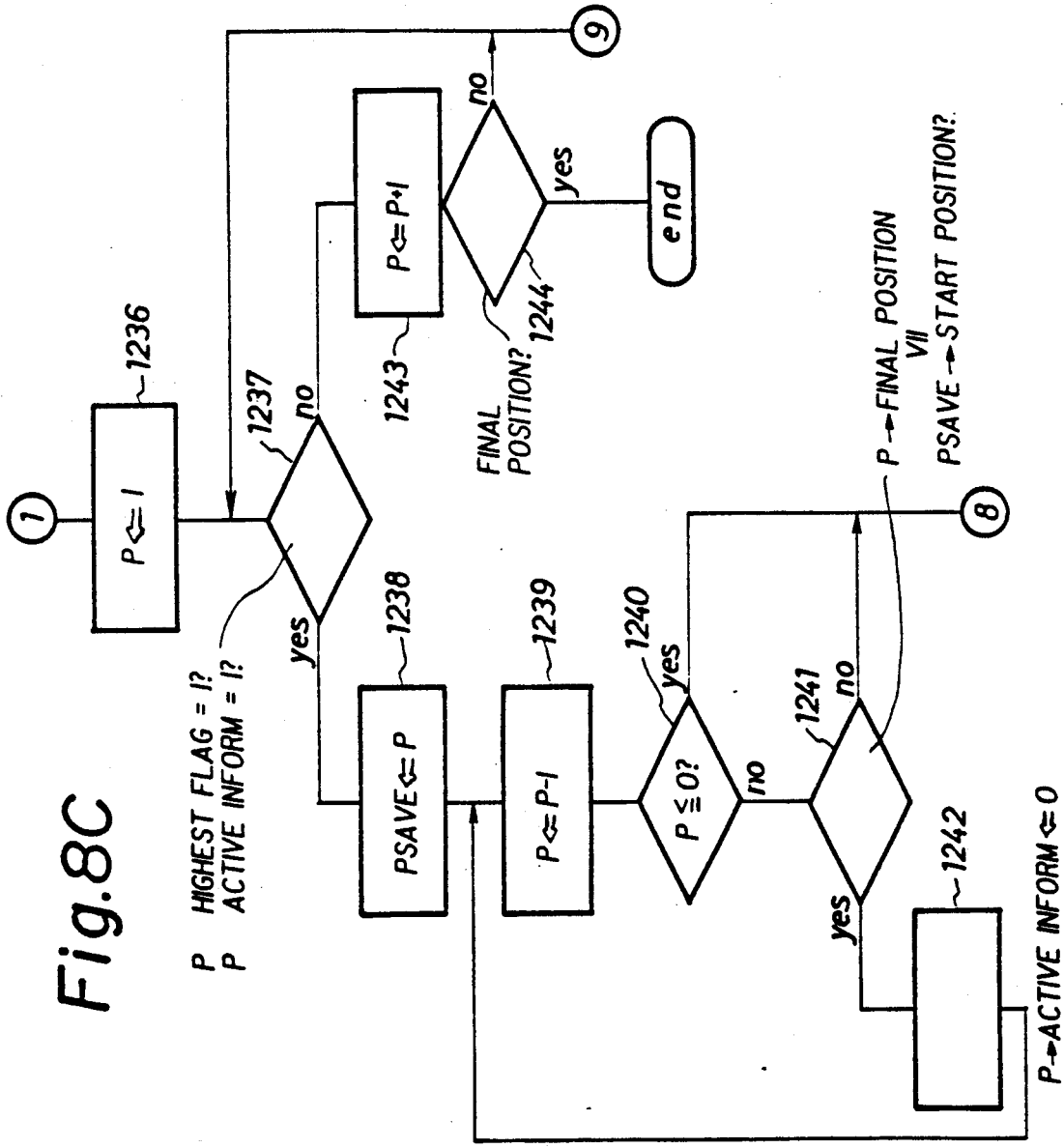

Fig. 9

| Start position | End position | Entry | Highest preference flag | Grammatical information, etc. ||| Active information |
|---|---|---|---|---|---|---|---|
| | | | | Part of speech | Inflection | Others | |
| 1 | 1 | I | 0 | pronoun | 1. singular | ----- | 1 |
| 3 | 6 | will | 0 | auxiliary verb | root | ----- | 1 |
| 8 | 10 | get | 0 | verb | root | ----- | 1 |
| 8 | 13 | get ⌴ up | 1 | verb | root | ----- | 1 |
| 12 | 13 | up | 0 | adverb | root | | 1 |
| 12 | 16 | up ⌴ to | 1 | preposition | no change | | 1 |
| 15 | 16 | to | 0 | preposition | no change | | 1 |
| 18 | 19 | go | 0 | | | | 1 |
| 21 | 22 | to | 0 | | | | 1 |
| 24 | 24 | a | 0 | | | | 1 |
| 26 | 30 | white | 0 | | | | 1 |
| 26 | 36 | white⌴house | 0 | | | | 1 |
| 32 | 36 | house | 0 | | | | 1 |

| Start position | End position | Entry | Highest preference flag | Grammatical information, etc. ||| Active information |
|---|---|---|---|---|---|---|---|
| | | | | Part of speech | Inflection | Others | |
| 1 | 1 | I | 0 | pronoun | 1. singular | | 1 |
| 3 | 6 | will | 0 | ¦ | ¦ | | 1 |
| 8 | 10 | get | 0 | ¦ | ¦ | | 0 |
| 8 | 13 | get ⌴ up | 1 | ¦ | ¦ | | 1 |
| 12 | 13 | up | 0 | ¦ | ¦ | | 0 |
| 12 | 16 | up ⌴ to | 1 | ¦ | ¦ | | 0 |
| 15 | 16 | to | 0 | | | | 1 |
| ¦ | ¦ | ¦ | ¦ | | | | ¦ |
| 26 | 30 | white | 0 | | | | 1 |
| 26 | 36 | white ⌴ house | 0 | | | | 1 |
| 32 | 36 | house | 0 | | | | 1 |

| Entry | Grammatical information | |
|---|---|---|
| | Part of speech | ------- |
| | | |

Fig.13

| Fundamental unit entry |
|---|
| Hz |
| \| |
| k |
| \| |
| m |
| \| |
| \| |
| s |

Fig.14

| Entry | Grammatical information | |
|---|---|---|
| | Part of speech | ------- |
| km | unit | |
| kmH | not registered word | |

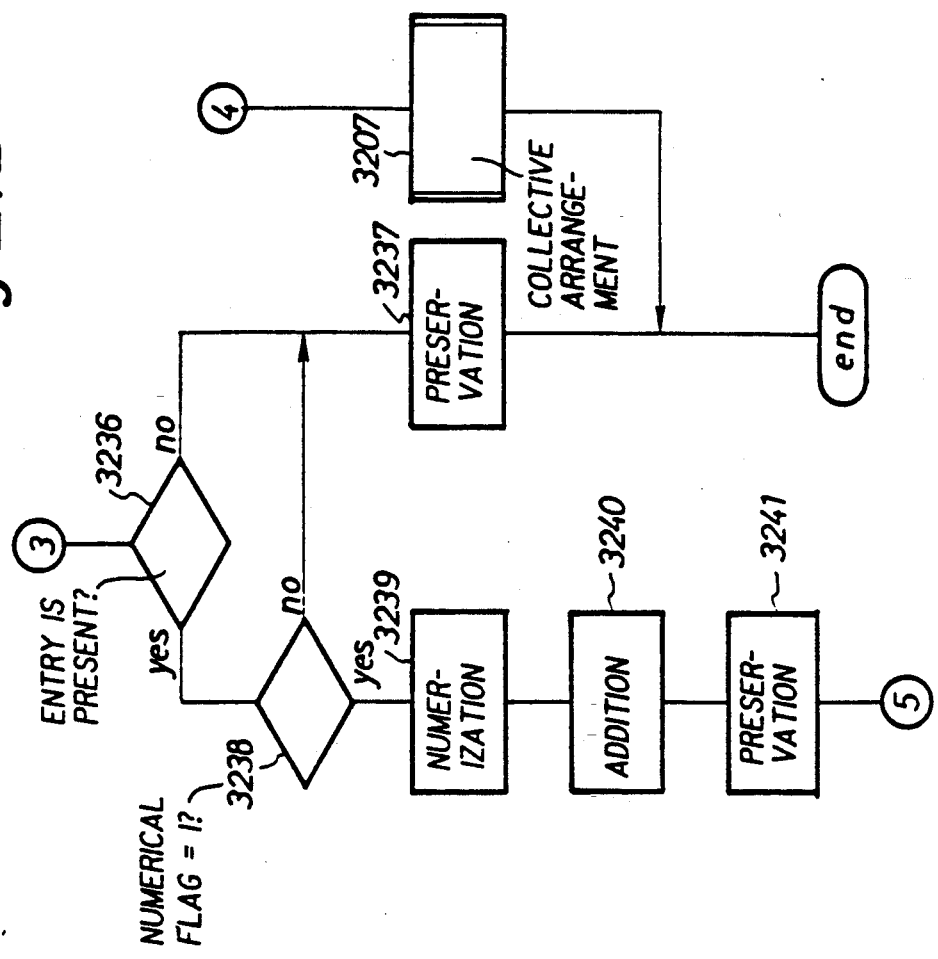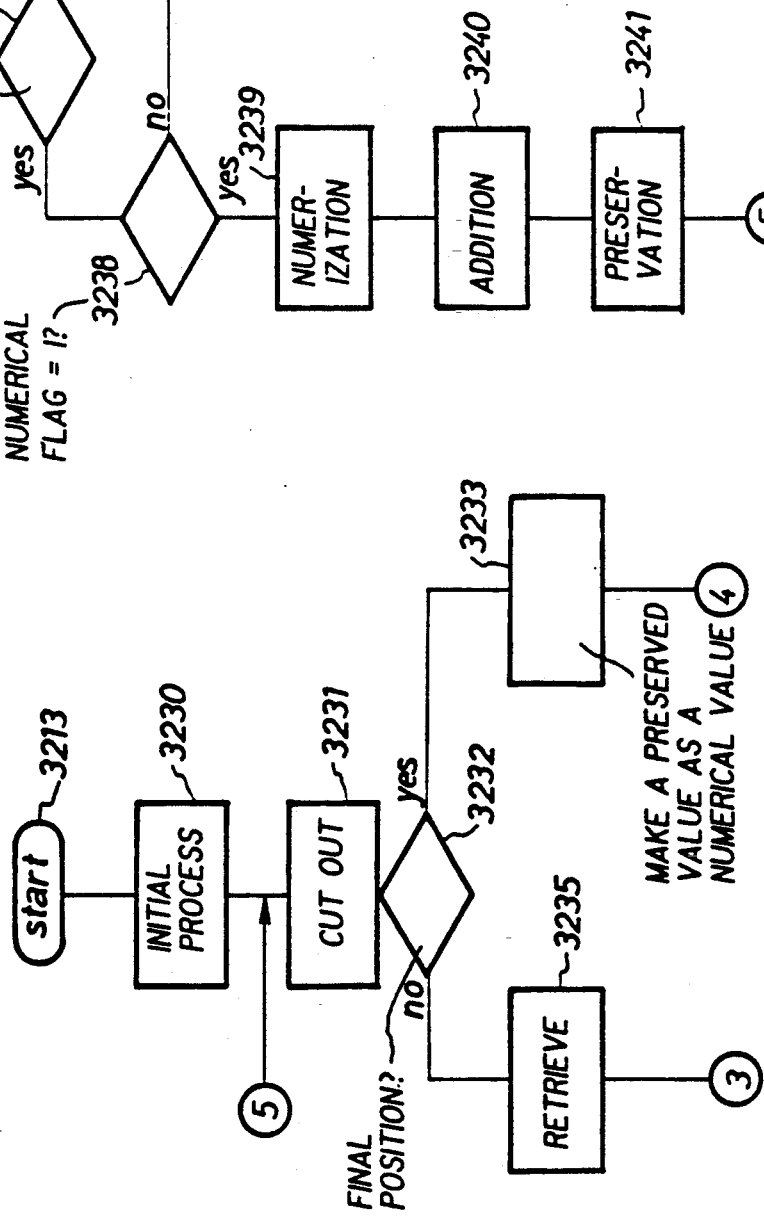

| entry | part of speech | numerical flag | numerical value | ---- |
|---|---|---|---|---|
| : | : | : | : | |
| thousand | noun | 1 | 1000 | --- |
| thousands | noun | 1 | 1000 | --- |
| : | : | : | : | |
| thread | noun | 0 | — | --- |
| : | : | : | : | |
| twenty | noun | 1 | 20 | --- |
| : | : | : | : | |
| two | noun | 1 | 2 | --- |
| : | : | : | : | |

Fig.25

```
1 2 3  4 5 6 7 8 9 10
To him two thousand and twenty-two -----
```

| start position | end position | entry | part of speech | numerical value | ---- |
|---|---|---|---|---|---|
| 1 | 2 | to | --- | – | |
| 4 | 6 | him | pronoun | – | --- |
| 8 | 10 | two | numerical value | 2 | --- |

| start position | end position | entry | part of speech | numerical value | ---- |
|---|---|---|---|---|---|
| 8 | 20 | two thousand | numerical value | 2000 | --- |

Fig.26C

| start position | end position | entry | part of speech | numerical value | ---- |
|---|---|---|---|---|---|
| ⋮ | ⋮ | ⋮ | ⋮ | ⋮ | ⋮ |
| 8 | 20 | two thousand | numerical value | 2000 | --- |
| 21 | 23 | and | conjunctive | - | --- |

| start position | end position | entry | part of speech | numerical value | ---- |
|---|---|---|---|---|---|
| ⋮ | ⋮ | ⋮ | ⋮ | ⋮ | ⋮ |
| 8 | 34 | two thousand and twenty-two | numerical value | 2022 | |
| ⋮ | ⋮ | ⋮ | ⋮ | ⋮ | ⋮ |

--- 789 10 11 12 ---
You said $ 1,000.5 thousand was ---

Fig.28

| currency symbol table | digit notation symbol table | decimal point symbol table |
|---|---|---|
| $ | , | . |
| £ | | |
| ¥ | | |
| : | | |

| start position | end position | entry | part of speech | numerical value | ---- |
|---|---|---|---|---|---|
| ⋮ | ⋮ | ⋮ | ⋮ | ⋮ | |
| 10 | 10 | $ | currency symbol | — | |

| start position | end position | entry | part of speech | numerical value | ---- |
|---|---|---|---|---|---|
| ⋮ | ⋮ | ⋮ | ⋮ | ⋮ | ⋮ |
| 10 | 10 | $ | currency symbol | — | --- |
| 11 | 17 | 1,000.5 | numerical value | 1,000.5 | --- |

| start position | end position | entry | part of speech | numerical value | ---- |
|---|---|---|---|---|---|
| ⋮ | ⋮ | ⋮ | ⋮ | ⋮ | ⋮ |
| 5 | 8 | said | verb | — | --- |
| 10 | 10 | $ | currency symbol | — | --- |
| 11 | 26 | 1,000.5 thousand | value | 1000500 | --- |
| 28 | 29 | was | verb | — | --- |

| start position | end position | entry | part of speech | numerical value | ---- |
|---|---|---|---|---|---|
| ⋮ | ⋮ | ⋮ | ⋮ | ⋮ | ⋮ |
| 5 | 8 | said | verb | — | --- |
| 10 | 26 | $ 1000500 | noun | 1000500 | --- |
| 28 | 29 | was | verb | — | --- |
| ⋮ | ⋮ | ⋮ | ⋮ | ⋮ | |

Fig.31

| entry | part of speech | nature information |
|---|---|---|
| City | proper noun | place/group |
| Mr. | proper noun | person |
| Station | proper noun | place/group |
| Walter | proper noun | person/place/group |

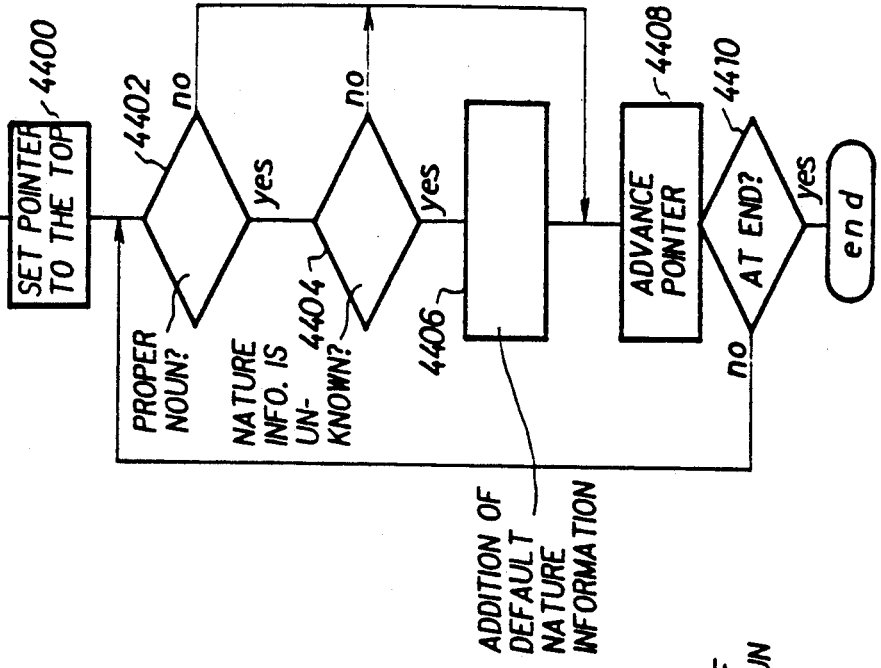
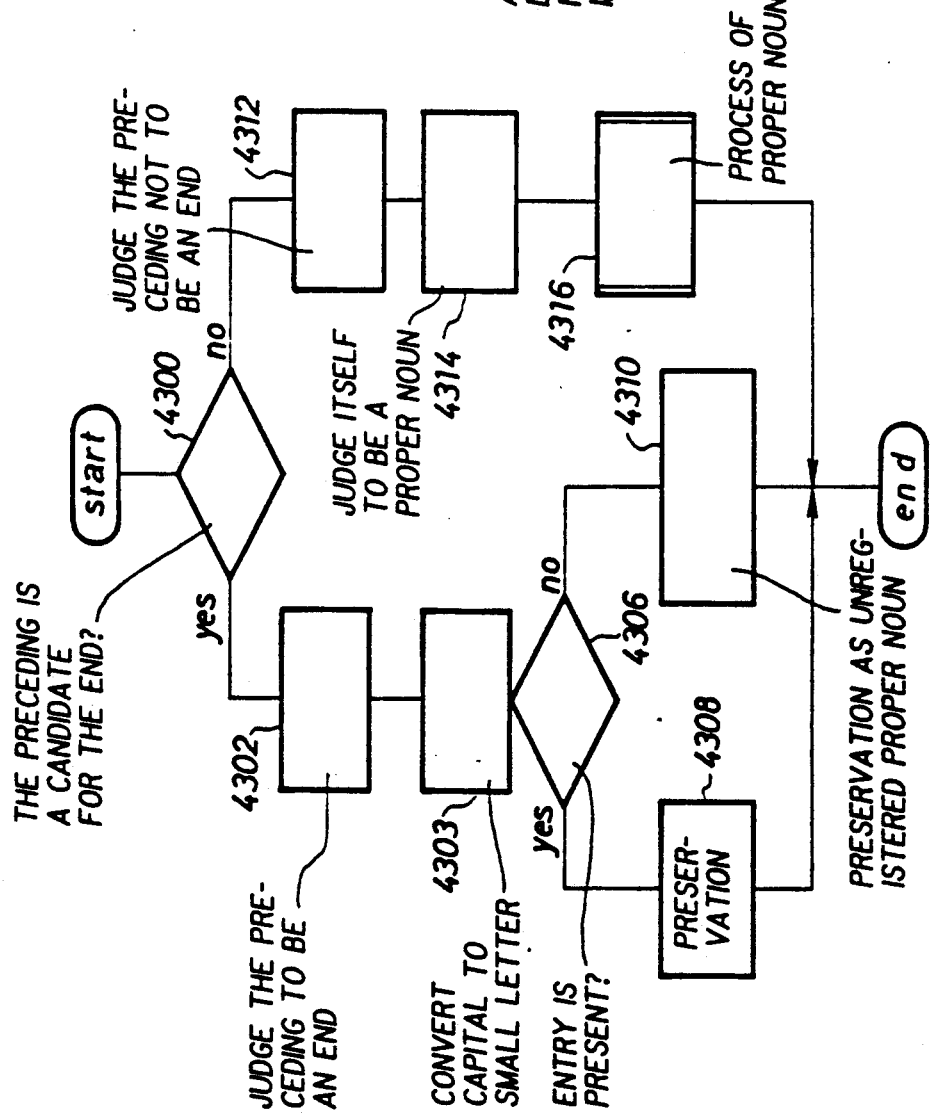

Fig.36

| start of position | end of position | entry | part of speech | nature information | |
|---|---|---|---|---|---|
| 1 | 2 | in | preposition | - | --- |
| 4 | 8 | Tokyo | proper noun | Unknown | |

⇓

| 1 | 2 | in | preposition | --- | --- |
|---|---|---|---|---|---|
| 4 | 16 | Tokyo Station | proper noun | place/group | |

⇓

| ⋮ | ⋮ | ⋮ | ⋮ | ⋮ | |
|---|---|---|---|---|---|
| 4 | 16 | Tokyo Station | proper noun | place/group | |
| 18 | 20 | Mr. | proper noun | person | |

⇓

| ⋮ | ⋮ | ⋮ | ⋮ | ⋮ | |
|---|---|---|---|---|---|
| 4 | 16 | Tokyo Station | proper noun | place/group | |
| 18 | 27 | Mr.Walter | proper noun | person | |

⇓

| ⋮ | ⋮ | ⋮ | ⋮ | ⋮ | |
|---|---|---|---|---|---|
| 4 | 16 | Tokyo Station | proper noun | place/group | |
| 18 | 27 | Mr.Walter | proper noun | person | |
| 29 | 31 | met | verb | - | |
| 33 | 39 | Johnson | proper noun | Unknown | |

⇓

| ⋮ | ⋮ | ---- | ---- | ---- | |
|---|---|---|---|---|---|
| 4 | 16 | Tokyo Station | proper noun | place/group | |
| 18 | 27 | Mr.Walter | proper noun | person | |
| 29 | 31 | met | verb | ---- | |
| 33 | 39 | Johnson | proper noun | person/place/group | |

Fig.39

| Entry | Part of speech | Positional information | |
|---|---|---|---|
| Mr. | proper noun | 1 | |
| River | proper noun | 3 | |
| Station | proper noun | 2 | |
| Water | proper noun | 0 | |

| Start position | End position | Entry | Part of speech | Positional information | |
|---|---|---|---|---|---|
| 1 | 5 | along | pre-position | — | — |
| 7 | 9 | the | article | — | — |
| 11 | 16 | Sumida | proper noun | 0 | — |

| Start position | End position | Entry | Part of speech | Positional information | |
|---|---|---|---|---|---|
| 1 | 5 | along | pre-position | — | --- |
| 7 | 22 | the Sumida River | proper noun | 3 | --- |

| Start position | End position | Entry | Part of speech | Positional information | |
|---|---|---|---|---|---|
| 1 | 5 | along | pre-position | — | --- |
| 7 | 22 | the Sumida River | proper noun | 3 | --- |
| 24 | 27 | Paul | proper noun | 0 | |
| 29 | 31 | and | conjunctive | — | |

| Start position | End position | Entry | Part of speech | Positional information | |
|---|---|---|---|---|---|
| 1 | 5 | along | preposition | - | --- |
| 7 | 22 | the Sumida River | proper noun | 3 | --- |
| 24 | 27 | Paul | proper noun | 0 | |
| 29 | 31 | and | conjunctive | - | |
| 33 | 35 | Mr. | proper noun | 1 | |

| Start position | End position | Entry | Part of speech | Positional information | |
|---|---|---|---|---|---|
| ⋮ | ⋮ | ⋮ | ⋮ | ⋮ | |
| 29 | 31 | and | conjunctive | - | |
| 33 | 40 | Mr.Gold | proper noun | 1 | |

| Start position | End position | Entry | Part of speech | Positional information | |
|---|---|---|---|---|---|
| ⋮ | ⋮ | ⋮ | ⋮ | ⋮ | |
| 29 | 31 | and | conjunctive | - | |
| 33 | 46 | Mr.Gold Smith | proper noun | 1 | |
| 48 | 51 | went | verb | - | |

Fig.48

| Entry | part of speech | nature information | |
|---|---|---|---|
| ⋮ | | | |
| Company | proper noun | group | ... |
| ⋮ | ⋮ | ⋮ | |
| Mr. | proper noun | person | ... |
| ⋮ | ⋮ | ⋮ | |
| Station | proper noun | place | ... |
| ⋮ | ⋮ | ⋮ | |
| Walter | proper noun | Unknown | ... |
| ⋮ | ⋮ | ⋮ | |
| man | noun | person | ... |

Fig.52

| start position | end position | Entry | part of speech | nature information | |
|---|---|---|---|---|---|
| 1 | 2 | In | preposition | - | ... |
| 4 | 8 | Tokyo | proper noun | Unknown | ... |

⇩

| | | | | | |
|---|---|---|---|---|---|
| 1 | 2 | In | preposition | - | ... |
| 4 | 16 | Tokyo Station | proper noun | place | ... |

⇩

| | | | | | |
|---|---|---|---|---|---|
| 1 | 2 | In | preposition | - | ... |
| 4 | 16 | Tokyo Station | proper noun | place | ... |
| 8 | 20 | Mr. | proper noun | person | ... |

⇩

| | | | | | |
|---|---|---|---|---|---|
| ⋮ | ⋮ | ⋮ | ⋮ | ⋮ | |
| 4 | 16 | Tokyo Station | proper noun | place | |
| 18 | 27 | Mr. Walter | proper noun | person | |
| ⋮ | ⋮ | ⋮ | ⋮ | ⋮ | |

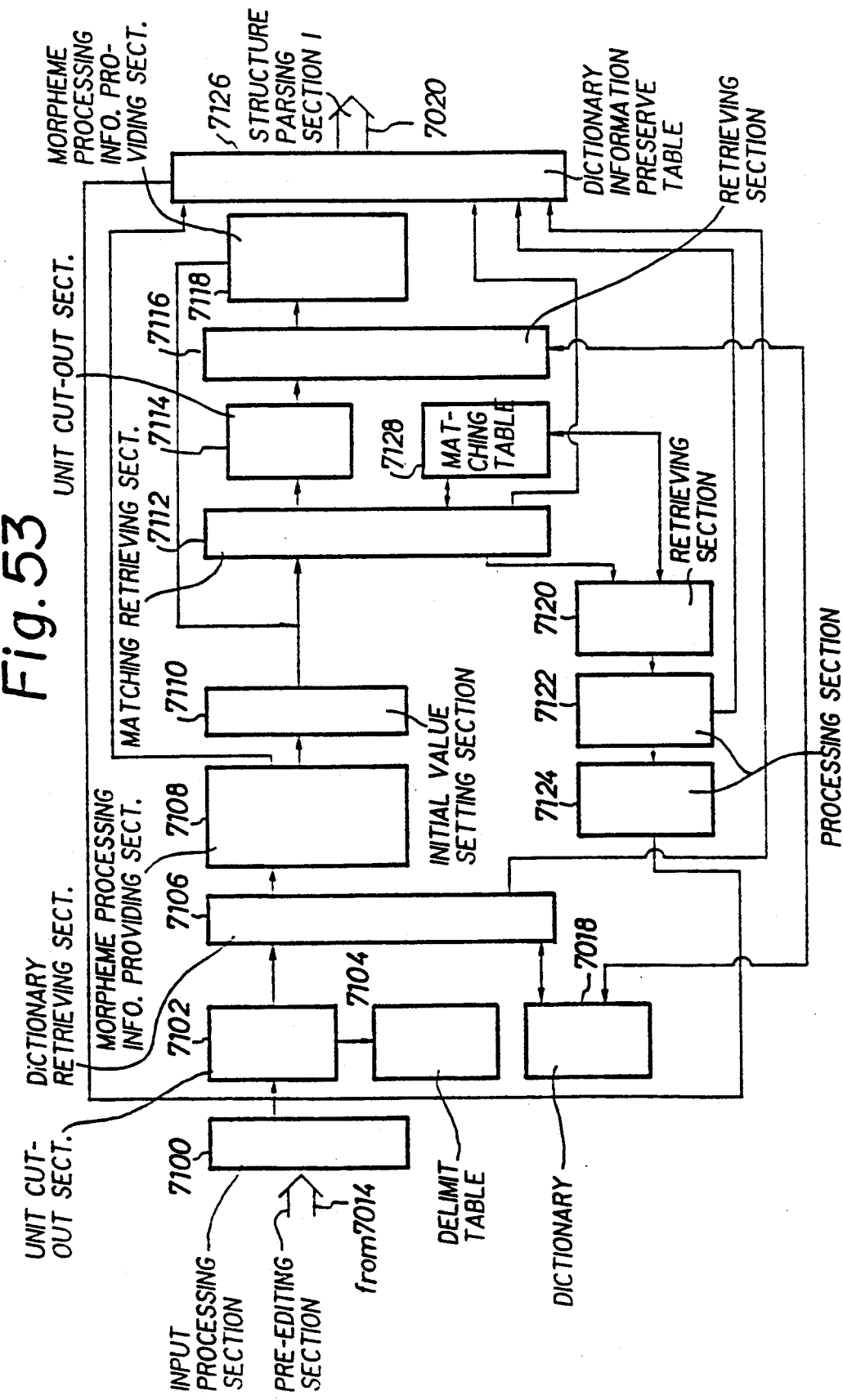

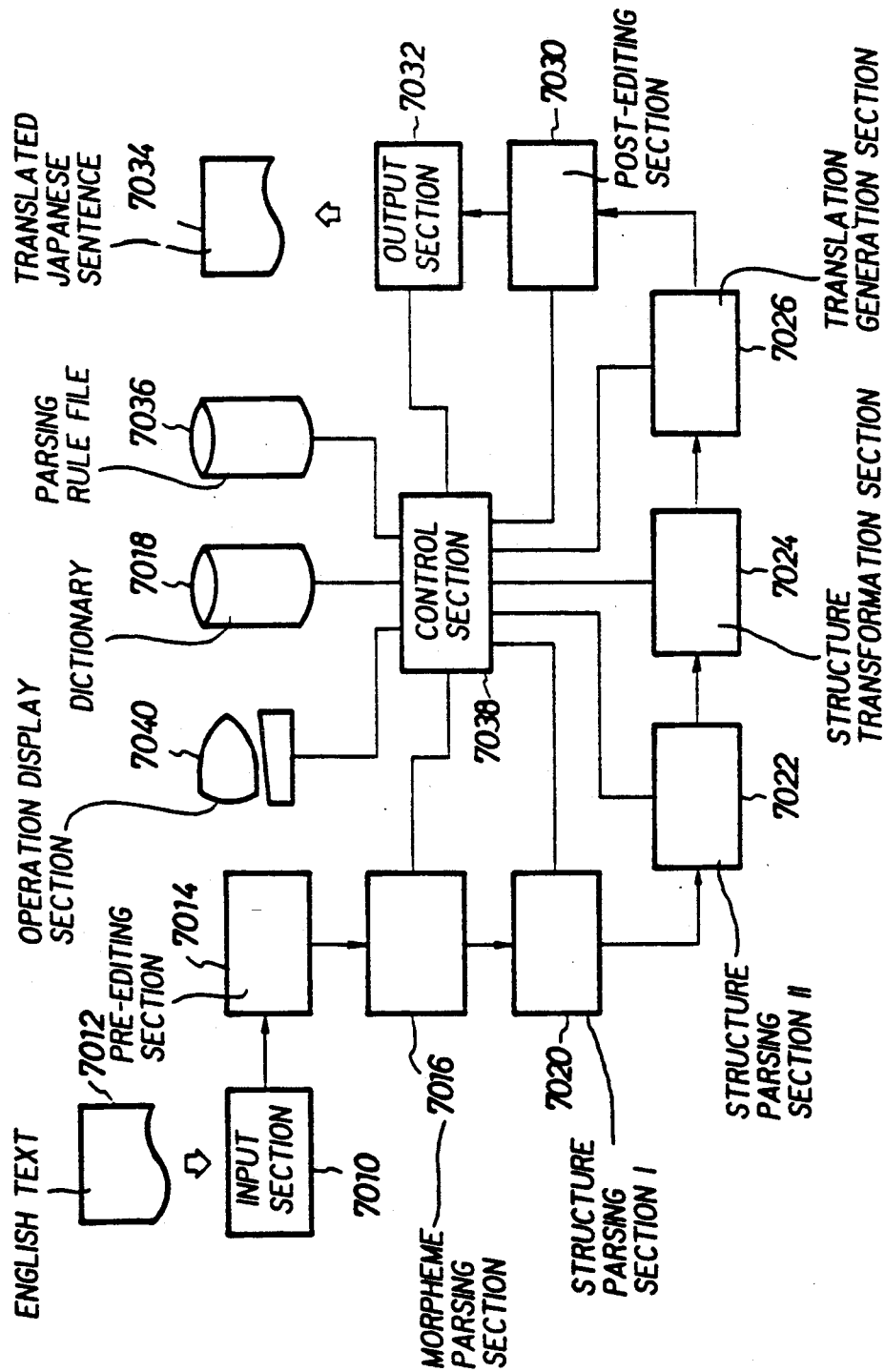

Fig.56

| | |
|---|---|
| ,numerical figure numerical figure | ⇒ year |
| numerical figure sequence | ⇒ cardinal number |
| ␣numerical figure:<br>        numerical figure ␣ | ⇒ time |

| Arrangement | | | Result of arrangement |
|---|---|---|---|
| 1 | time | time | → (time)(part of speech = noun/adverb...) |
| Ms2 | cardinal number | time | → (time)           " |
| 3 | " | month | → (month, day)       " |
| ⋮ | " | month, year | → (year, month, day) |
| Me: | " | month, year | (      "      ) |
| ⋮ | | | ⋮ |
| N | the ordinal number of month, year | | → (year, month, day) |

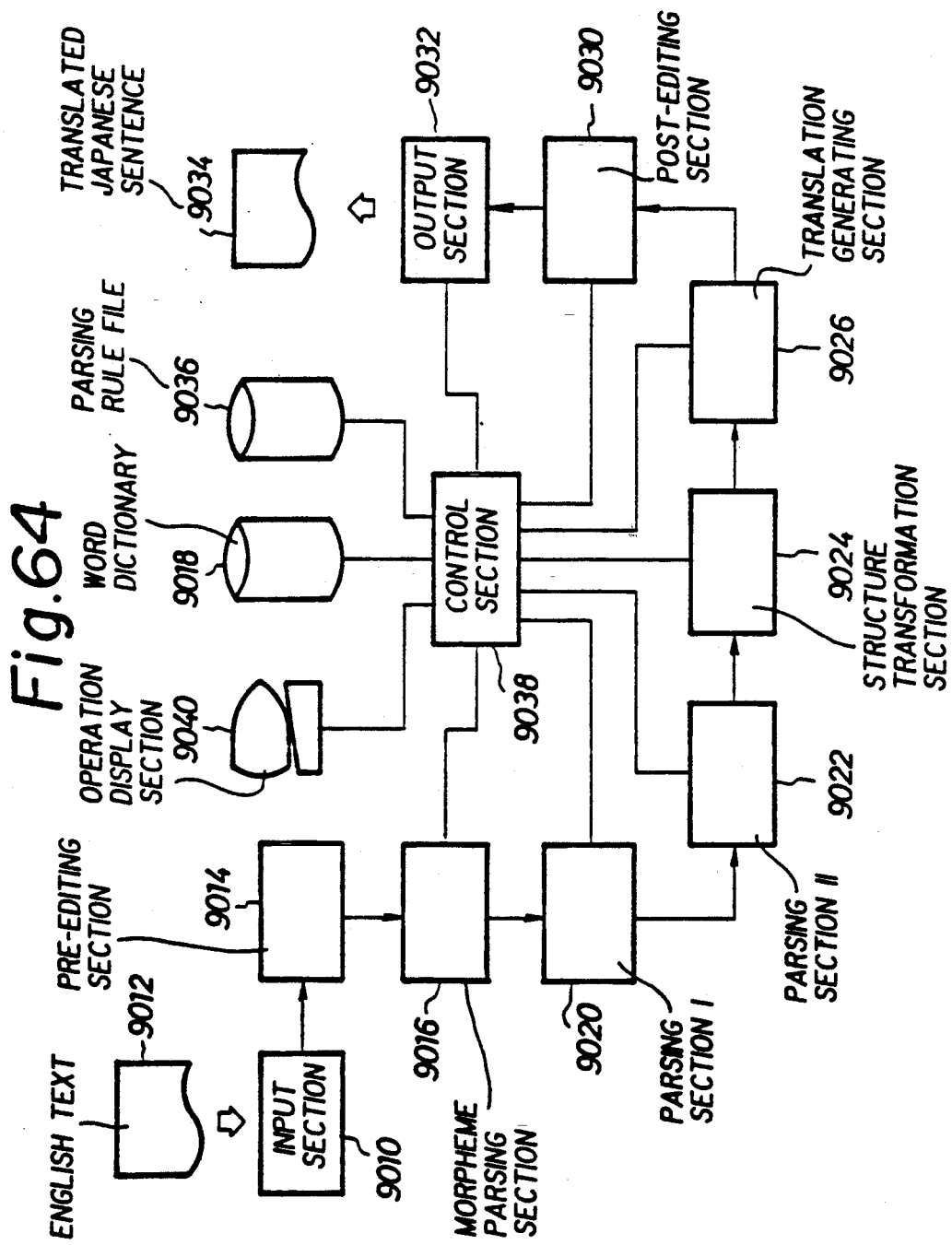

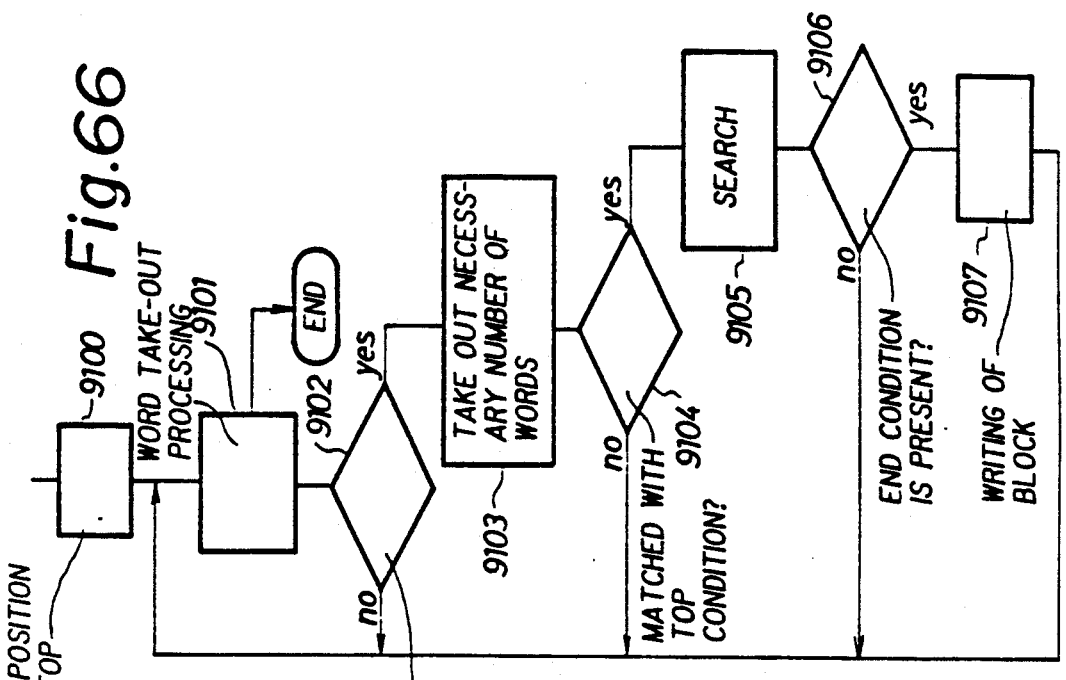
Fig. 66
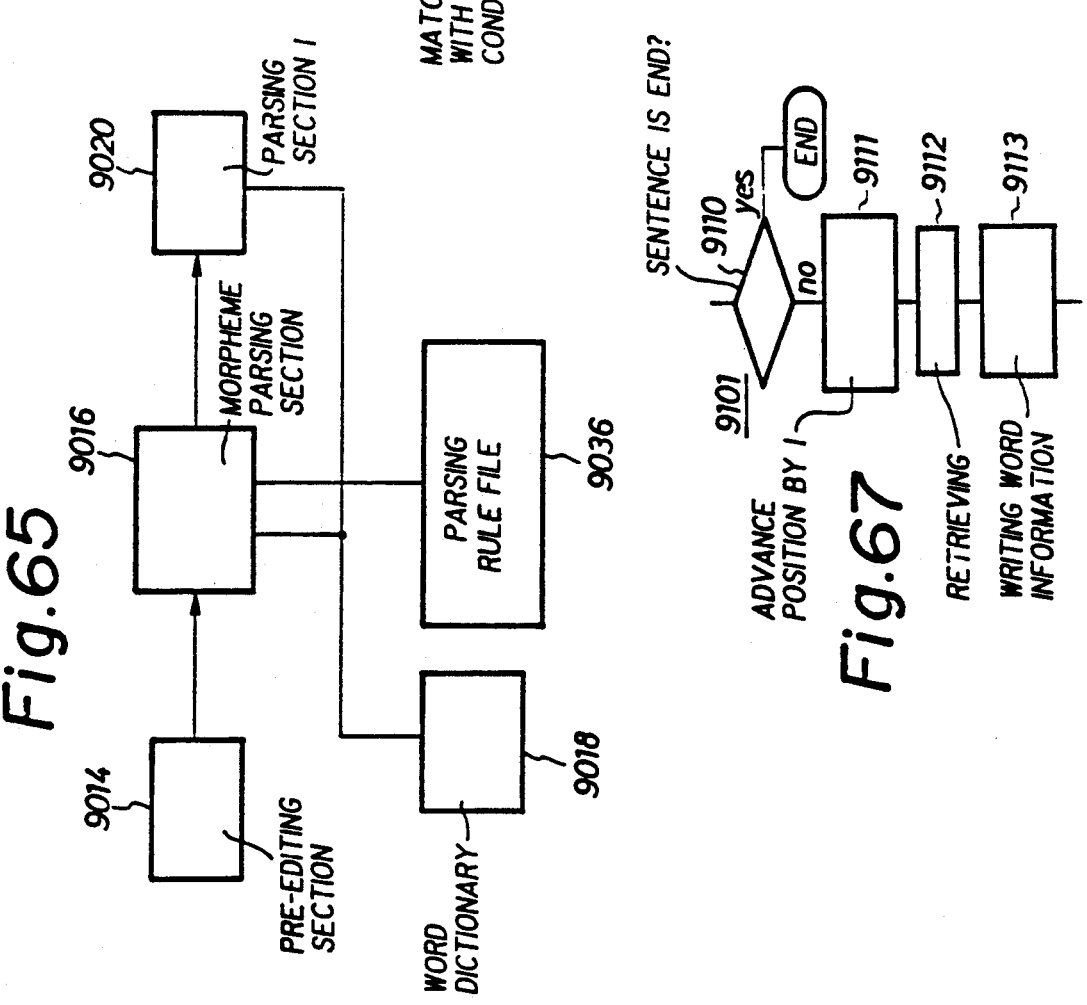
Fig. 65
Fig. 67

| Form of word | Part of speech |
|---|---|
| house | countable noun (singular) |
| houses | "          " (plural) |
| I | pronoun 1st person single |
| is | be verb 3rd person singular present; intransitive 3rd person singular present |
| isn't | be verb 3rd person singular present negative; intransitive 3rd person singular present negative |
| said | intransitive past; intransitive past particle; transitive past; transitive past particle |
| white | adjective primitive; incountable noun |

| Block preparating condition | | | Prepared block | | |
|---|---|---|---|---|---|
| Top condition | End condition | Start position | End position | goal | role |
| , conjunction | End of sentence | Top of sentence conjunction | End of sentence (preceding conjunction), | clause | sentence clause |
| , relative pronoun | , | , (preceding relative pronoun) | , | clause | adverb: adjective |
| , relative pronoun | End of sentence | , (preceding relative pronoun) | End of sentence | clause | adverb: adjective |
| " " | " " | " " | " " | optional | optional |
| .... | .... | .... | .... | .... | .... |
| proper noun, noun | , | noun(succeeding to proper noun) | , | noun group | appositional noun |
| | End of sentence | proper noun | End of sentence | noun group | noun |
| | , | noun(succeeding to proper noun) | , | noun group | appositional noun |
| | End of sentence | proper noun | End of sentence | noun group | noun |
| proper noun, article, noun | , | article | , | noun group | appositional noun |
| | , | proper noun | , | noun group | noun |
| | End of sentence | article | End of sentence | noun group | appositional noun |
| | | proper noun | | noun group | noun |
| word starting from capital | word starting other than capital | word starting from first capital letter | word preceding end condition | noun group | proper noun |
| .... | .... | .... | .... | .... | .... |

| condition for arrangement as structure | way of arrangement | goal | role |
|---|---|---|---|
| ..., conjunction... | (top of sentence..), | sentence | sentence |
| | conjunction (...end of sentence) | sentence | sentence |
| | (conjunction ...end of sentence) | clause | adverb |
| ..., relative pronoun ..., | (,relative pronoun...,) | clause sentence | {adverb, adjective} |
| ...,"... ." ... | ('...") | optional | optional |

Fig.72

| | 1 2 3 4 5 6 7 8 9 10 |
|---|---|
| sentence information | I   said,   "White House isn't white." |
| block information | block 1 (start:4, end: 10, goal:optional, role:optional)<br>block 2 (start:5, end: 6, goal:noun group, role:proper noun) |
| word information | 1 :  I   part of speech = pronoun 1st person, singular<br>2 :  said  part of speech = intransitive; intransitive past particle = transitive; transitive past particle<br>3 :  ,  part of speech = punctuation<br>4 :  ‿"  part of speech = punctuation<br>5 :  White  part of speech = adjective root; uncountable noun<br>6 :  House  part of speech = countable noun singular<br>7 :  isn't  part of speech = be verb 3rd person singular present negative; intransitive 3rd person singular present negative<br>8 :  white  part of speech = adjective root; uncountable noun<br>9 :  .  part of speech = punctuation<br>10 : "‿  part of speech = punctuation |

Fig.74  9018

| word form | part of speeech |
|---|---|
| ⋮ | |
| house | countable noun (singular) (goods, place) |
| houses | countable noun (plural) (goods, place) |
| ⋮ | |
| I | pronoun, first person singular |
| ⋮ | |
| is | be verb, third person singular present; intransitive, third person, singular, present |
| isn't | be verb, third person singular present negative; intransitive, third person singular present negative |
| ⋮ | |
| said | intransitive past; intransitive past particle; transitive past; transitive past particle |
| ⋮ | |
| white | adjective root; uncountable noun |

Fig.75

| Block preparating condition | | | | Prepared block 9036 | |
|---|---|---|---|---|---|
| Top condition | End condition | Start position | End position | goal | role |
| , conjunction | End of sentence | Top of sentence conjunction | End of sentence (preceding conjunction), | clause | sentence clause |
| , relative pronoun | , | , (preceding relative pronoun) | , | clause | adverb: adjective |
| , relative pronoun | End of sentence | , (preceding relative pronoun) | End of sentence | clause | adverb: adjective |
| " ] | " ] | " | " ] | optional | optional |
| .... | .... | .... | .... | .... | .... |
| proper noun (person), noun (person) | , | noun(succeeding to proper noun) proper noun | , | noun group | appositional noun |
| proper noun (person), noun (person) | End of sentence | noun(succeeding to proper noun) proper noun | End of sentence | noun group | noun |
| proper noun, (person) | , | article proper noun | , | noun group | appositional noun |
| article ⌣ noun (person) | End of sentence | article | End of sentence | noun group | appositional noun |
| | , | proper noun | , | noun group | noun |
| word starting from capital | word starting other than capital | word starting from first capital letter | word preceding end condition | noun group | proper noun |
| .... | | | | .... | .... |

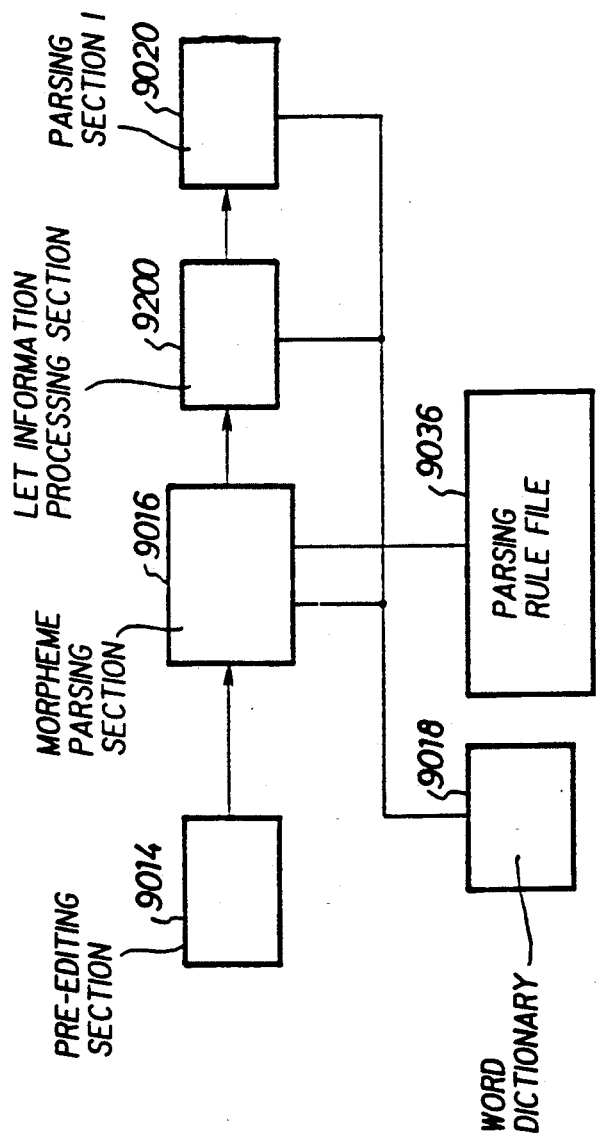

| word form | part of speech |
|---|---|
| ⋮ | |
| go | intransitive root, intransitive present; let information = 0 |
| ⋮ | |
| house | countable noun (singular) |
| houses | countable noun (plural) |
| ⋮ | |
| I | pronoun first person singular; let information = 0 |
| ⋮ | |
| is | be verb third person singular present; intransitive third person singular present |
| isn't | be verb third person singular present negative; intransitive third person singular present negative |
| ⋮ | |
| let's | transitive root (with 's); let information = 1 |
| ⋮ | |
| said | intransitive past; intransitive past particle; transitive past; transitive past particle; let information = 0 |
| school | countable noun; intransitive root; intransitive present; let information = 0 |
| ⋮ | |
| to | preposition |
| ⋮ | |
| white | adjective primitive, uncountable noun |

Fig.79

| | 1 2 3 4 5 6 7 8 9 10 |
|---|---|
| sentence information | I said, "Let's go to school." |
| block information | block 0 (start: 1, end: 10, goal: sentence, role: sentence)<br>block 1 (start: 4, end: 10, goal: optional role: optional) |
| word information | 1: I    part of speech = pronoun first person singular    let information = 0<br>2: said    part of speech = intransitive past, intransitive past particle, transitive past, transitive past particle    let information = 0<br>3: ,    part of speech = punctuation    let information = 0<br>4: ␣"    part of speech = punctuation    let information = 0<br>5: Let's    part of speech = transitive root (with 's)    let information = 1<br>6: go    part of speech = intransitive root; intransitive present    let information = 0<br>7: to    part of speech = preposition    let information = 0<br>8: school    part of speech = countable noun singular; intransitive root; intransitive present    let information = 0<br>9: .    part of speech = punctuation    let information = 0<br>10: "␣    part of speech = punctuation    let information = 0 |

Fig.80

| | 1 2 3 4 5 6 7 8 9 10 |
|---|---|
| sentence information | I said, "Let's go to school." |
| block information | block 0 (start: 1, end: 10, goal: sentence, role: sentence)<br>block 1 (start: 4, end: 10, goal: imperative sentence, role: invitation sentence) |
| word information | 1: I    part of speech = pronoun first person singular      let information = 0<br><br>2: said    part of speech = intransitive past, intransitive past particle; transitive past, transitive past particle      let information = 0<br><br>3: ,    part of speech = punctuation      let information = 0<br><br>4: ⌴"    part of speech = punctuation      let information = 0<br><br>6: go    part of speech = intransitive root; intransitive present      let information = 0<br><br>7: to    part of speech = preposition      let information = 0<br><br>8: school    part of speech = countable noun singular; intransitive root; intransitive present      let information = 0<br><br>9: .    part of speech = punctuation      let information = 0<br><br>10: "⌴    part of speech = punctuation      let information = 0 |

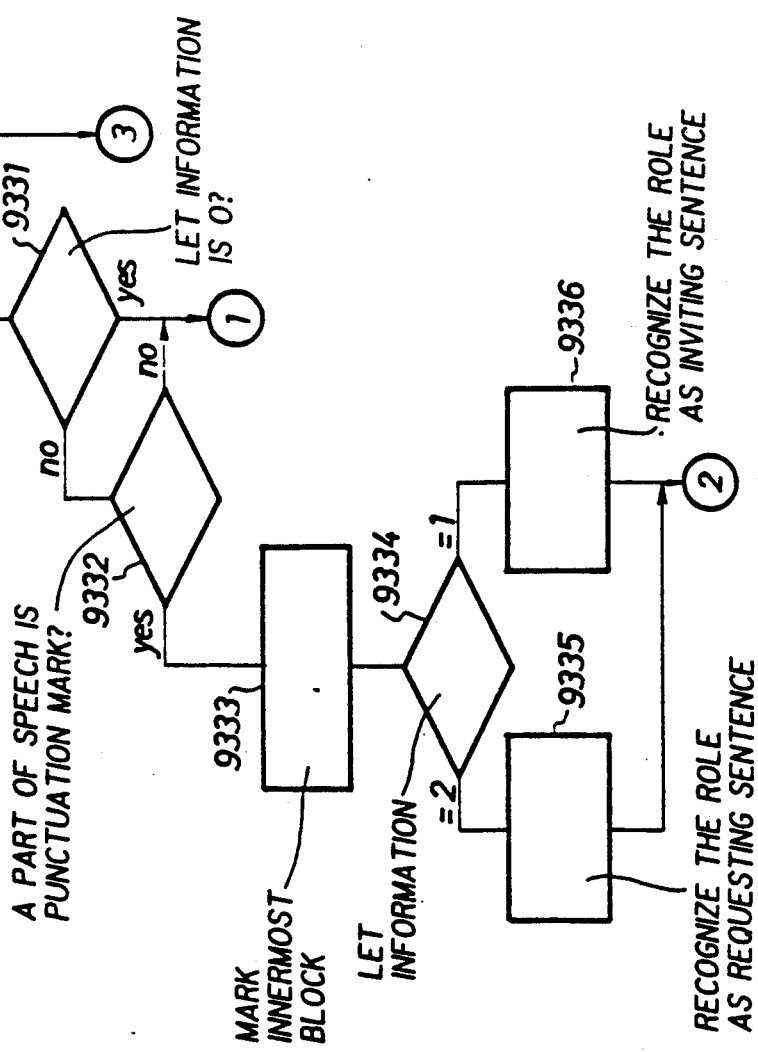
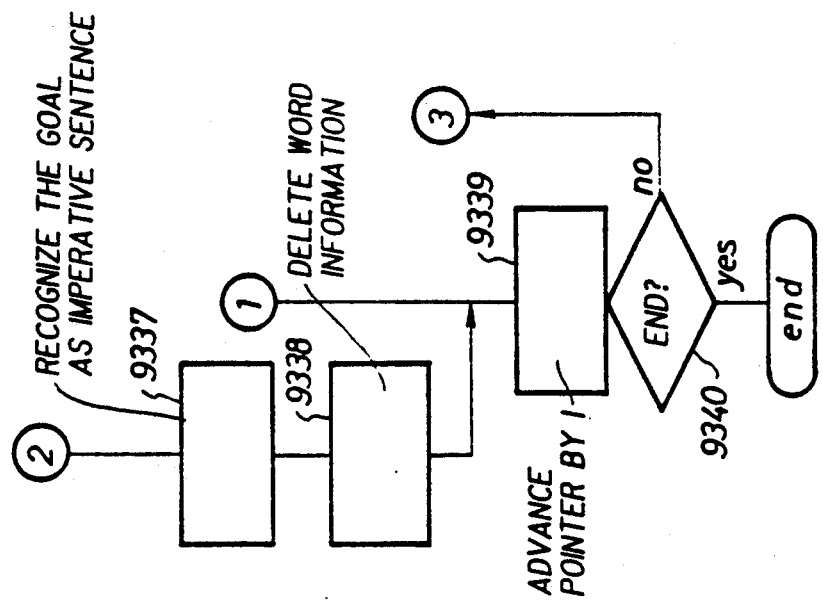
Fig. 83A
Fig. 83B

Fig.85

| | 1　　10　　　20　　　　　30　　　　40　46 |
|---|---|
| sentence information | The anti-war attitude is her open-door policy. |
| block information | block 1 (start: 30, end: 38, goal: optional, role: adjective/noun) |
| word information | 1　　the　　　part of speech = article<br>5　　anti-war　part of speech = adjective primitive; noun uncountable<br>14　attitude　part of speech = noun, countable, singular<br>23　is　　　　part of speech = be verb, 3rd person singular present<br>26　her　　　part of speech = pronoun objective, 3rd person singular female;pronoun possessive, 3rd person singular female<br>30　open　　　part of speech = transitive root/present; intransitive root/present; adjective primitive<br>35　door　　　part of speech = noun, countable, singular<br>40　policy　　part of speech = noun, countable, singular; noun, uncountable<br>46　.　　　　part of speech = punctuation |

Fig.88

| | 1 2 3 4 5 6 7 8 9 10 11 12 |
|---|---|
| sentence information | I said, "It is good, isn't it ?" |
| block information | block 0 (start: 1, end: 12, goal: sentence, role: sentence)<br>block 1 (start: 4, end: 12, goal: optional, role: optional) |
| word information | 1: I     part of speech = pronoun 1st person singular<br>2: said  part of speech = intransitive past; intransitive past particle; transitive past; transitive past particle<br>3: ,     part of speech = punctuation<br>4: ⌴"    part of speech = punctuation<br>5: it    part of speech = pronoun 3rd person singular<br>6: is    part of speech = be verb, 3rd person singular, present<br>7: good  part of speech = adjective primitive<br>8: ,     part of speech = punctuation<br>9: isn't part of speech = be verb negative, 3rd person singular, present<br>10: it   part of speech = pronoun, 3rd person singular<br>11: ?    part of speech = punctuation<br>12: "    part of speech = punctuation |

Fig.89

| | 1 2 3 4 5 6 7 8 9 10 11 12 |
|---|---|
| sentence information | I  said,  "It  is  good,  isn't it ?" |
| block information | block 0 (start: 1, end: 12, goal: sentence, role: sentence)<br>block 1 (start: 4, end: 12, goal: affirmative sentence, role: additive interrogation) |
| word information | 1:  I<br>   :<br>   :<br>7:  good   part of speech = adjective primitive<br><br>12:  "     part of speech = punctuation |

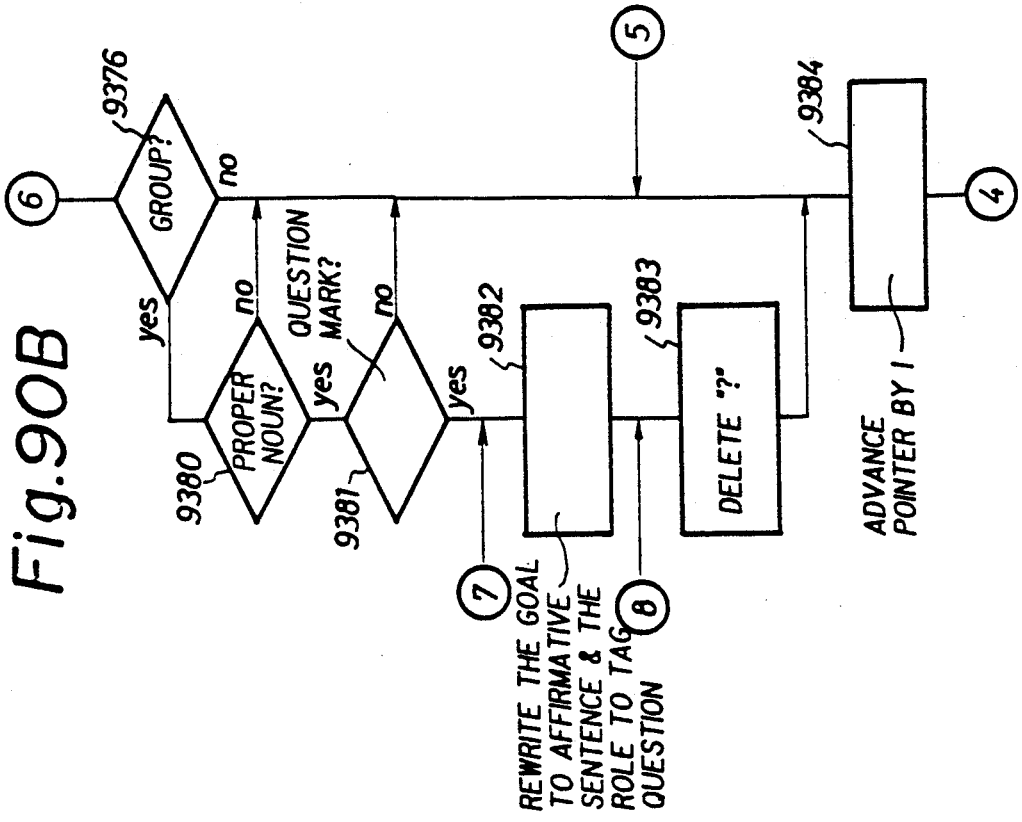
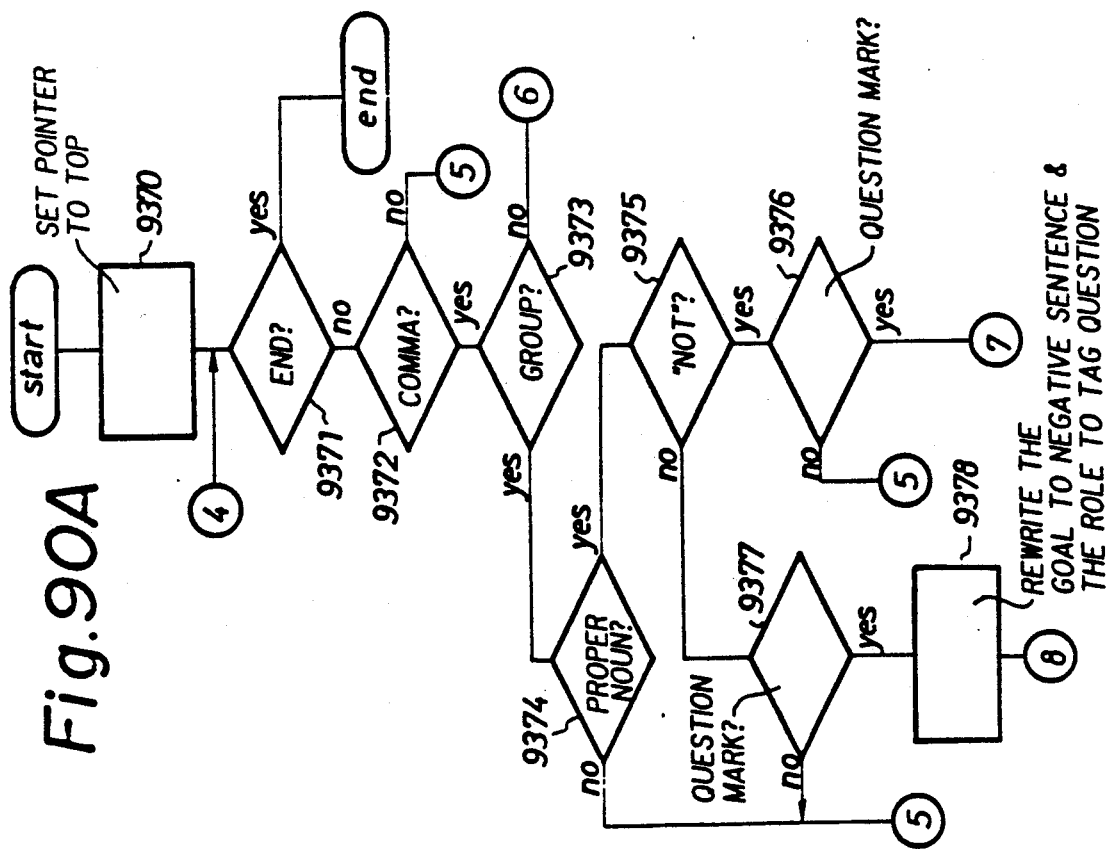
Fig.90B
Fig.90A

LANGUAGE ANALYZER FOR MORPHEMICALLY AND SYNTACTICALLY ANALYZING NATURAL LANGUAGES BY USING BLOCK ANALYSIS AND COMPOSITE MORPHEMES

This application is a continuation of application Ser. No. 07/104,423, filed on Oct. 5, 1987, now abandoned.

The present invention concerns a language analyzer and, particularly, it relates to a language analyzer for analyzing natural languages useful for automatic translation devices.

The language analyzers in the prior art involve the problems as described below.

Upon analyzing input string morphologically in a sentence, for example, words, etc. it is important and gives a significant effect on the result of the analysis to judge whether a certain word is used alone or it is used as a compound word or a phrase coupled with other word or words.

The conventional analyzers employ a system of conducting analysis for both of the cases where successive words are assumed to be a phrase and to be independent words and finally selecting a suitable translation based on the result thereof or a system of preferentially judging such successive words as a phrase. However, the former system requires a long time for the processing, while the latter system involves a high possiblility of forming erroneous translation.

In the morphological analysis conducted upon generating translation, a part of speech or like other information for the morpheme such as a word is obtained by retrieving a dictionary. In the case of usual words such as nouns and verbs, since most of them can be stored in the dictionary, they can easily be retrieved to obtain information.

However, since such expressions, for example, indicating length (m), speed (m/s), acceleration (m/s$^2$) and like other units comprise extremely versatile kinds, it is not efficient to store all of them in the dictionary since it wastefully increases the memory capacity for the dictionary information.

In the case of analyzing input string morphologically of a sentence, the numerical expression in a certain language may not always agree just with that in other languages. For instance, fundamental concept for counting numbers, that is, positional notation is different between Japanese and European languages, for example, English language.

For example, if an English expression for numerical values "a hundred and two thousand two hundred and four" is simply decomposed into their constituents and merely replaced with corresponding expression in Japanese language respectively, they are merely analyzed as "100 and 2,200 and 4". They should correctively be translated finally as "10-man 2-sen 2-hyaku 4" in Japanese language, where "man" means 10 thousand, "sen" means thousand and "hyaku" means hundred. In the morphological analysis conducted upon forming translation, an inputted sentence is divided into dictionary reference units by means of delimiters such as space, comma and colon, and the dictionary is retrieved by the dictionary reference units to obtain part of speech and other information. In this case, a proper noun, for example, may be used in two or more different meanings depending on the context. For example, "Osaka City" is used for expressing a group as the subject such as "Osaka City decided—" and in the meaning expressing the place as an object such as "—in Osaka City". Heretofor, since only one meaning is stored for each of proper nouns, it can not cope with such different uses depending on the meanings, which reduces the accuracy of the analysis.

For example, in the case of an English sentence in the Central Park John Willson had a—", the sentence can not be adequately parsed unless it is recognized after separating into the proper noun "Central Park" and another proper noun "John Willson" in this context. In the same way, in the case of an English sentence—in Boston Mr. Baker was—", it has to be recognized after separating into a proper noun "Boston" and a proper noun "Mr. Baker". However, in the conventional system, a series of these proper nouns is erroneously recognized as a single proper noun as a whole.

For instance, upon analyzing the morphemes of English sentence, a succession of words starting from a capital letter is generally parsed as one proper noun. However, if words starting from the capital letter continue, it is not always appropriate to recognize them as one proper noun as a whole. There is such a case where they are actually a plurality of proper nouns that occasionally appear successively. In the morphological analysis of morpheme strings conducted upon generating translation, a part of speech and other information are obtained by retrieving a dictionary. In this case, since most of ordinally nouns, verbs, etc. can be stored in the dictionary they can be retrieved easily to obtain information.

However, since versatile kinds of words are present for the proper nouns, it is impossible to store all of them in a dictionary. Accordingly, those proper nouns not registered in the dictionary can not be recognized as the proper noun.

In a case where a character array combined in a particular pattern is present, there is a high possibility of causing erroneous parsing if a processing for regular word units applied to usual sentences is applied to such a character array and it may possibly cause a meaningless translation.

For instance, in a case where there is an English character array" Sunday, 26 Jan., '80" expressing the matter of time, it is very difficult to translate them Japanese because they should be expressed as "'80-nen, 1-gatsu, 26-nichi, nichiyobi" in Japanese, where "nen" means year, "gatsu" means month, "nichi" means day and "nichiyobi" means Sunday.

Further, for derivative words, since no estimation has been conducted for the part of speech and semantic feature no exact translation may be obtained depending on the case.

The grammar used for analyzing language, for example, content-free grammar (cfg), has a drawback of outputting many wasteful solutions that can not be finally used even if it employs the top-down method or bottom-up method. Many of such wasteful solutions are apparently recognized as errors when they are read actually. However, since structure transformation or translation formation is conducted also for such wasteful solutions and then the adequacy of the result is judged in the respective processing steps, it results in wasteful processing time. For example, English word "let" has both the meanings of instruction and invitation and, accordingly, parsing has to be proceeded for the respective possibilities to reduce the efficiency. Further, it is difficult to select one of them.

In addition, in the English language, a plurality of words can be combined by way of hyphens such as "take-care-of-him attitude" to thereby freely prepare an adjective group. However, it is difficult to handle them by the ordinary parsing grammar as usual.

The situation is the same also for the tag question. Although the form of the tag question in English language is extremely limited, it requires an extremely complicated processing in the usual analyzing method. Further, it is not easy to determine what verb the tag question interrogation is related to.

The present invention has been accomplished in view of the foregoing problems.

A first object of the present invention is to provide a language analyzer capable of judging the extent of the coupling degree between two successive words and capable of judging whether they are a phrase or not based on the result thereof.

A second object of the present invention is to provide a language analyzer capable of morphological analysis in an inputted sentence containing a composite character array such as for dimensional units without storing all of such character arrays in a dictionary.

A third object of the present invention is to provide a language analyzer capable of conducting an appropriate morphological analysis with respect to an expression containing numerical values.

A fourth object of the present invention is to provide a language analyzer capable of translating a proper noun into a meaning in compliance with the context.

A fifth object of the present invention is to provide a language analyzer capable of properly analyzing input streams morphologically with respect to an expression containing a plurality of successive proper nouns.

A sixth object of the present invention is to provide a language analyzer capable of processing a not-registered proper noun and capable of conducting appropriate parsing for a proper noun while considering a relationship with word groups disposed before and after thereof.

A seventh object of the present invention is to provide a language analyzer capable of properly analyzing input streams morphologically with respect to a character array expressing specific meaning by being combined in a particular rule.

A eighth object of the present invention is to provide a language analyzer capable of estimating grammatical feature, meaning, etc. of a word recognized to be a derivative in accordance with a predetermined rule.

A ninth object of the present invention is to provide a language analyzer capable of recognizing the structural feature of an inputted sentence and conducting parsing in accordance with the feature.

The first object of the present invention can be attained by a language analyzer comprising a dictionary means storing therein dictionary data containing the data for morphemes regarding words, compound words and phrases and parsing means for analyzing input strings morphologically to an inputted sentence while referring to the dictionary means, wherein the dictionary means contain data for the coupling degree indicating the coupling degree between words that constitute a compound word and a phrase, and the parsing means refers to the dictionary means for the respective words contained in the inputted sentence and, when a plurality of dictionary data are retrieved for one word in combination with other words, selects the combination of words with a higher coupling degree while referring to the data for the coupling degree.

The second object of the present invention can be attained by a language analyzer comprising input means for inputting a character array of a predetermined language, a fundamental dictionary means used for the retrieving of the inputted character array and storing therein fundamental data, and a parsing means for the inputted character array by retrieving the fundamental dictionary means, wherein the parsing means parses an inputted character array when a portion of the character array is retrieved by retrieving the fundamental dictionary means for the inputted character array, by similarly retrieving the fundamental dictionary means for other portion of the character array.

The third object of the present invention can be attained by a language analyzer comprising:

a dictionary means storing dictionary data on every dictionary retrieving units, and a parsing means for dividing an inputted sentence into dictionary reference units and conducting elements parsing for the dictionary reference units while referring to the dictionary means, wherein the dictionary means contain, as the dictionary data, distinguishing indications for indicating that the dictionary reference unit expressing numerals are to express numerals, and the parsing means refers to the dictionary means for the respective dictionary reference units contained in the inputted sentence and, when the distinguishing indications is contained in the retrieved dictionary data, combines the dictionary reference unit for which the distinguishing indication is retrieved with other dictionary reference unit with which other distinguishing indication is retrieved disposed in the vicinity of the just mentioned dictionary reference unit, calculates numerical values meant by both of the dictionary reference units into one numerical value and forms both of the dictionary reference units into a single parsing unit.

The forth object of the present invention can be attained by a language analyzer comprising:

an input means for inputting a character array of a predetermined language, a dictionary means used for retrieving a character array inputted from the input means, a retrieving means for retrieving the dictionary means regarding the inputted character array, a feature information providing means for providing feature information to the character array not registered in the dictionary means and character array the feature information of which is not registered in the dictionary means among the inputted character array, wherein the feature information providing means is adapted to provide a plurality of feature informations to the character array having no feature information.

The fifth object of the present invention can be attained by a language analyzer comprising:

a dictionary means storing dictionary data on every dictionary reference units, and a parsing means for dividing the inputted sentence into dictionary reference units and conducting parsing for morphemes for the dictionary reference units while referring to the dictionary means, wherein the dictionary means contain, as the dictionary data, the distinguishing information for specifying an allowable position in a succession of proper nouns composed of a plurality of successive proper nouns with respect to the dictionary reference unit that means a proper noun, and the analyzing means is adapted to refer to the dictionary means for the respective dictionary reference units contained in the inputted sentence and, when the distinguishing information is contained in the retrieved dictionary data, combine the dictionary reference unit of which the distinguishing information is retrieved with another dictionary reference unit that means another proper noun in adjacent with the just mentioned dictionary reference unit in accordance with the position specified by the distinguishing information into a single parsing unit.

The sixth object of the present invention can be attained by a language analyzer comprising:

an input means for inputting a character array of a predetermined language, a dictionary means used for retrieving the inputted character array from the input means and, a feature information parsing means for retrieving the dictionary means regarding the inputted character array and then parsing the feature information for the character array, wherein the feature information parsing means is adapted to parse the feature information of the character array while considering the feature information for character array disposed before and after the just-mentioned character array. The feature information parsing means is adapted to parse the feature information of a plurality of rows of letters by collectively arranging the character arrays.

The seventh object of the present invention can be attained by a language analyzer comprising:

a dictionary means storing the dictionary data on every dictionary reference units and a parsing means for dividing an inputted sentence into dictionary reference units and analyzing input strings morphologically while referring to the dictionary means, wherein the parsing means is adapted to distinguish a succession of dictionary reference units containing specific meaning element as an assembly unit expressing a specific meaning comprised under a certain rule and forming a succession of dictionary reference units having the specific meaning elements into a single parsing unit.

The eighth object of the present invention can be attained by a language analyzer wherein a grammatical feature, semantic feature or translated word is estimated for those words not registered in a dictionary and those words recognized as derivatives depending on the morphemic feature such as an affix.

The ninth object of the present invention can be attained by a language analyzer comprising:

a first parsing means for analyzing input strings morphologically for a an inputted sentence of a predetermined language, a second parsing means for parsing the structure of a sentence of the language based on the result of the morphological analysis from the first parsing means, a dictionary means containing dictionary data for the language used for the first and the second parsing means and, control means for retrieving the dictionary means thereby causing the first and the second parsing means to conduct parsing, wherein the first parsing means is adapted to sort the dictionary means, distinguish the morphemic feature of the inputted sentence of the language to thereby distinguish the arrangement in view of the sentence structure, and estimate the nature to be the result of the parsing for the arrangement and the role of the arrangement in view of the sentence structure that functions in the sentence, and the second parsing means is adapted to parse the surface layer structure for a sentence of the language by applying a grammatical rule based on the estimated nature and the role, and parse a possible subsidiary relationship for constituent contained in the sentence.

According to the language analyzer of the present invention, automatic translation at high speed and high quality can be obtained.

Explanation will be made more specifically for the language analyzer according to the present invention while referring to nine embodiments illustrated in the drawings. The present invention is not restricted only to these embodiments.

FIG. 1 through FIG. 10 illustrate a first embodiment of the language analyzer according to the present invention applied to an English-Japanese automatic translation device.

FIG. 1 is a functional block diagram illustrating an example for the detailed structure of a morphological analysis section;.

FIG. 2 is a functional block diagram illustrating the entire structure;

FIG. 3 is an explanatory view illustrating an example for the structure of a dictionary file attached with a highest preference flag;

FIG. 4 is a flow chart illustrating an example of a morpheme parting processing;

FIG. 5 is a flow chart illustrating an example for the input processing in the morphological analysis processing;

FIG. 6 is an explanatory view illustrating an example for shaping an a inputted character array.

FIG. 7 is an explanatory view illustrating an example of dictionary retrieving;

FIGS. 8A through 8D are flow charts illustrating an example of eliminating the contradiction for the highest preference flag in the morphological analysis;

FIG. 9 is an explanatory view illustrating an example for the content of retrieved dictionary information buffer after referring to the dictionary;

FIG. 10 is an explanatory view illustrating an example for the content of the retrieved dictionary information buffer as a result of conducting the contradiction elimination for the most preference flag;

FIGS. 11 through FIGS. 16 illustrates the second embodiments of the present invention, in which FIG. 11 is a block diagram for the embodiment;

FIG. 12 is a chart illustrating an example of data stored in a dictionary file;

FIG. 13 is a chart illustrating an example of data stored in a fundamental unit dictionary file;

FIG. 14 is a chart illustrating an example of data stored in a dictionary information preserve table;

FIG. 15 is a flow chart illustrating the operation of the device;

FIG. 16 is a flow chart illustrating the unit recognition;

FIG. 17 through FIG. 29 illustrate the third embodiment of the language analyzer according to the present invention applied to an English-Japanese automatic translation device, in which FIG. 17 is a functional block diagram illustrating an example for the detailed structure of morphological analysis;

FIG. 18 is as functional block diagram illustrating the entire structure;

FIG. 20 is a flow chart illustrating an example of collective arrangement for the currency symbol and the unit in the morphological analysis;

FIGS. 21A and 21B are flow charts illustrating an example of the hyphen-attached numbers in the morphological analysis;

FIG. 24 is an explanatory view illustrating an example for the structure of a dictionary file attached with a numerical flag;

FIG. 25 is an explanatory view illustrating an example of an inputted character array;

FIGS. 26A through 26D are explanatory views illustrating the content of the dictionary information preserve table retrieved from the dictionary for the inputted character array illustrated in FIG. 25 depending on the processing steps;

FIG. 27 is an explanatory view illustrating another example of the inputted character array;

FIG. 28 is an explanatory view illustrating the content of a currency symbol table, positional notation table, decimal point table in the dictionary;

FIGS. 29A through 29D are explanatory views illustrating an example of the dictionary information preserve table retrieved from the dictionary for the inputted character array shown in FIG. 27, in accordance with the processing steps;

FIG. 30 through FIG. 36 illustrate the forth embodiment according to the present invention, in which FIG. 30 is a block diagram of the embodiment;

FIG. 31 is a chart illustrating an example of the data stored in a difference dictionary;

FIG. 32 is a flow chart illlustrating the operation of the entire device;

FIG. 33 is a flow chart illustrating the processing for the proper noun registered in a dictionary;

FIG. 34 is a flow chart illustrating a processing for proper noun not registered in the dictionary;

FIG. 35 is a flow chart illustrating a processing for providing default nature information;

FIG. 36 is a chart illustrating an example in which data stored in the dictionary information preserve table are varied after the processing for the inputted sentence;

FIG. 37 through FIG. 46 illustrate the fifth embodiment of the language analyzer according to the present invention applied to an English-Japanese automatic translation device, in which FIG. 37 is a functional block diagram illustrating an example of a detailed structure for the morphological analysis section;

FIG. 38 is a functional block diagram illustrating the entire structure;

FIG. 39 is an explanatory view illustrating an embodiment for the structure of a dictionary file;

FIG. 40 is a flow chart illustrating an example of a morphological analysis for a proper noun;

FIG. 41 is a flow chart illustrating an example of the collective arrangement for proper nouns registered in a dictionary in the morpheme analysis;

FIGS. 42, 43 and 44 are flow charts illustrating an example of a processing depending on the proper noun position information in the parsing of a proper noun;

FIG. 45 is a flow chart illustrating an example of the collective arrangement for proper nouns not registered in a dictionary in the morphological analysis;

FIG. 46A through 46F are explanatory views illustrating the content of the dictionary information preserve table referred to the dictionary for the example of an inputted character array in accordance with the processing steps;

FIG. 47 through FIG. 52 illustrate the sixth embodiment according to the present invention, in which FIG. 47 is a block diagram of the embodiment;

FIG. 48 is a chart illustrating an example of data stored in a reference dictionary;

FIG. 49 is a flow chart illustrating the operation of the entire device;

FIG. 50 is a flow chart illustrating the processing for the proper nouns registered in the dictionary;

FIG. 51 is a flow chart illustrating the processing for proper noun not registered in the dictionary;

FIG. 52 is a chart illustrating an example in which data stored in the dictionary information preserve table are varied after the processing of the inputted sentence;

FIG. 53 through FIG. 57 illustrate the seventh embodiment of the language analyzer according to the present invention applied to an English-Japanese automatic translation device, in which FIG. 53 is a functional block diagram illustrating an embodiment for the detailed structure of the morphological analysis section;

FIG. 54 is a functional block diagram illustrating the entire structure;

FIG. 56 is an explanatory view illustrating an example of the content of the information table in the morpheme processing information providing section 108;

FIG. 57 is an explanatory view illustrating an example of the content of a matching table 7128;

FIGS. 58 through FIG. 63 illustrate the eighth embodiment according to the present invention, in which FIG. 58 is a block diagram for explanating the entire structure;

FIG. 59 is a block diagram for explanating an example of processing derivative words by way of prefix;

FIG. 60 is a block diagram for illustrating an example of processing derivative words by way of suffix;

FIG. 61 is a block diagram for the entire details prepared by synthesizing FIG. 58, FIG. 59, and FIG. 60;

FIG. 62, is a block diagram showing further details for a complete not-registered word processing section in FIG. 61; and FIG. 63 is a block diagram for explanating one embodiment of an automatic translation device to which the present invention is applied;

FIG. 64 through 90 illustrate the ninth embodiment of the language analyzer according to the present invention is applied to an English-Japanese translation device, in which FIG. 64 is a functional block diagram illustrating the entire structure;

FIG. 65 is a functional block diagram collective showing the function of recognizing the structural arrangement of an inputted English sentence as a block;

FIG. 66 is as a flow chart illustrating an example of a flow for the collective arrangement of a block regarding the inputted English sentence;

FIG. 67 is a flow chart illustrating the details for word taken-out processing in the processing flow;

FIG. 68 is an explanatory view illustrating an example of the dictionary information for English words or phrases stored in a word dictionary;

FIG. 69 is an explanatory view illustrating example of the table data for block top condition, end condition, any goal and roll estimation condition stored in a parsing rule file;

FIG. 70 is an explanatory view illustrating an example of collective arrangement for structure;

FIG. 71 is an explanatory view illustrating an example of collective arrangement for block;

FIG. 72 is an explanatory view illustrating an example of English information and word information collectively arranged into a block;

FIG. 73 is a flow chart illustrating an example of a parsing processing executed in a parsing section;

FIG. 74 is an explanatory view similar to that in FIG. 68 illustrating an example for the entry of word-phrase dictionary in a case where this embodiment has a function of identical case estimation;

FIG. 75 is an explanatory view similar to that in FIG. 69 illustrating an example for the top and end condition of block and a table of the block preparing information in a case where this embodiment has a function of identical case estimation;

FIG. 76 is a functional block diagram similar to that in FIG. 64 illustrating the entire structure for a modification of this embodiment;

FIG. 77 is a functional block diagram similar to that in FIG. 76 for collecting the function of parsing let information regarding the modified embodiment shown in FIG. 76;

FIG. 78 is an explanatory view illustrating an example for dictionary information containing let information for English words and phrases stored in the word dictionary in the modified embodiment;

FIGS. 79 and 80 are explanatory views similar to that in FIG. 72 illustrating an example of the block information and word information in which an English sentence containing let information is collectively arranged into a block;

FIG. 81 is a flow chart similar to that in FIG. t66 73 illustrating an example of a flow for collective arrangement of the let information regarding the inputted English sentence;

FIG. 82 is a flow chart similar to that in FIG. 73 illustrated an example for the parsing processing containing let information executed in the parsing section in the modified embodiment;

FIGS. 83A and 83B are flow charts illustrating an example of the flow for parsing the let information for the inputted English sentence;

FIG. 84 is a flow chart illustrating an example for the flow of the parsing for hyphen words for the inputted English sentence;

FIG. 85 is an explanatory view similar to that in FIG. 72 illustrating in an example of the block information and the word information collectively arranged from the inputted English sentence containing hyphen word into a block;

FIG. 86 is a functional block diagram similar to that in FIG. 64 illustrating the entire structure of another modified embodiment;

FIG. 87 is a functional block diagram similar to that in FIG. 65 in which a function of parsing the tag question in the inputted English sentence is collectively arranged in the modified embodiment shown in FIG. 93;

FIGS. 88 and 89 are explanatory views similar to that in FIG. 72 illustrating an example of block information and word information collectively arranged from an English sentence containing an tag question into a block; and FIGS. 90A and 90B are flow charts illustrating an example of a parsing flow of tag question for the inputted English sentence.

The first embodiment according to the present invention will be described.

Figure 2:
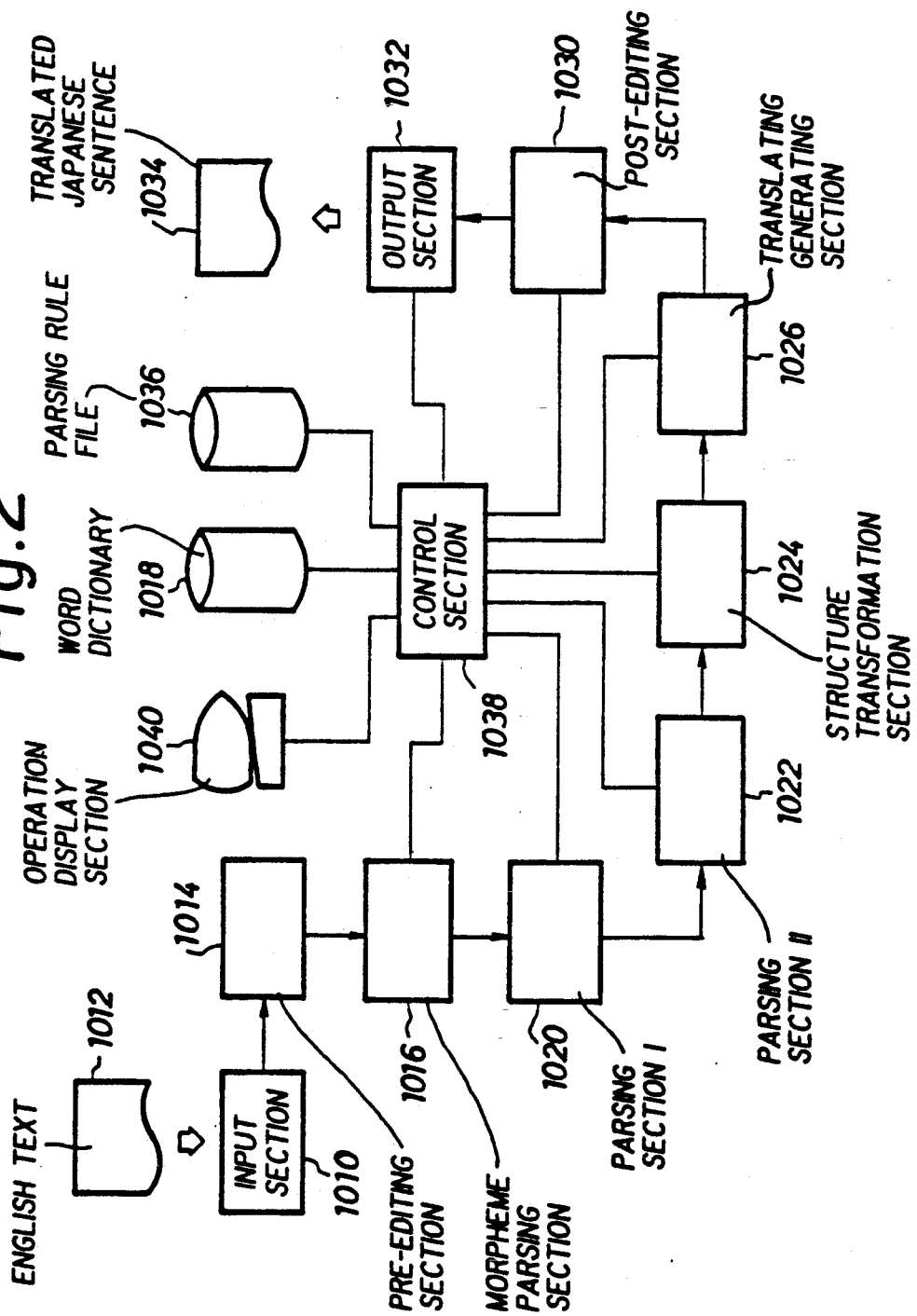

FIG. 2 illustrates the entire constitution of the first embodiment, in which a language analyzer according to the present invention is applied to an English-Japanese automatic translation device. The present invention can, of course, be applied effectively not only to such an English-Japanese automatic translation device for translating English into Japanese but also to any of language analyzers in which the sentences of inputted language are mainly analyzed upon translating a certain language into another.

The embodiment illustrated in the drawing has an input section 1010, by which an English text 1012 to be translated into Japanese is inputted. The input section 1010 may comprise, for example, a key board having character keys such as alphanumerical key or function keys, an optical character reading device (OCR) for reading the English text recorded on paper and/or a file memory device for reading the English text recorded in a memory medium such as a magnetic disc.

The English text inputted from the input section 1010 is read into a pre-editing section 1014, where pretreatment for the translation is conducted. In this section, sentence recognition unknown word processing are mainly effected. This functions as a part of morphological analysis.

The pre-edited English data are transferred together with information obtained in the pre-edition to an morphological analysis section 1016. The morphological analysis section 1016 divides the sentence by referring to a word dictionary 1018, analyzes the morpheme of the English sentence, performs various types of arrangement such as processing for unknown words, proper nouns, expression for time, expression for numerals, etc. and conduct processing for the entire sentence such as tag question and identical case recognition. The rule for the morphological analysis is stored in a parsing rule file 1036.

The English data after morpheme analysis are transferred together with the dictionary information obtained by the morphological analysis to a parsing section I 1020. The parsing section I 1020 is a functional section that performs parsing for the surface structure of an English sentence by applying a grammatical rule to the English data and finds out all of structural possibilities.

The English data after the parsing in the parsing section I 1020 are sent together with the parsing information thereof to a parsing section II 1022. In this section, a solution is selected by applying a structure description from the result of the parsing in view of the surface layer by the parsing I. A plausible parsing tree for the English sentence is thus prepared to form the structure thereof. These parsing rules are also stored in a parsing rule file 1036.

The English data after the parsing are transferred as the data for parsing tree to a structure transformation section 1024. The structure transformation section 1024 prepares a corresponding Japanese sentence tree from a structural tree, i.e., an intermediate structure of the English sentence and converts into a Japanese underlying structure from which Japanese can be translated easily.

The structural tree data showing the Japanese underlying structure thus subjected to structure transformation are sent to a translating generating section 1026, where the translated sentence is formed. This is a functional section for generating a Japanese sentence from the tree structure of the Japanese structural tree.

The Japanese sentence data thus translated, i.e., translated sentence data are sent to a post-editing section 1030. The post-editing section 1030 modifies the translated sentence data by referring to the dictionary 1018 while using information utilized in the translation processing to complete a more natural Japanese sentence. The Japanese sentence data are transferred to an output section 1032 and then outputted as the translated Japanese sentence 1034 from the output section 1032. The output section 1032 comprises, for example, a printer, a display and/or a file memory device such as a magnetic disc.

The flow for the successive translating processings is controlled by a control section 1038 that governs the control for the entire device. The word dictionary 1018 stores dictionary data for the words of English and Japanese languages where not only vocabularies but also various informations such as connective relationship, that is, co-existent relationship, meanings, plural and singular forms, part of speech, etc. are stated in this embodiment. Further, the parsing rule file 1036 stores therein the rule data for the morphological analysis and syntactic analysis.

The control section 1038 is connected with an operation display section 1040. The operation display section 1040 includes operation keys giving various instructions from an operator to the present device such as translation instruction keys or cursor keys, display or indicator that visually displays, inputted English text, Japanese sentence as the result of translation, intermediate data such as dictionary information, various instructions to the operator, etc. Most of the operation displaying functions may be constituted such that they are contained in a key board if it is disposed to the input section 1010 or in a display if it is provided to the output section 1032.

Figure 1:
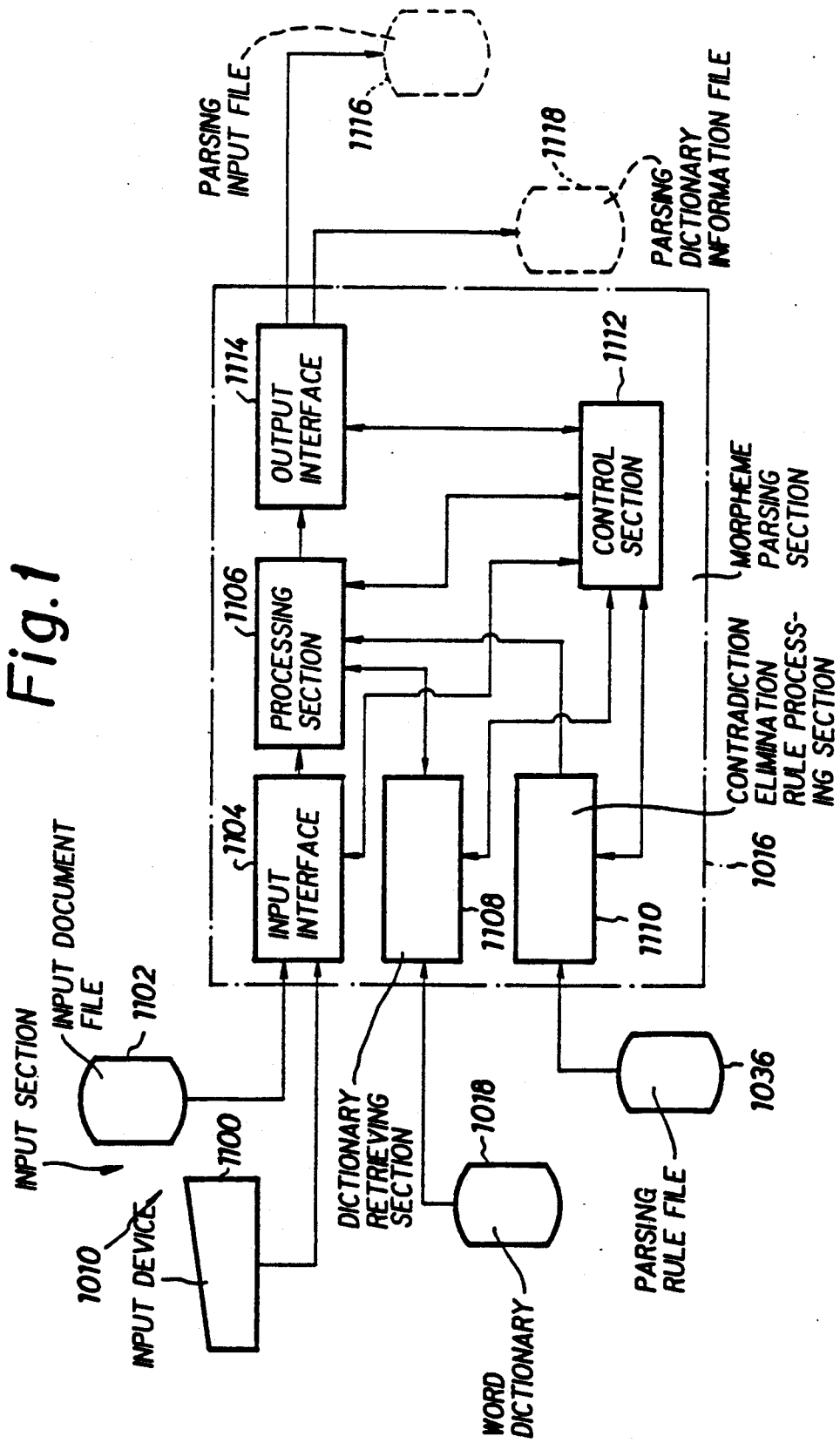

Referring again to FIG. 1, detailed structure for the morphological analysis section 1016 is illustrated. The morphological analysis section 1016 has an input device 1100 such as a key board for the input section 1010 and an input interface 1104 taking an interface with the input document file 1102. The input interface 1104 is disposed with an input character array buffer inputted with the data for English character array in the form of code data, for example, ASCII from the input device 1100 or the input document file 1102 and temporarily stores the character array data. The inputted character array may be those pre-edited in the pre-editing section 1014.

The morphological analysis section 1016, as illustrated in the figure, comprises a processing section 1106, a dictionary referring section 1108, a contradiction elimination rule processing section 1110 and a control section 1112. The processing section 1106 is a parsing function section for conducting the morphological analysis and comprises a retrieved dictionary information buffer, that is, a dictionary information preserve table 1120 (refer to FIG. 9). The morphological analysis is conducted by instructing the dictionary retrieval orderly from the top of the input character array in accordance with the retrieve key character array and storing the dictionary information obtained from the dictionary retrieving section 1108 in accordance therewith into the retrieved dictionary information buffer 1120 and executing the processing of a preference degree in accordance with the highest preference flag as described later.

The dictionary retrieving section 1108 is a functional section for taking out the dictionary information by retrieving the word dictionary 1018 based on the retrieve key character array instructed from the processing section 1106 and transferring them to the processing section 1106.

The word dictionary 1018 stores therein grammatical information such as a part of speech and inflection for the entry of each of the words, as well as a highest preference flag as shown in FIG. 3 for the example of the entry information. The dictionary is referred as a dictionary file with a highest preference flag. "The highest preference flag" is a flag indicating the extent of coupling between words contained in a compound word or phrase constituting the dictionary entrt, in which "0" indicates a weak coupling or no coupling, while "1" indicates a strong coupling. In this case, usage as a phrase is estimated for a compound word or phrase judged to have a strong coupling, otherwise the possibility for the usage as individual words is also considered in parallel.

As exemplified in FIG. 3, each of the entries in the word dictionary 1018 is arranged respectively for the compound word, phrase and individual words constituting them, not making a difference between the individual words and the compound word or phrase. Further, each inflection form constitutes each are entry. If there are a plurality of inflection forms, they are registered respectively as different entries. The type of the inflection is displayed in the inflection section. The situation is similar to the part of speech, in which the registration is allowed for a plurality of part of speech and part of speech information is contained for each of them. As other information, countability or uncoutability for a noun, transitive or intransitive of a verb, or translated word, etc. are registered.

For instance, "get" is an infinitive form of a verb and the highest preference flag is "0". The phrase "get up" is a phrase for an infinitive verb and its highest preference flag is "1". Further, a preposition group "up to" has the most reference flag of "1", but a noun group "white house" as the compound word has the highest preference flag of "0" and thus the latter shows that the coupling degree between the words is low. In the figure, the symbol " " shows a vacant character.

In this way, the dictionary information retrieved in the dictionary retrieving section 1108 contains the highest preference flag In a case where if "1" is set up for the highest preference flag for identical character arrays or overlapping character arrays, such a contradiction has to be eliminated. The contradiction eliminating rule processing section 1110 conducts the elimination of contradiction and it conducts the processing while referring to the contradiction elimination rule for the highest preference flag stored in the parsing rule file 1036.

The contradiction eliminating rule is applied in the present embodiment by the following orders (1)–(3), by which preference selection is conducted.

(1) Phrase or word the part of speech of which is a verb.

(2) Compound word, phrase or word having many constituent words.

(3) Compound word, phrase or word situated in the forward part in the sentence.

The usage for the thus selected word, that is, the parsing unit is displayed as the active information on the retrieved dictionary information buffer 1120 in the processing section 1016. The active information shows that the parsing unit is valid or effective if it is "1", while shows that the possibility thereof is not employed if it is "0".

The control section 1112 is a functional section for governing and controlling the operation and the processing in each of the functional sections in the morphological analysis section 1016. The section may be included in the control section 1038 for conducting the control for the entire device.

The result of the morphological analysis is transferred by way of an output interface 1114 to the parsing section I 1020. In the case where the result is not directly transferred to the parsing section I 1020, it is once stored in the parsing input file 1116 and in the parsing dictionary information file 1118.

In this embodiment, while all of words, compound words or phrases starting from the cut-out position of the dictionary reference unit are taken out upon morphological analysis, dictionary information obtained for individual words constituting the compound word or the phrase judged to be a collective "unit" in accordance with the highest preference flag are discarded. That is, the extent for the coupling between the words in the sentence is judged while referring to the highest preference flag for the dictionary information obtained in the morphological analysis. Among the compound words or phrases, those judged to have strong coupling are estimated to be used as the phrase in the sentence and, if not, the possibility for the usage as the individual words is also considered in parallel.

Figure 4:
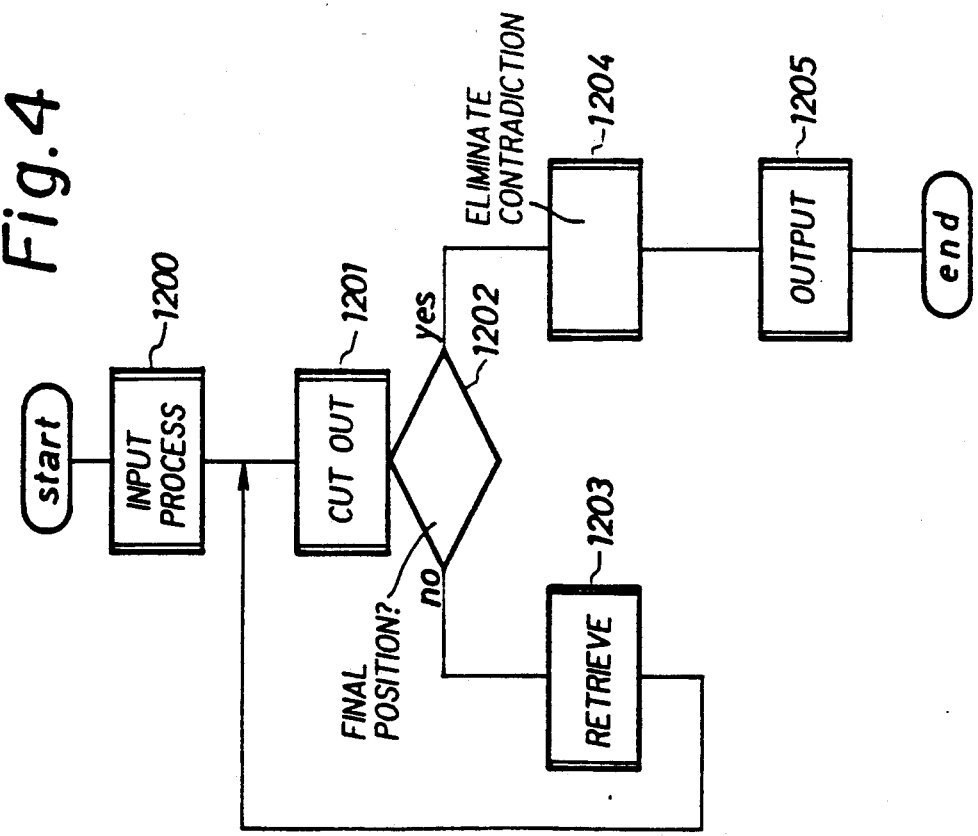

Such a processing by the highest preference flag is conducted by the sequence shown in FIG. 4. Data for the inputted character arrays are received from the input section 1010 (1200), the input character array is cut-out by dictionary reference unit for retrieving the dictionary file 1018 with the highest preference flag (1201), the dictionary 1018 is retrieved in accordance therewith (1203), which is conducted as far as the final position of the sentence shown by the data for the inputted character array (1202), then the contradiction for the highest preference flag is eliminated (1204) and the result of the morphological analysis is outputted to the parsing section I 10 (1205).

Figure 5:
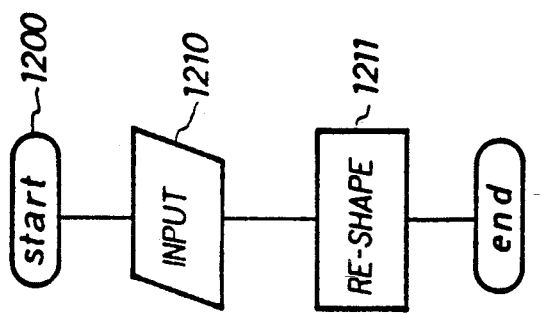

In the input processing 1200, the data are at first read from the input document file 1102 or input device 1100 into the input character array buffer of the input interface 1104 (1210, refer to FIG. 5). The data for the input character array are inputted in the form, for example, of ASCII and, when data in the file are fully read (for example, the symbol EOF is read), the processing section 1106 writes NULL code into the input character array buffer as the final position.

Then, the processing section 1106 re-shapes the input character array (1211). For instance, if two or more of characters belonging to space-corresponding character are continued, they are correctively arranged into a single vacant character. The space-corresponding character includes vacant character (represented by the symbol "␣"), tab, line return (represented by the symbol "↵"), etc. Further, those space-corresponding characters between the top and the first appearing character other than the space corresponding character in the input character array buffer is eliminated.

Figure 6:
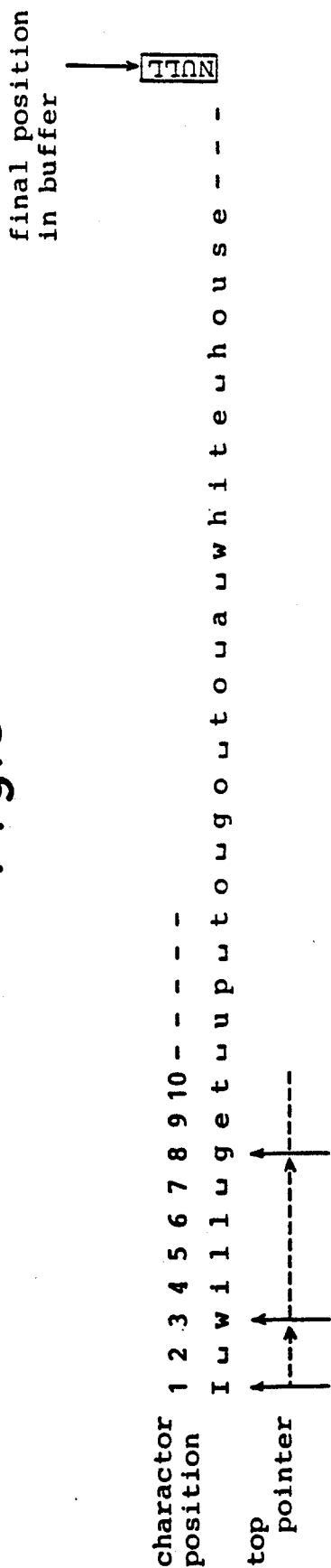

For instance, the input character array "␣␣I␣ will␣ ␣get␣up↵ to␣go␣to␣a␣white␣house␣ . . . " is reshaped as shown in FIG. 6 into "I␣will␣get␣ up␣to␣go␣to␣a␣white␣house␣ . . . (NULL)". The position of the symbol (NULL) indicates the final position of the buffer.

The dictionary reference delimiters used for the cut out processing 1201 of the dictionary reference unit are disposed at the position of alphabetical character, numerical character, apostrophy, and other characters than hyphen and period, as well as apostrophy succeeding to vacant characters. The processing section 1106 has a top pointer for dictionary reference, which is at first set to the top of the buffer.

Figure 7:
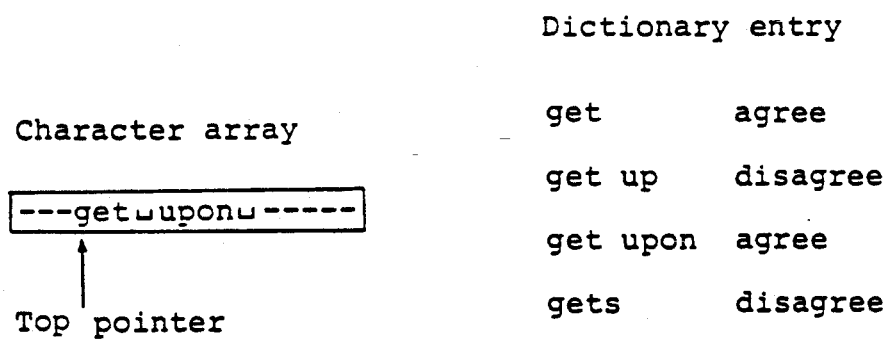

Then, the dictionary retrieving section 1108 retrieve the dictionary file 1018 attached with the highest preference flag using the character array from the character indicated by the top pointer to the character preceeding to the next delimiter as the retrieve key character array. The dictionary entry and the retrieve key character array are compared and, if both of them are identical, the dictionary information is intaken (1203). The agreement is judged when the entire character array of the dictionary entry agrees with at least a portion of the character array starting from the top end and if the portion just after the part is a dictionary reference delimiter, apostrophy or period. For example, as shown in FIG. 7, if the top pointer indicates the top character "g" in the retrieve key character array "get␣upon␣", "get" and "get upon" of the dictionary entry agree with this.

The retrieved dictionary information is stored in the retrieved dictionary information buffer 1120 of the processing section 1106. Together with the reading, the agreed starting position and the ending position of the character array are stored. This specifies the position of the characters in the input buffer orderly from the top. An accumulation region for the active information is disposed in the retrieved dictionary information buffer 1120, which is an information indicating whether the retrieved dictionary information is effective or not for the subsequent processing, all of which are set to "1" at this step.

Subsequently, the top pointer is up-dated on every dictionary reference and it is set to the character just after the delimiter appearing nest to the present top pointer viewing the character array from the left to the right. The dictionary reference is thus conducted successively. In the example mentioned above, the character at the top of the dictionary reference unit is indicated in the manner as "I" for "I" at first, then "w" for "will" and then "g" for "get". When the top pointer passes the NULL code, it is judged to be at the final position (1202).

FIG. 9 shows an example of the dictionary information retrieved in this way for the example of the inputted English character array described above.

Figure 8D:
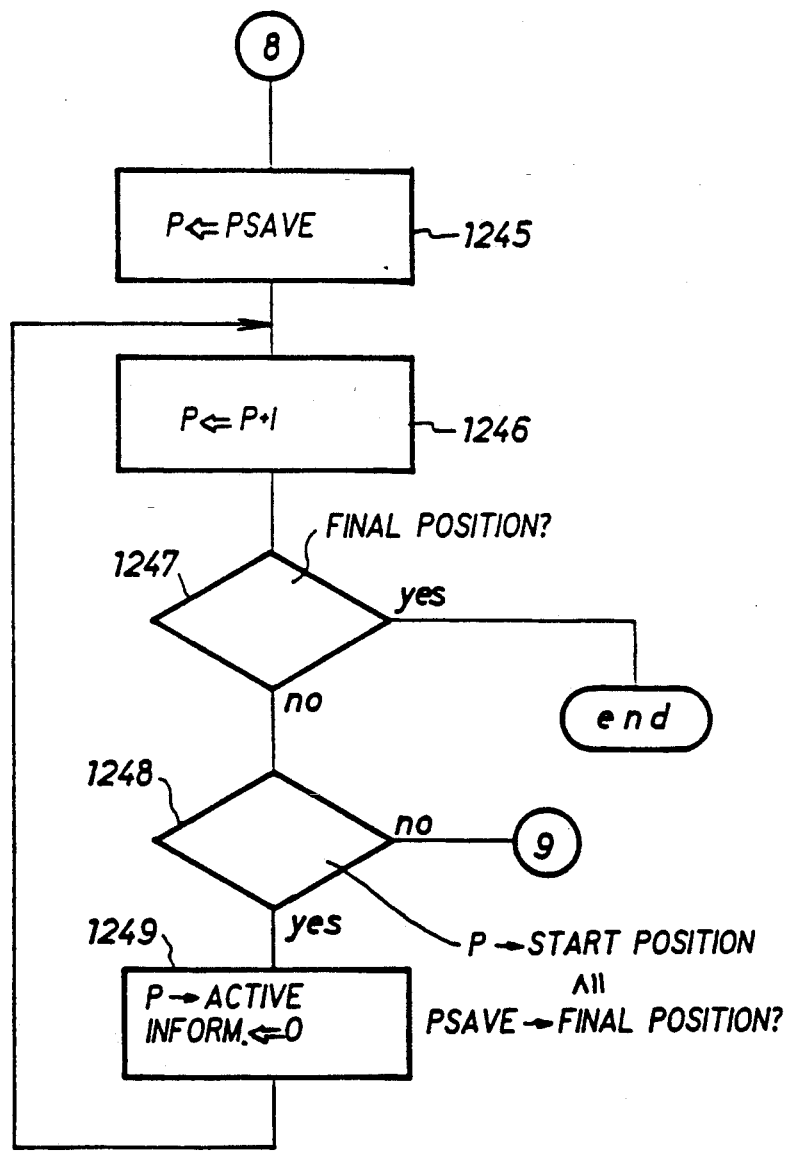

Explanation will be made to the contradiction elimination processing 1204 conducted by the contradiction elimination rule processing section 110 while referring to the contradiction elimination rule file for most preference file 1036 in conjunction with FIGS. 8A through 8D. The flow shown in FIGS. 8A and 8B illustrates the processing in a case where the positions for the words where the highest preference flags are set are overlapped with each other, while the flow in FIGS. 8C and 8D illustrates the processing of eliminating the parsing unit, that is, elements by the highest preference flag, that is, a processing for rendering the active information into "0". In these flow charts, the reference "<=" represents substitution, "→" represents reference and "P→x" represents the content of x possessed by the entry of the pointer p respectively.

At first, a set of words each with the highest preference flag being "1" and the position in the sentence are overlapped with each other are detected (steps 1220–1223). Then, the highest preference flag elimination rule is applied to each of the detected sets, and those effective among them are selected (steps 1224–1235).

For instance, in the embodiment as described above, the highest preference flag "1" is or set at "get up" at the starting position "8" and the end position "13" and at "up to" at the beginning position "12" and the end position "16" for the character array "get⌴up⌴to" as shown in FIG. 9 and the positions for the characters are overlapped with each other. Then, the rule (1) as described above is at first applied and judged as to whether it is a verb or not while referring to the part of speech of the preserve pointer psave and the part of speech of the pointer p (1224). In this example, since it corresponds to a verb, the combination of "get up" is selected.

If the rule (1) is not satisfied, the rule (2) is applied (1228) and the length (lens) for the character array referring to the entry of the preservation pointer psave and the length len for the character array referring to the entry of the pointer p are compared with each other. Further, if the rule (2) is neither satisfied, the rule (3) is applied (1229) and the position start referring to the starting position for the preservation pointer psave and the position start referring to the starting position of the pointer p are compared.

Then, when any one of the contradiction elimination rules (1)–(3) is satisfied when applied in this order, the active information of not-satisfied, that is, not effective entry is rendered to "0" (1232), while other, that is, the active information of other, that is, effective entry is left as it is to "1" (1231). Such an application of the contradiction elimination rule is successively executed while advancing to the pointer p stepwise (1234, 1235) up to the final position for each of the entries successively, and the active information is rendered "1" only for the effective entry. The state of the above-mentioned example is shown in FIG. 10. For example, for the entry "up to", its active information is rendered "0".

Then, those overlapping, even partially, for the position with the combination in which both of the active information and the highest preference flag "1" are detected (1236–1241), and their active information is rendered to "0" (1242, 1249). Application of such a contradiction elimination rule is executed orderly for each of the entries while advancing the pointer p stepwise (1243, 1248) to the final position and the active information of not effective entry is rendered to "0". Thus, the active information for "get" and "up" is rendered "0", for example, for the entry "get up" (FIG. 10). For the entry "white", "white house" and "house", since all of the highest preference flags are "0" even if the positions are overlapped, their active informations are maintained at "1".

In this way, when the processing has been conducted just before the final position (NULL), the content of the input buffer of the input interface 1104 and the retrieved dictionary information buffer 1120 are outputted from the output interface 1114 to the parsing section I 1016. The content of the retrieved dictionary information buffer 1120 is outputted only for the entry for which "1" is indicated for the active information. For example, the content of the input buffer may be written to the parsing input file 1116, while the content of the retrieved dictionary information buffer 1120 may be written to the parsing dictionary information file 1118. In this case, since both of the active information and the highest preference flag are also outputted, the structure of the parsing dictionary information file 1118 is identical with that of the retrieved dictionary information buffer. It may also be so constituted that the active information and the highest preference flag are not outputted.

The present invention will be described specifically retrieving to the second embodiment.

Figure 11:
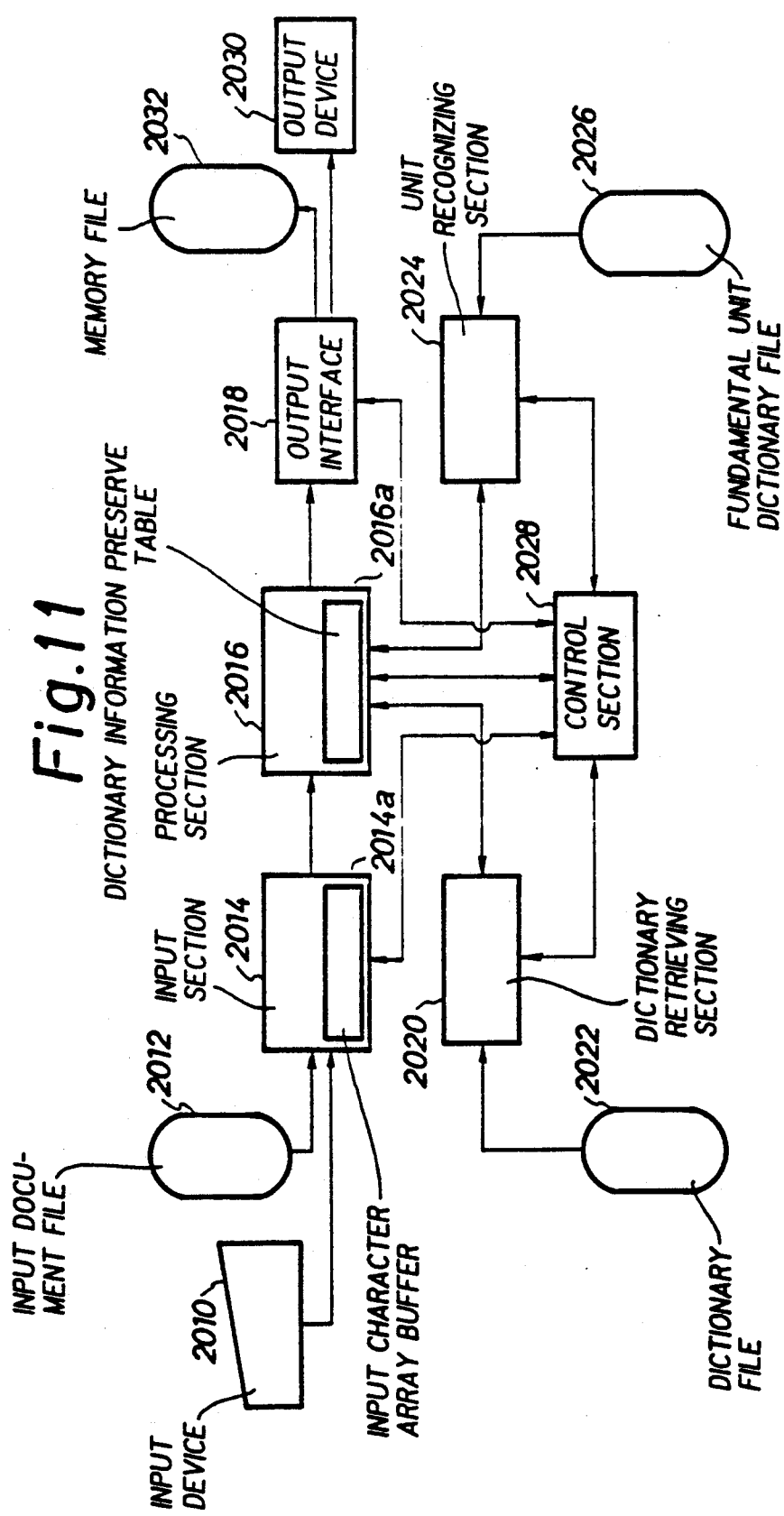

FIG. 11 illustrates the second embodiment of the language analyzer according to the present invention applied to an English-Japanese automatic translation device.

This embodiment has an input section 2014, to which data are inputted from an input device 2010 or an input document file 2012. The input device 2010 includes, for example, a key board having character keys such as alpha/numerical keys or function keys, and optical character reading device for reading an English text recorded on paper. The input document file 2012 is a memory device having the English text recorded on a memory medium such as a magnetic disc.

The input section 2014 comprises an input character array buffer 2014a and stores the input English sentence inputted from the input device 2010 or the input document file 2012 into the input character array buffer 2014a. The input section 2014 reads out the input sentence stored in the input character array buffer 2014a and outputs it to a processing section 2016.

The processing section 2016 is a functional section conducting the morphological analysis for the inputted sentence sent from the input section 2014 by retrieving a dictionary file. The processing section 2016 comprises a dictionary information preserve table 2016a and stores the information obtained by retrieving a dictionary file 2022 or a fundamental unit dictionary file 2026 described later into a dictionary information preserve table 2016a.

The processing section 2016 retrieves a retrieve key character array as a unit in the case of retrieving the dictionary from the character array constituting the input sentence inputted from the input section 2014. The retrieve key character array is retrieved orderly from the first character of the character array constituting the input sentence in accordance with a predetermined retrieving rule. For instance, the input sentence is divided from the top of the sentence orderly by means of delimiters, for example, space, comma, etc. and divided character arrays are respectively used as the retrieve key character array. In this case, character arrays expressing units such as m, km, m/s are respectively formed as retrieve key character array. The processing section 2016 sends the retrieve key character array retrieved from the character array constituting the input sentence to the dictionary retrieving section 2020.

The dictionary retrieving section 2020 retrieves a dictionary file 2022 based on the retrieve character arrays sent from the processing section 2016. In the dictionary file 2022, entry and grammatical information such as part of speech are stored as shown in FIG. 12. If there is an entry in the dictionary file 2022, the dictionary retrieving section 2020 reads out the part of speech information, etc. of that entry and output them to the processing section 2016. If there is no entry in the dictionary file 2022 as a result of retrieving the dictionary file 2022, the dictionary retrieving section 2020 outputs the situation to the processing section 2016.

The processing section 2016 stores the part of speech information, etc. retrieved by the dictionary retrieving section 2020 into a dictionary information preserve table 2016a. If there is no entry for the retrieve key character array in the dictionary file 2022, the processing section 2016 outputs the retrieve key character array to a unit recognizing section 2024.

The unit recognizing section 2024 retrieves a fundamental unit dictionary file 2026 based on the retrieve key character array sent from the processing section 2016. The fundamental unit entries are stored in the fundamental unit dictionary file 2026 as shown in FIG. 13. If the fundamental unit entry is present in the fundamental unit dictionary file 2026, the unit recognizing section 2024 reads out the fundamental unit entry. If there is no entry in the fundamental unit dictionary file 2026, the retrieve key character array is divided into a plurality of character arrays as described later and the fundamental unit dictionary file 2026 is retrieved for several times. Then, if the fundamental unit entries are present respectively upon several times of retrieval in the fundamental unit dictionary file 2026, a plurality of unit informations are obtained from the fundamental unit entries. If there is no fundamental unit entry in any one of the plural retrieval, an information indicating that it is not registered in the dictionary is obtained.

The unit recognizing section 2024 outputs the fundamental unit entry, composite unit information and information indicating that the word is not registered in the dictionary to the processing section 2016. The processing section 2016 stores these informations inputted from the unit recognizing section 2024 into the dictionary information preserve table 2016a. The dictionary information preserve table 2016a stores to preserve the entry for the retrieve key character arrays and grammatical information such as part of speech obtained by retrieving the dictionary file 2022 or the fundamental unit dictionary file 2026 regarding the retrieve key character array. After the data have been stored in the dictionary information preserve table 2016a, the processing section 2016 outputs these data together with the inputted sentence to the output interface 2018. The output interface 2018 outputs the input sentence and the data for the morphological analysis outputted from the processing section 2016 to an output device 2030 such as a printer or display, or a memory file 2032 such as a magnetic disc.

Alternatively, it is possible to input the input sentence and the data of the morphological analysis outputted from the processing section 2016 directly into a parsing means (not illustrated) to conduct parsing for the input sentence in the parsing means and, further, prepare a translated sentence based on the parsing.

The control section 2028 is for controlling the operation of each of the functional sections in the present device and can be constituted advantageously by a microprocessor.

Figure 15:
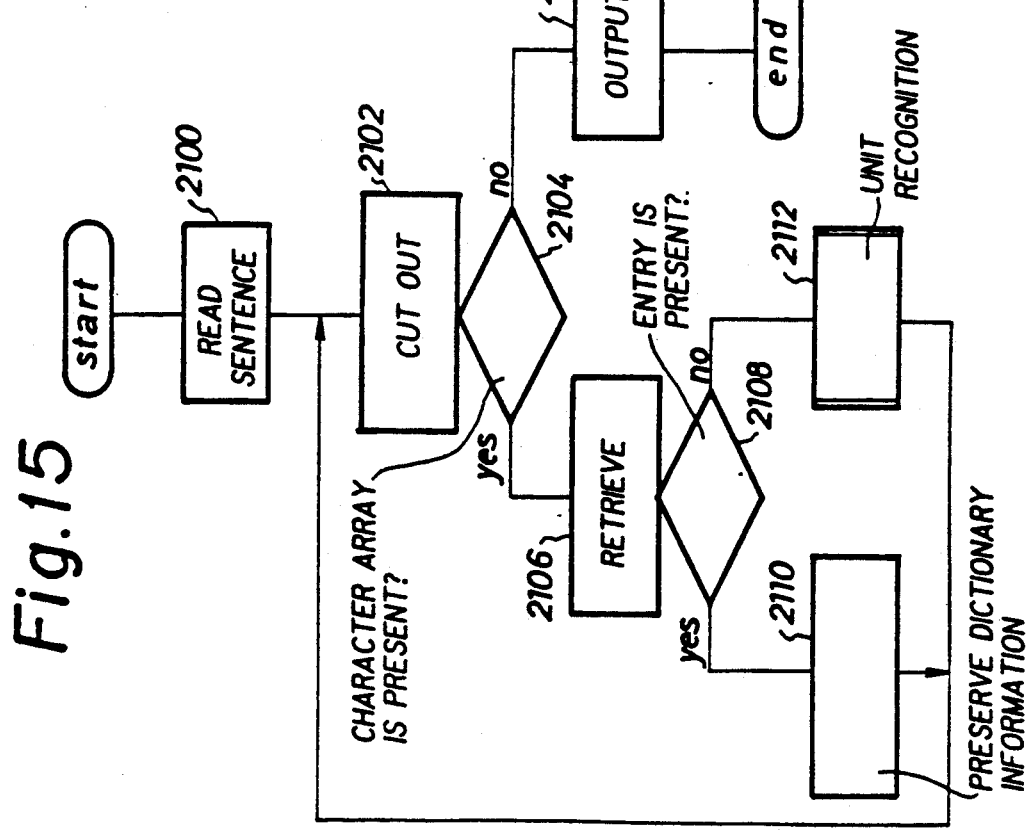

The operation of the present device will be explained referring to the flow chart shown in FIG. 15.

At first, the input English sentence is read from the input device 2010 or input document file 2012 into the input section 2014 (2100). The input sentence read into the input section 20i4 is stored in the input character array buffer 2014a. The input sentence stored in the input character array buffer 2014a is then read out and outputted to the processing section 2016.

In the processing section 2016, when the input sentence is inputted, the dictionary retrieving unit is cut-out (2102). That is, the character array constituting the input sentence is divided by a predetermined rule into retrieve key character array as the units of retrieving the dictionary file 2022 or the fundamental unit dictionary file 2026 successively from the top of the character array. Then, it is judged whether the divided retrieve character array is present or not (2104) and, if it is present, the retrieve key character array is sent to the dictionary retrieving section 2020.

When the retrieve key character array is sent to the dictionary retrieving section 2020, the dictionary retrieving section 2020 retrieves the dictionary file 2022 for the retrieve key character array (2106). It is judged whether the retrieve key character array is present or not in the entry of the dictionary file 2022 as shown in FIG. 12 and, if the entry is present, grammatical information such as a part of speech stored in the dictionary file 2022 is read out and the read out data are sent to the processing section 2016 and stored in the dictionary information preserve table 2016a (2110). Then, the flow is returned to the step 2102 and the dictionary retrieving unit is cut-out again.

If there is no entry in the dictionary file 2022, the dictionary retrieving section 2020 sends back the retrieve key character array to the processing section 2016, and the processing section 2016 sends the retrieve key character array to the unit recognizing section 2024, where the unit recognition is conducted (2112).

In a case where the retrieve key character array sent to the dictionary retrieving section 2020 is usual words such as nouns and verbs, since there are entries for most of them in the dictionary file 2022, grammatical information such as a part of speech is read out from the dictionary file 2022 and the data are sent to the processing section 2016 and recorded in the dictionary information preserve table 2016a. As described above, entries for usual words such as nouns and verbs are formed but no entry are formed for the character array expressing the units in the dictionary file 2022. Accordingly, in a case where the retrieve key character array is a character array expressing the unit such as kg or m/s, since there is no entry in the dictionary file 2022, the flow is advanced to the step 2112 for unit recognition.

Figure 16:
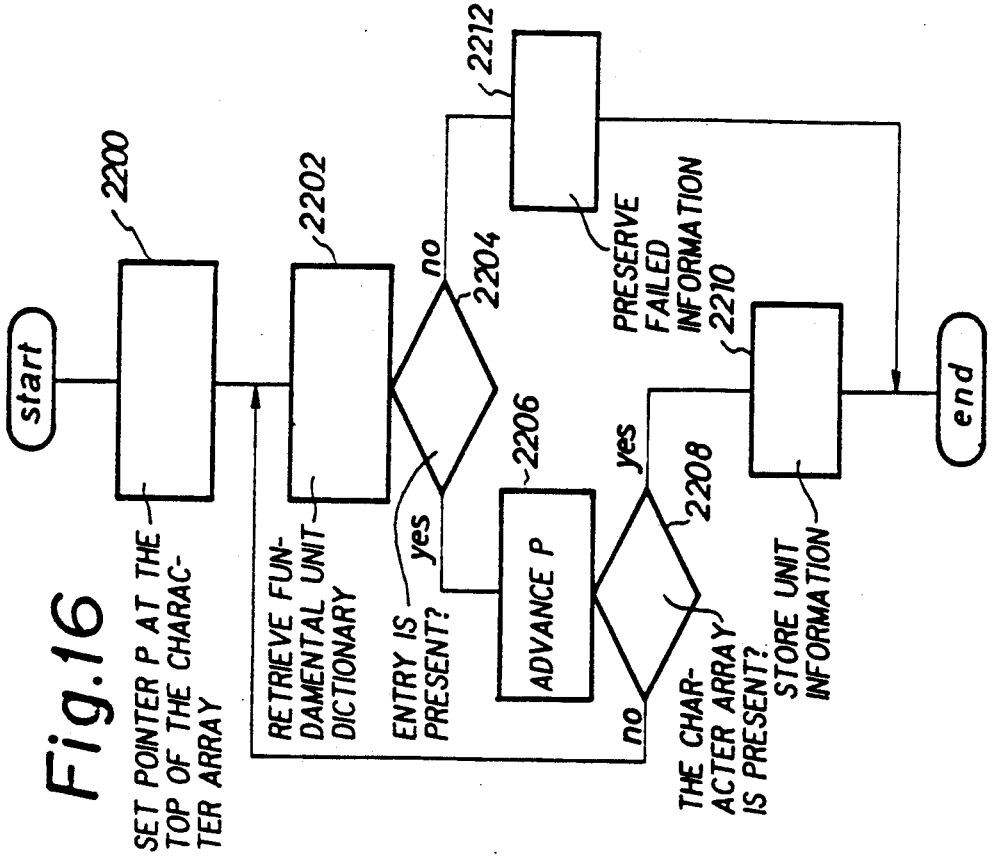

The unit recognizing operation in the step 2112 will be explained referring to FIG. 16.

When the retrieve key character array, for which no entry is present in the dictionary file 2022 upon retrieval of the dictionary file 2022, is sent from the processing section 2016 to the unit recognizing section 2024, the pointer P is set to the character at the top of the retrieve key character array in the unit recognizing section 2024 (2200).

Then, the unit recognizing section 2024 retrieves the basic unit dictionary file 2026 for the character array starting from the character at which the pointer P is set (2201). In this retrieval, it is judged as to whether the fundamental unit for which the entry is present in the fundamental unit dictionary file 2026 appears as a complete character array in the character array starting from the character to which the pointer P is set or not and whether it is started from the character at which the pointer P is set or not. Namely, it is retrieved as to whether a character array comprising one or plurality of characters starting from the character at which the pointer P is set agrees with any one of the fundamental units for which the entry is present in the fundamental unit dictionary file 2026 or not. For instance, in a case where the characters to which the pointer P is set are k, m, s, etc., entries are present in the fundamental unit dictionary file 2026 for these individual characters starting from the character to which the pointer P is set as shown in FIG. 13.

The unit recognizing section 2024 judges as to if the entries is present or not in the fundamental unit dictionary file 2026 as a result of the retrieval to the fundamental unit dictionary file 2026 (2204) and, if the entry is present, advances the pointer P by the length of the recognized fundamental unit (2208). Accordingly, in the case where the fundamental unit is k, m, s, etc., the pointer P is advanced by one character and then set to the next character in the retrieve key character array.

The unit recognizing section 2024 judges as to whether a character array starting from the character to which the pointer P is set is further present or not (2208). In a case where the such a character array is further present, the flow is returned to the step 2202, where the fundamental unit dictionary file 2026 is retrieved again for the character array starting from the character to which the pointer P is set. Then, the section judges, as to whether the entry is present or not in the fundamental unit (2204) as a result of the retrieval to the fundamental unit dictionary file 2026 and, if the entry is present, advances the pointer P by the length of the recognized fundamental unit.

In the step 2208, if the character array starting from the character to which the pointer P is set is present no more, retrieval to the fundamental unit dictionary file 2026 has been ended, that is, recognition for the composite unit has been succeeded.

For instance, in a case where the retrieve key character array sent to the unit recognizing section 2024 is km/s representing the unit, the entry is not present in the fundamental unit dictionary file 2026 since km/s per se is a complicate unit. Then, the pointer P is at first set to k (2200) and k is retrieved from the fundamental unit dictionary file 2026 to confirm the presence of the entry (2202).

Then, the pointer P is set to m (2206) and m is retrieved from the fundamental unit dictionary file 2026 (2202) to confirm the presence of the entry in the same manner. Since the unit recognizing section 2024 regards slash (/) solid circle (.) etc. as a part of a unit, the pointer P is next set to s skipping over "/" in km/s (2206). Then, s is retrieved from the fundamental unit dictionary file 2026 to confirm the presence of the entry in the same manner (2202). As a result, since he is present for each of k, m and s in the retrieval to the fundamental unit dictionary file 2026, it is judged that km/s is a character array expressing a unit. In this way, in a case where entries are present in the fundamental unit dictionary file 2026 for all of the characters constituting the retrieve key character array, or in a case where entries are present in the fundamental unit dictionary file 2026 for all of the characters excepting those symbols such as slash, and solid circle, etc. that are regarded as a part of the unit, it is judged that the retrieve key character array is a character array that expresses the unit.

When the unit recognizing section 2024 has completed the retrieval to the fundamental unit dictionary file 2026 and succeeded in the recognition for the composite unit, it sends the thus obtained unit information to the processing section 2016, which is stored in the dictionary information preserve table 2016a (2210). The unit recognition has thus been completed.

In the step 2204, if no entry is present in the fundamental unit dictionary file 2026 as a result of the retrieval to the fundamental unit dictionary file 2026 for the character array starting from the character to which the pointer P is set, this means that the character array can not be recognized as a fundamental unit or composite unit. Therefore, the unit recognizing section 2024, sends the information indicating that the character array is a word not registered in the dictionary, i.e, an information indicating that the word does not express the unit, back to the processing section 2016, which is preserved in the dictionary in formation preserve 2016a of the processing section 2016, thereby completing the unit recognition.

Now referring again to FIG. 15, when the unit recognition (2112) has been ended, the flow is returned to the step 2101 and the cut-out of the dictionary reference unit is again conducted by the processing section 2016.

After cutting-out the dictionary reference unit, the processing section 2016 judges as to whether the cut-out unit is still present or not (2104) and, if the cut-out unit, i.e., a retrieve key character array is no more present, it outputs the information stored in the dictionary information preserve table 2016a to the output device by way of the output interface 2018 (2114). The parsing for the input sentence has thus been completed.

As has been described above according to this embodiment, the input English sentence is divided into retrieve key character arrays and retrieved from an ordinary dictionary file 2022 at first and, if there is no entry in the dictionary file 2022, unit recognition is conducted. In the unit recognition, the retrieve key character array is divided and indicated by the pointer P and the fundamental unit dictionary file 2026 is retrieved on every divided character arrays. Then, those recorded in the fundamental unit dictionary file 2026, or those composed of a succession of arrays recorded in the fundamental unit dictionary file 2026 are judged to be character arrays expressing units.

Accordingly, since it is possible to conduct unit recognition even for the character array expressing a complicate unit by combining fundamental units stored in the fundamental unit dictionary file 2026, parsing can be conducted corresponding to versatile expression of units. In addition, since it is only necessary that the fundamental unit dictionary file 2026 stores fundamental units, for example, k, m, s,—etc. and complicate units composed of the combination of them, for example, km, km/s, etc. are not required to be stored, the capacity of the dictionary file can be reduced.

The third embodiment of the present invention will be explained.

Figure 18:
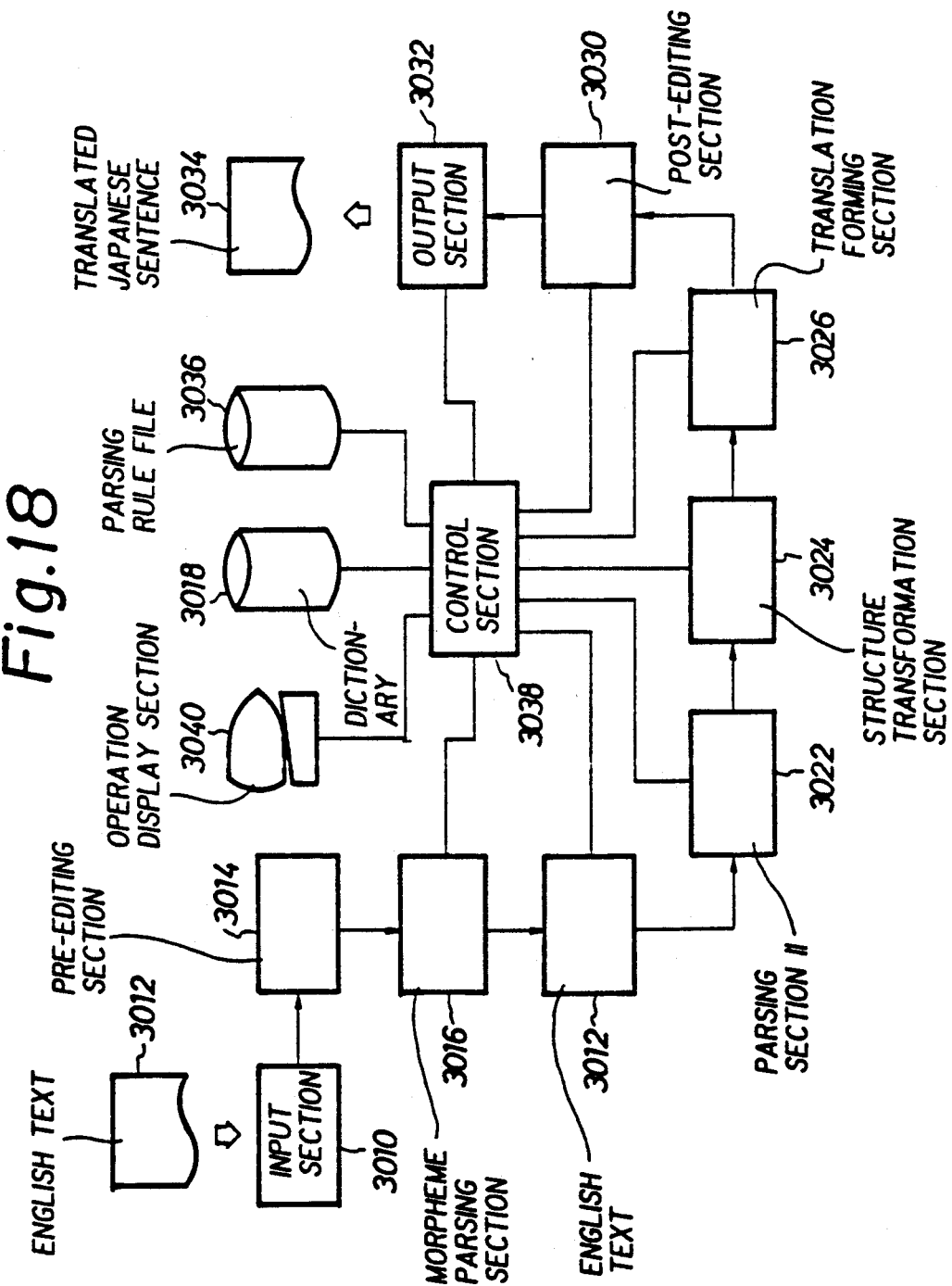

FIG. 18 illustrates the entire structure of the third embodiment in which the language analyzer according to the present invention is applied to an English-Japanese automatic translation device.

This embodiment comprises an input section 3010, by which an English text 3012 to be translated into Japanese is inputted. The input section 3010 may include, for example, a key board having character keys such as alpha numerical keys or function keys, an optical character reader (OCR) for reading the English text recorded on paper and/or a file memory device for reading the English text recorded in the memory medium such as a magnetic disc.

The English text inputted from the input section 3010 is read into a pre-editing section 3014 where pretreatment for the translation is conducted. In this case, recognition for the sentence and the processing for unknown words are mainly conducted. It functions as a part of morphological analysis.

The English data after the pre-edition are transferred together with the information obtained in the pre-edition to a morphological analysis section 3016. The morphological analysis section 316 analyzes the morphemes of the English sentence while dividing it by retrieving a word dictionary 3018, conduct various arrangement such as processing for unknown words, proper noun, expression for time, numerals, etc. and conducts the processing for the entire sentence such as recognition of tag question, and apposition recognition. The morphological analysis rules are stored in a parsing rule file 3036.

The English data after the morphological analysis are transferred together with the dictionary information obtained by the morphological analysis to a parsing section I 3020. The parsing section I 3020 is a functional section that analyzes the surface layer structure for the sentence by applying a grammatical rule to the English data and finds out all of the possibilities in view of the structure.

The English data subjected to the parsing in the parsing section I 3020 are transferred together with the parsed information to a parsing section II 3022. In this section, a solution is selected by applying a structural description based on the result of the parsing in view of the surface layer structure by the syntactic analysis I, by which a plausible parsing tree for the English sentence is prepared to form the structure thereof. These parsing rules are also stored in the parsing rule file 3036.

The English data subjected to the parsing are transferred as the data for the parsing tree to a structure transformation section 3024. The structure transformation section 3024 prepares a structure tree of a corresponding Japanese sentence from the structure tree which is an intermediate structure of the English sentence to transform the Japanese sentence into a Japanese-underlying structure from which a Japanese sentence can easily be translated.

The structure tree data indicating the Japanese underlying structure thus transformed are sent to a translation forming section 3026, where the translated sentence is formed. This is a functional section of forming a Japanese sentence from the structure of the Japanese sentence structure tree.

The Japanese sentence data prepared as a translated sentence, that is, translated data are sent to a postediting section 3030. The post-editing section 3030 modifies the translation data retrieving a dictionary 3018 by using information utilized in the translation processing to complete a more natural Japanese sentence. The data for the Japanese sentence are transferred to an output section 3032 and outputted therefrom as a translated Japanese sentence 3034. The output section 3032 includes, for example, a printer, a display and/or file memory device such as a magnetic disc.

The flow of a series of translation processings is controlled by a control section 3038 that governs the control for the entire device.

The word dictionary 3018 stores therein dictionary data for English and Japanese words in this embodiment, in which various informations are described such as connective relationships, i.e., co-existent relationships, meanings, plural or singular form, part of speech, etc. in addition to vocabularies. Further, the parsing rule file 3036 stores therein rule data for the morphological analysis and syntactic analysis.

The control section 3038 is connected with an operation display section 3040. The operation display section 3040 includes, for example, operation keys such as translation indication key or cursor key, for giving various instructions from the operator to the present device a display or indicator visually indicating the inputted English text, Japanese sentence as a result of a translation, intermediate data such as dictionary information, etc. as well as various indications to the operator. Many of these operation indicating functions may be so constituted as to be included in a key board if it is disposed to the input section 3010 or to a display if it is disposed to the output section 3032.

Figure 17:
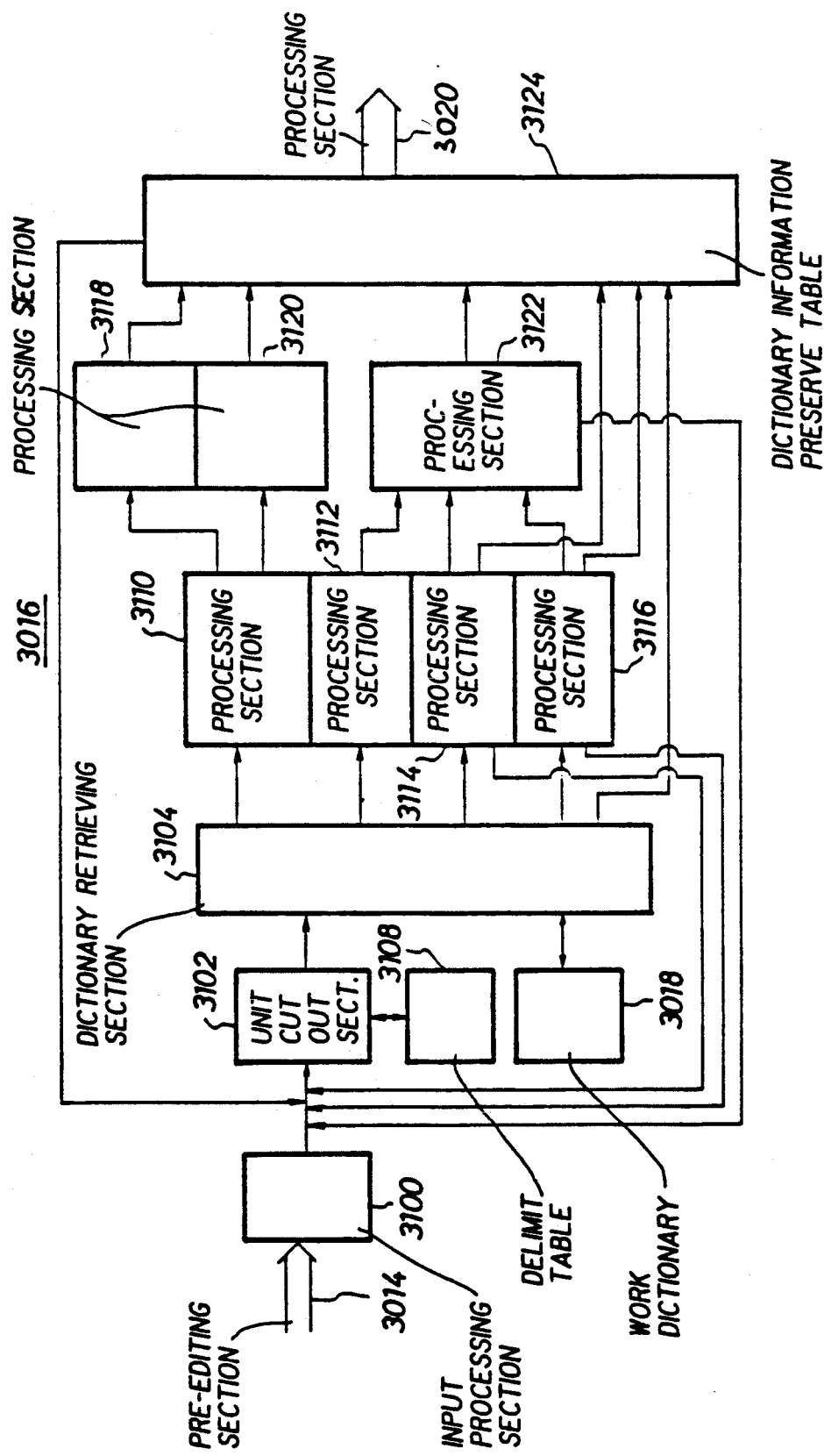

Referring to FIG. 17, an example of detailed structures for the processing of numbers in the morphological analysis section 3016 is shown. The morphological analysis section 3016 of course comprises other parsing functional section, but those portions in direct concern with the understanding of the present invention are illustrated here. The morphological analysis is conducted by instructing the dictionary retrieval from the top of the input character array successively in accordance with the character array of retrieve key and executing the processing for the dictionary information obtained from the dictionary retrieving section 3104 according to a numeral flag described later.

The morphological analysis section 3016 comprises an input processing section 3100 for receiving and processing the data for the input character array from the preprocessing section 3014. The input processing section 3100 is disposed with an input character array buffer that receives the input of English character array data in the form of a code data, for example, ASCII and temporarily stores the character array data.

The input character array data temporarily stored in the input processing section 3100 are sent to a unit cut-out section 3102 that cut-outs the input character array data into dictionary retrieving unit such as words. The unit cut-out section 3102 is a functional section for distinguishing the dictionary reference units that constitute a retrieve key character array upon retrieving the dictionary 3018 in the dictionary retrieving section 3104 subsequently. The dictionary referring delimiter used for cutting-out the dictionary reference unit is disposed at a position of an English character, numerical character, apostrophy, character other than hyphen and period, as well as apostrophy succeeding to a vacant character. This is stored in a delimit table 3108 and referred to upon cutting-out the dictionary reference unit in the unit cutout section 3102.

The word dictionary 3018 contains therein, particularly, information for retrieving the cut-out unit. As shown by the example of the entry information in FIG. 24, there are stored for the entry for each of dictionary reference units, e.g., words, grammatical information such as a part of speech, as well as, distinguishing indication showing that a word represents a numeral, i.e., a numeral flag and a numeral value information indicating the numeral value for a numeral-indicating word.

As illustrated in the figure, both of singular and plural forms are described together for each of the entries in the word dictionary 3018 and each of them constitutes one entry.

The numeral flag indicates that a word means a number when "1" is set up therefor. As other information, there are registered, for example, countability and incountability for a noun, identification for transitive or intransitive verb, translated words, etc. Referring, for example, to "thousand", since it is a noun representing a numeral, the numeral flag therefor is "1" and the numeral value is "1000". Further, referring to "thread", since it is a noun but not a noun indicating a number, i.e., a number, the numeral flag is registered as "0".

Recognition for the number is conducted by the numeral flag therefor in case it is a word registered in the dictionary 3018, for example, as "one" or "thousand". Even those of not-registered words, for example, a succession of numeral characters such as "123", two sets of successions of numerals having a "period" therebetween such as a small number, for example, "10.2" and those succession of numerical characters having a comma therebetween, for example, "1,000,000" are also recognized as numbers. In the present specification, the term "numerical character" usually includes not only arabic figures but also spelled out numeral expression such as "thirteen".

As shown in FIG. 28, the dictionary 3018 comprises a currency symbol table 3018a where various symbols for currency are registered, notation symbol table 3018b where notation symbols ",", "." "(space)" are registered and decimal point table 3018c where decimal point ". etc. are registered. The tables for the notation symbols or decimal points are disposed, because "," is used for the notation symbol or "." is used for the decimal point in Japanese or English, whereas space or "." is mainly used for the notation symbol and "," is used for the decimal point in other European languages such as French or Germany and, thus, the usage for symbols are different between languages to be processed.

The dictionary retrieving section 3104 is a functional section that cuts-outs the dictionary information by retrieving the work dictionary 3018 based on the retrieve character array inputted from the unit cut-out section 3102 and transfers the same to the processing sections 3110, 31i2, and 3116.

Arrangement for the succession of numerical characters are conducted by the following two treatment. At first, if words are recognized as a numeral as described above, when the next dictionary reference unit is referred and it is also recognized as a numeral, they are collectively arranged to synthesize into a one numeral. The operation is repeated as long as numerals are succeeded. For example, "30 thousand" is formed into "30000" and "1.5 million" into "1500000". Then, when the numeral expression is further continued while putting "and" therebetween, if all of the digits at the left of "and" that correspond to each of the digits of numerical values indicated by the pointer at the right of "and" are "0" in view of the meaning of the numerical expression, they are synthesized into one numeral. For example, "one hundred and thirty" is synthesized into "130", while "30 thousand and two hundred" is synthesized into "30200".

After such a recognition for the numeral, a necessary local parsing is further conducted. In this processing, a series of parsing units actuated by the morpheme actuation information for each of the parsing units is collectively arranged into a single parsing unit based on a local analysing rule. For example, a currency symbol and a numerical value "Y1,000" are collectively arranged as "1000 yen", and a numerical value and a unit "1.5km" is collectively arranged as "1.5 kilometer".

These arrangements are conducted in the processing sections 3110-3122. The processing section 3110 is a functional section for collectively arranging a number together with a currency symbol or a unit. The processing section 3112 is a functional section conducting the numerization for the number. Further, the processing section 3114 is a functional section for processing numbers connected by a hyphen. Furthermore, the processing section 3116 is a functional section for processing succeeding numerical characters.

Referring to the number after the arrangement with a currency symbol or a unit, the arrangement between the currency symbol and the numerical value into a single noun is conducted in the processing section 3118. Further, the arrangement between the unit and the numeral value into a single noun is conducted in the processing section 3120. Furthermore, in the case of a number subjected to processing for numerization, hyphen attached number and for continuous number, processing for arranging with the preceeding numerical value is conducted in the processing section 3122. The dictionary information for the inputted character array completed with such processing is stored in the sorted dictionary information buffer, that is, the dictionary information preserve table 3124.

The results of the morphological analysis are transferred from the dictionary information preserve table 3124 to the parsing section I 3020.

Figure 19B:
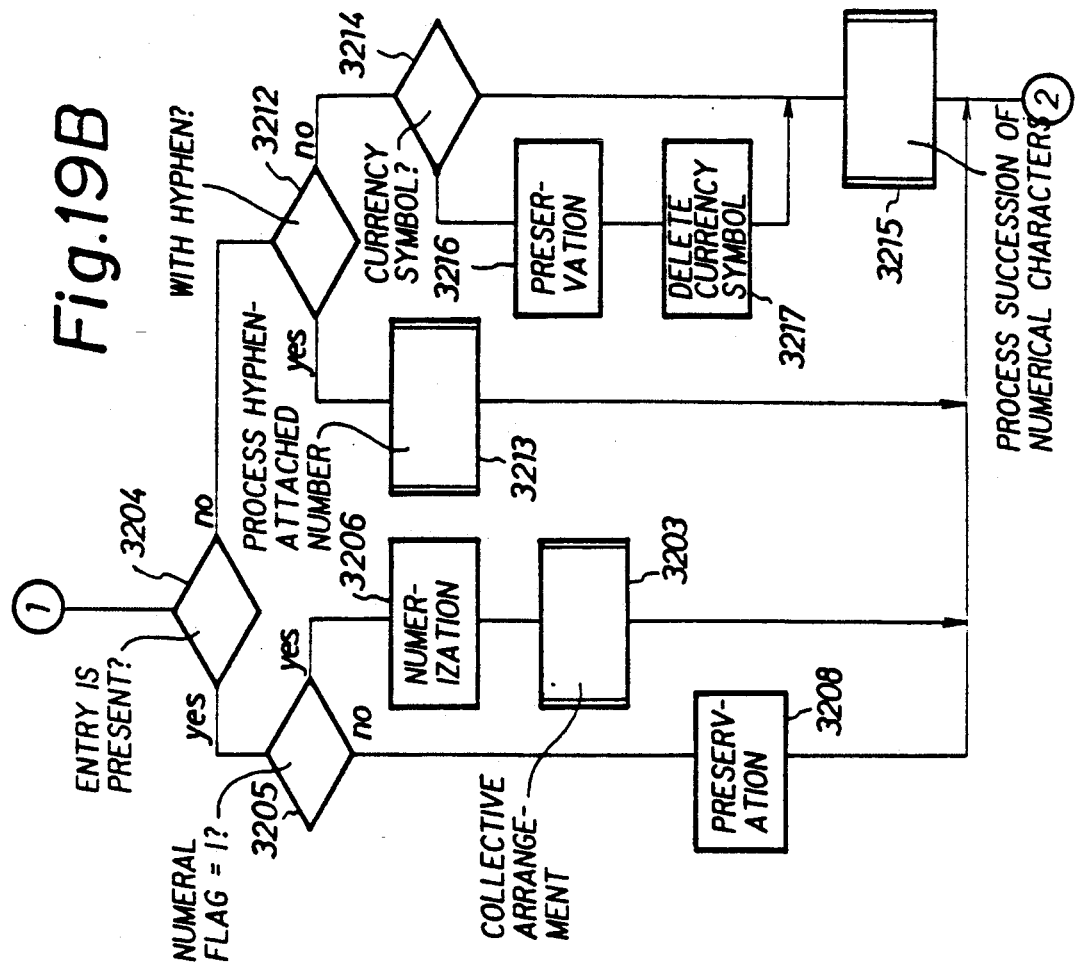
FIGS. 19A and 19B are flow charts illustrating an example of morphological analysis.
Figure 19A:
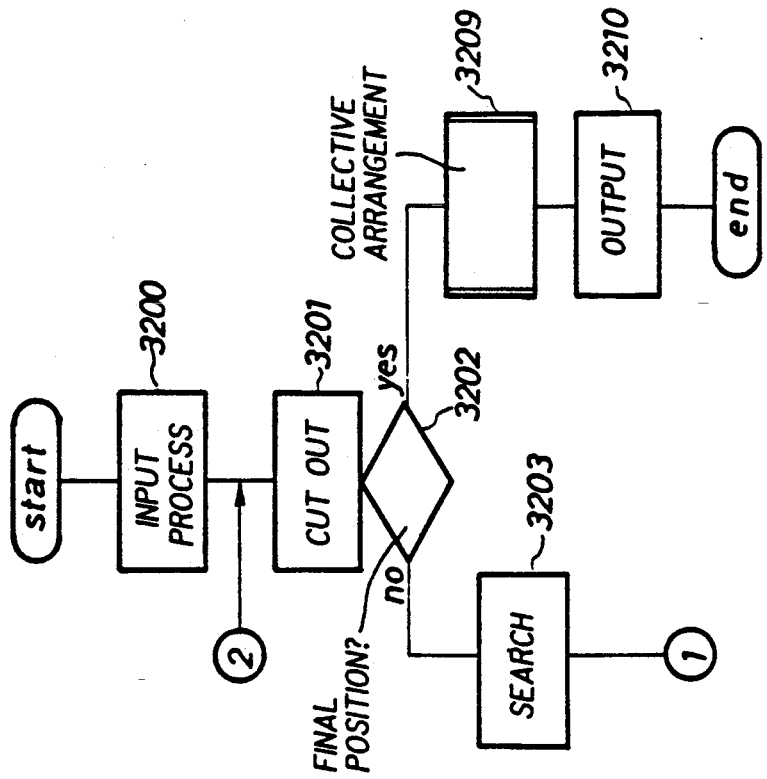

Processing by the numerical flag is executed in the sequence as shown in FIGS. 19A and 19B. The data for the input character array are received at the input processing section 3100 where input processing is conducted (3200). Then, the unit cut-out section 3102 cuts-out the input character array into dictionary reference units for retrieving the dictionary 3018 (3201). The dictionary retrieving section 3104 searches the dictionary 3018 in accordance therewith (3203) and, if there is a dictionary entry (3204), examines the numeral flag (3205). If the numeral flag is not set up, since the word is not a number, the dictionary information is accumulated in the dictionary information preserve table 3124. If "1" is set up for the numeral flag, the number is numerized in the processing section 3112 (3206) and the collective arrangement 3207 with the preceeding numerical value is conducted in the processing section 3122. When these processings are conducted to the final position of a sentence indicated by the input character array data (3202), collective arrangement (3209) between the currency symbol or the unit is conducted in the processing sections 3118, 3120, and the result of the morphological analysis is outputted to the syntactic analysis section I 3020 (3210).

As a result of the dictionary reference, where there is no entry in the step 3204 and, if the element is attached with hyphen (3212), processing for hyphen-attached number (3213) is conducted in the processing section 31i4. If the first character is not a hyphen-attached character but a currency symbol (3214), the currency symbol alone is preserved in the dictionary information preserve table 3124 (3216) and the currency symbol is deleted (3217) from the dictionary reference unit. If the first character is not a currency symbol (3214), processing for the succession of numerical characters 3215 is conducted in the processing section 3116. The operation is executed till the final position (3202).

Figure 20:
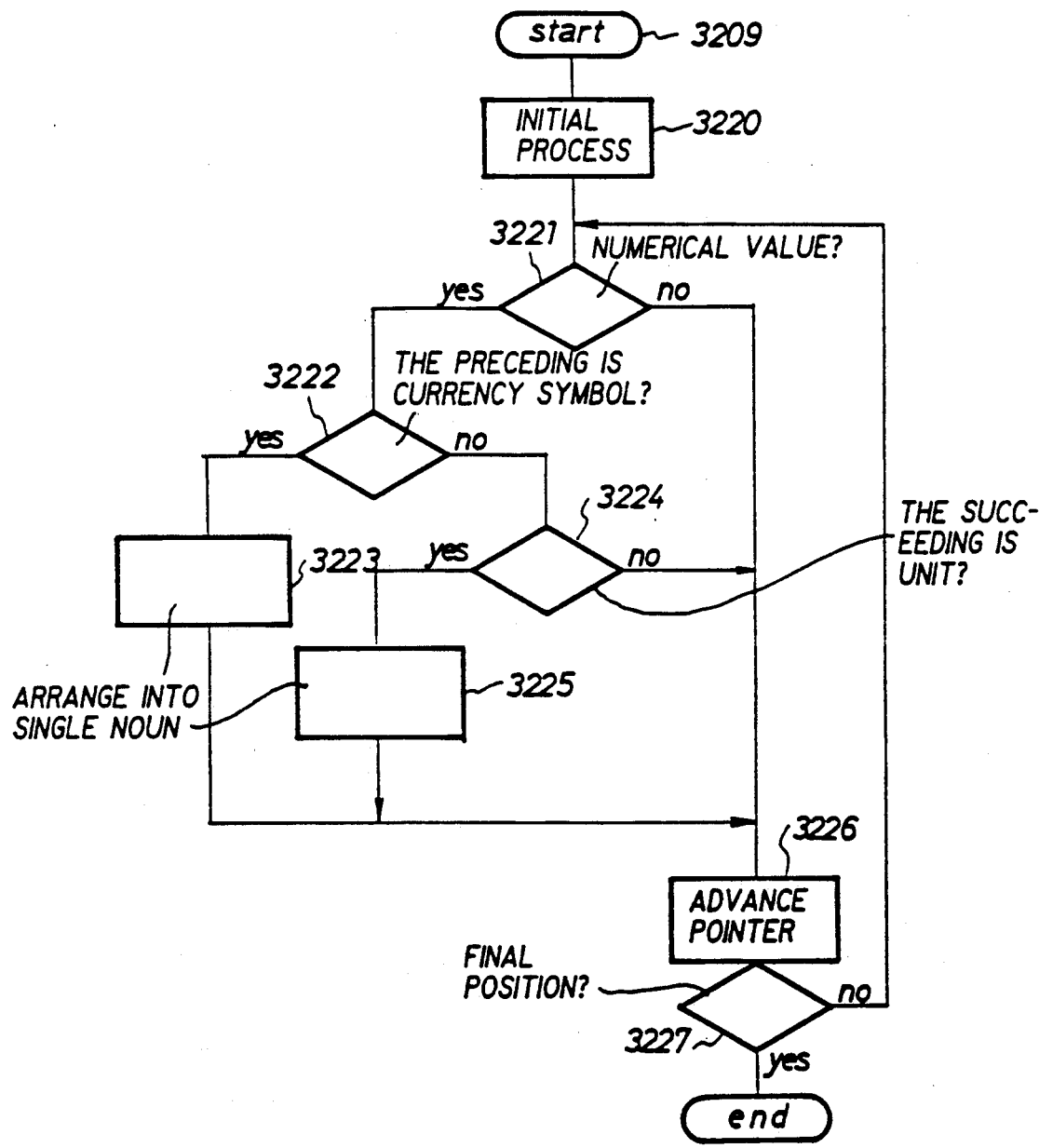

The collective arrangement 3209 with the currency signal and the unit is conducted in the processing section 3110 by the processing flow as shown in FIG. 20. At first, in the initial processing 3220, the top pointer for the processing is at first set to the top of the buffer. If the element indicated by the pointer is not a numerical value (3221), the pointer is advanced stepwise (3226). In a case if the character is a numerical value, but it has no preceeding currency signal and no succeeding unit, the pointer is also advanced stepwise (3222, 3224). The processing is carried out till the final position of the dictionary reference unit (3227).

If the character is a numerical value (3222), the currency symbol and the numerical value are collectively arranged into a single noun (3223). For instance, the currency symbol and the numerical character "¥1,000" is arranged into one noun. Further, if the preceeding character is not a currency symbol and the succeeding character is a unit, the numerical value and the unit are collectively arranged into a single noun (3225). For example, a numerical character and a unit "1.5km" are collectively arranged into a single noun. The processing is carried out till the final position of the dictionary retrieving unit (3227).

The processing for the hyphen-attached number is conducted in the processing section 3114 by the processing flow as shown in FIGS. 21A and 21B. At first, the hyphen-attached dictionary reference unit is stored in the buffer in the initial processing 3230. Further, the numerical value "0" is preserved and the hyphen in the original dictionary reference unit is changed to a space.

Then, the dictionary retrieving unit is cut-out (3231) to conduct the dictionary retrieving (3235). As the result of the dictionary retrieving, if there is no entry, that is, if the word is not registered in the dictionary (3236), the entire hyphen-attached dictionary reference unit is preserved as a not dictionary registered word in the dictionary information preserve table 3124 (3237).

As the result of the dictionary retrieving, if an entry is obtained (3236), it is examined as to whether the numerical flag therefor is "1" or not. If the numerical flag is not "1", it means that the character is not a numerical character and the entire hyphen-attached dictionary reference unit is preserved as a dictionary not registered word in the dictionary information preserve table 3124 (3237).

When "1" is set to the numerical flag for the dictionary entry, the processing section 3012 numerizes the number based on the entry data (3239). Then, the numerized numerical value is added to a numerical value preserved at present (3240) and the result of the addition is preserved (3241). Thus, for example, "two" in "twenty-two" is added to "3020" of the "twenty" just before into "3022". The processing is carried out till the final position of the dictionary retrieving unit (3232).

When advanced stepwise to the final position, the flow is transferred to the processing 3233 in the step 3232, and the preserved numerical value is made as a numerical value for the entire hyphen-attached dictionary reference unit. Then, collective arrangement 3207 for the numerical value with the preceeding numerical value is conducted.

Figure 22A:
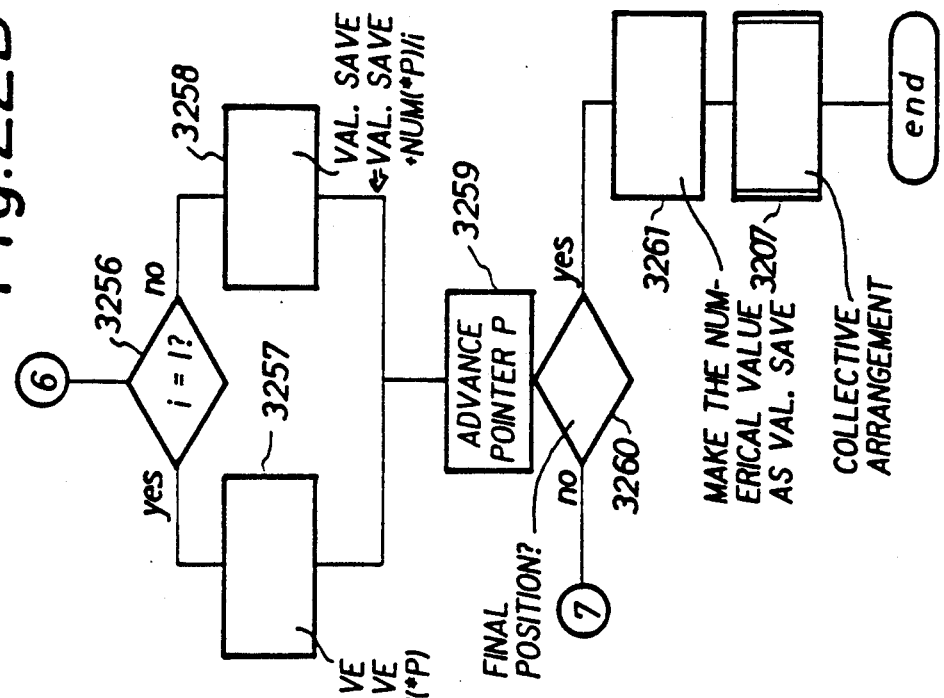
FIGS. 22A and 22B are flow charts illustrating an example for processing successing numerals in the morphological analysis.
Figure 22B:
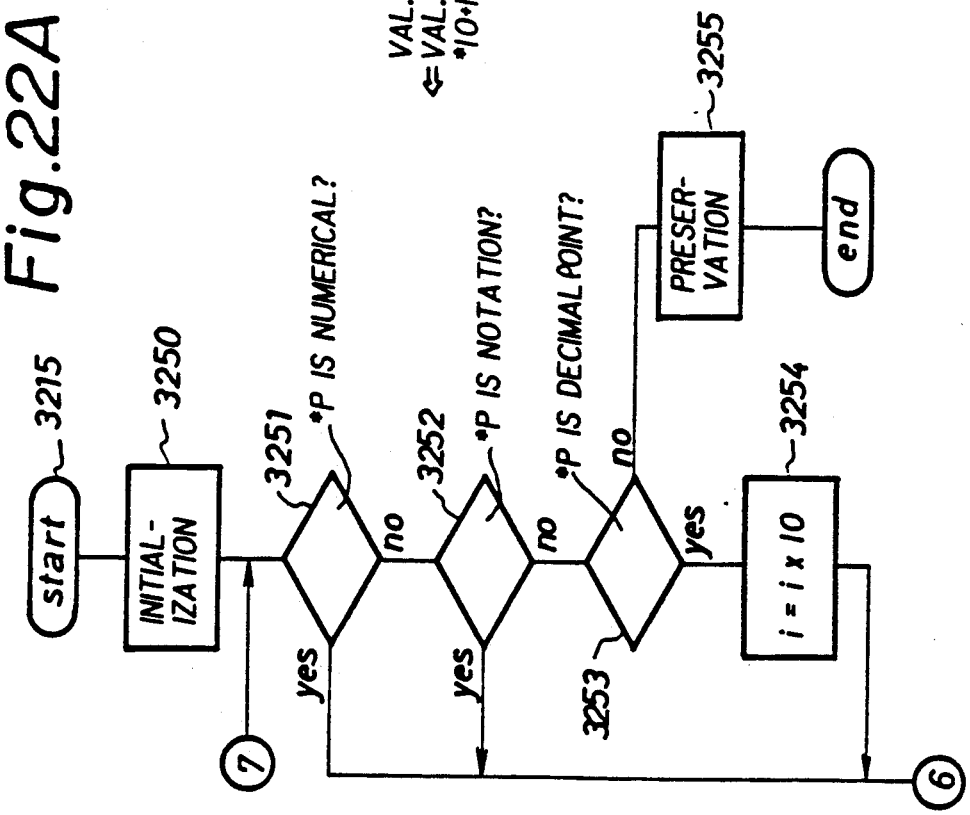
Figure 23B:
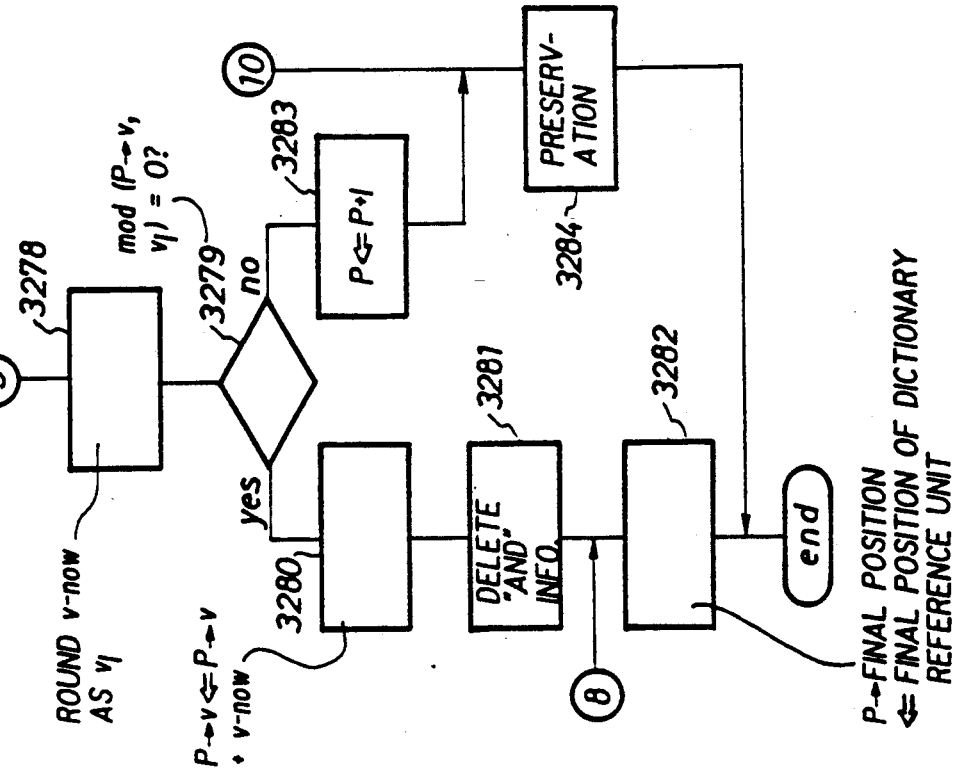
FIGS. 23A and 23B are flow charts illustrating an example of collective arrangement with a preceeding numerical value in the morphological analysis.
Figure 23A:
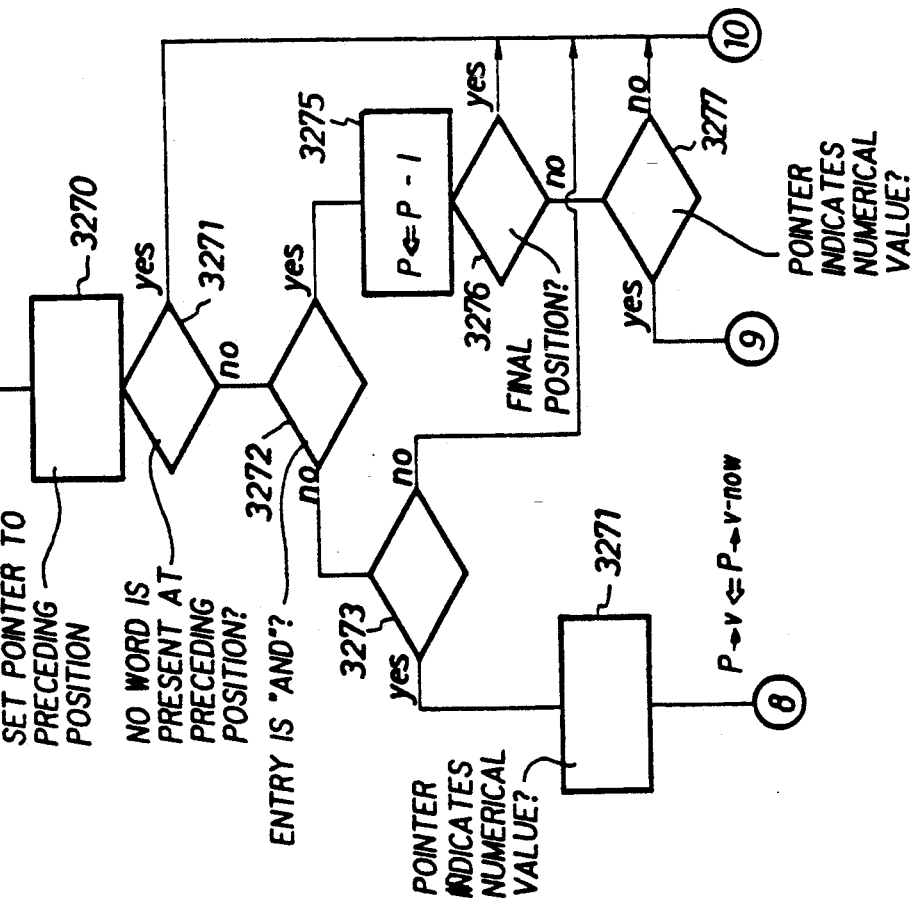

Explanation will then be made to the succeeding numerical character processing 3215 executed in the processing section 3116 while retrieving to FIGS. 22A and 22B. In these flow charts, the symbol "=" means substitution. At first, initialization 3250 is conducted, in which the preserved numerical value val-save is put to "0", the parameter "i" into "1" and the pointer p is set to the top of the character array of the dictionary reference unit.

Then, it is checked as to if the character *p indicated by the pointer p is a numerical character (325i), a notation character (3252) or decimal point (3253) and, if it is none of them, the entire character array is stored as the not dictionary registered word in the dictionary information preserve table 3124 (3255). If it is a decimal point (3253), the parameter "i" is multiplied by 10 (3254) and the step 3258 is executed. In the step 3258, the numerical value num (*p) for the character *p is added to the preserved numerical value val-save to prepare a new preserved numerical value. The numerical value num (*p) is a value regarding the character (*p) as a numerical value.

In the step 3251 or 3252, if the character is a numerical character or a notation character, the step 3257 is executed. In the step 3257, the preserved numerical value val-save is multiplied by 10, to which the numerical value num (*p) for the character *p is added to prepare a new preserved numerical value.

After these processings, the pointer is advanced stepwise (3259) and the processing is repeated till the final position of the dictionary reference unit (3260). If it is at the final position for the character array, the numerical value for the entire character array is formed as a preserved numerical value (3261), and collective arrangement 3207 with the preceeding numerical value is executed in the processing section 3122. By the processing, succeeding numerical characters e.g., "1,000.5" are analyzed as a numerical value "1000.5".

The collective arrangement 3207 with the preceeding numerical value is conducted as follows in the processing section 3122. At first, the pointer of the dictionary table is set to a preceeding position to the dictionary reference unit (3270). If there is nothing in that position, it means that the first position in the preserve table indicates the numerical value and then the numerical value for the current dictionary reference unit is recorded in the dictionary preserve table 3124 (3284). The recorded position is the position next to the position indicated by the present pointer P.

If a word is present at the preceeding position in the step 3271, if the entry indicated by the pointer p is not "and" (3272), and the pointer p does not indicate the numerical value (3273), the numerical value for the current dictionary reference unit is recorded next to the current position indicated by the pointer p in the dictionary preserve table 3124 (3284). For instance, in the example of "To him two . . . ", "two" is newly recorded as a numeral value "2".

In the step 3273, if the pointer p indicates a numerical value, the numerical value p v for the entry indicated by the pointer p is multiplied with the numerical value v-now for the current dictionary reference unit to form a new numerical value p→v for the entry indicated by the pointer p (3274). In the case of "two thousand", for example, "2×1000=2000" is executed to arrange the entire "two thousand" into one. Then, the end position for the current dictionary reference unit is set as the end position for the entry of the pointer p, that is, p - end position (3282).

In the step 3272, if the entry indicated by the pointer p is "and", the pointer p is transferred to the dictionary retrieving unit before (3275). If it is not at the final position (3276) and if it is a numerical value (3277), the numerical value v-now of the present dictionary reference unit is carried and rounded off at the most significant digit, which is set as a value v1. If the numerical value v-now of the current dictionary reference unit is, for example, "8", "8.1", "98" or "11", the value v1 is "10", "10", "100" or "100" respectively.

Then, it is checked as to whether the surplus obtained by dividing the numerical value p−v for the entry indicated by the pointer p with v1, that is, mod (p−v, v1) is "0" or not. If it is not "0", the pointer p is incremented (3283), and the numerical value for the current dictionary reference unit is recorded at a position next to the position indicated by the current pointer p in the dictionary preserve table 3124 (3284). In the case of "I and two", for example, "two" is newly recorded as a numerical value "2".

If the surplus is "0" in the step 3279, the numerical value v-now for the current dictionary reference unit is added to the numerical value p v for the entry indicated by the pointer p to form a new numerical value p→v for entry the indicated by the pointer p (3280). In the case of "two thousand and two", for example, "two thousand" are already arranged into "2000" in this stage. Then, it is added with "2" of "two" by the addition 3200 to collectively arrange the entire portion into ¢2002". Then, the information "and" indicated by the pointer p+1 is deleted from the information preserve table 3124 (3281) and the flow is transferred to the step 3282.

Explanation will be made retrieving to an example. When dictionary retrieving is conducted, for example, to the input character array "To him two thousand and twenty-two—" as shown in FIG. 25, the dictionary entry information is written into the dictionary information preserve table 3124 as shown in FIG. 26A. For "him", for example, the starting position is "4", the end position is "6" and the part of speech is a pronoun. For the numerical processing, it is judged at first for "two" that the numerical flag is "1" (3205) and the numerical value therefor is "2". Since the preceeding character to "two" in this character array is not a numerical value, it is stored directly to the table 3124 (3206, 3208, 3284).

Then, the pointer is incremented to transfer to the processing for "thousand". The numerical flag is "1" and the numerical value is "1000" (3205, 3206). In addition, since the numerical value of the preceeding character is "2" (3207, 3273), the multiplication: 2×1000 is executed (3274), the result of which is stored in the table 3124 (refer to FIG. 26B). Then, for the next "and", the dictionary information is temporarily accumulated as it is into the table 3124 (refer to FIG. 26C).

The pointer is further advanced to process "twenty-two". Since the words are a hyphen-attached word not found in the dictionary entry (32i2), "20+2=22" is executed by the processing 3213 for the hyphen-attached numbers (3237, 3239-3241). Since the preceeding word is "and" (3272) and the numerical value preceeding there to is "2000" (3277), the numerical value "22" is rounded off at the most significant digit into "100" (3278) and divisional operation 3279, is executed. Since the surplus. is "0", addition "3280" between "2000" and "22" is conducted. The information for "and" is eliminated (3282) from the preserve table 3124 and the result of the addition "2022" is preserved as a numerical value in the table 3124, by which "two thousand and twenty-two" is recognized as "2022". Thus, collective arrangement with the preceeding numerical value has been conducted 3207.

Another example will be shown. As shown in FIG. 27, parsing is proceeded for the input character array "You said $1,000.5 thousand was—". "$1,000.5" are not registered in the dictionary 3018. The first character is the current symbol "$" which can be recognized as the currency symbol from the dictionary entry. This is independently recorded in the preserve table 3124 (3214, 3216, FIG. 29A).

Then, "1,000.5" is formed into a numerical value "1000.5" by the succeeding numerical character processing 3215. Since the preceeding character is the symbol "$" and not a numerical value, the numerical value is recorded as it is (3280-3273, 3284, FIG. 29B).

The next word "thousand" is a number and the numeral value thereof is "1000". Since the preceeding character is a numeral value (3272, 3273), a calculation: "1000.5×1000=1000500" 3274 is executed (FIG. 29C).

After the dictionary retrieving has thus been ended, the content preserved in the dictionary information preserve table 3i74 is examined successively. Since the currency symbol "$" is present just before the numeral value "1000500", both of them are collectively arranged and "$1000500" is formed as a single noun entry (3209, 3221-3223:FIG. 29D).

Explanation is to be made for the fourth embodiment according to the present invention.

Figure 30:
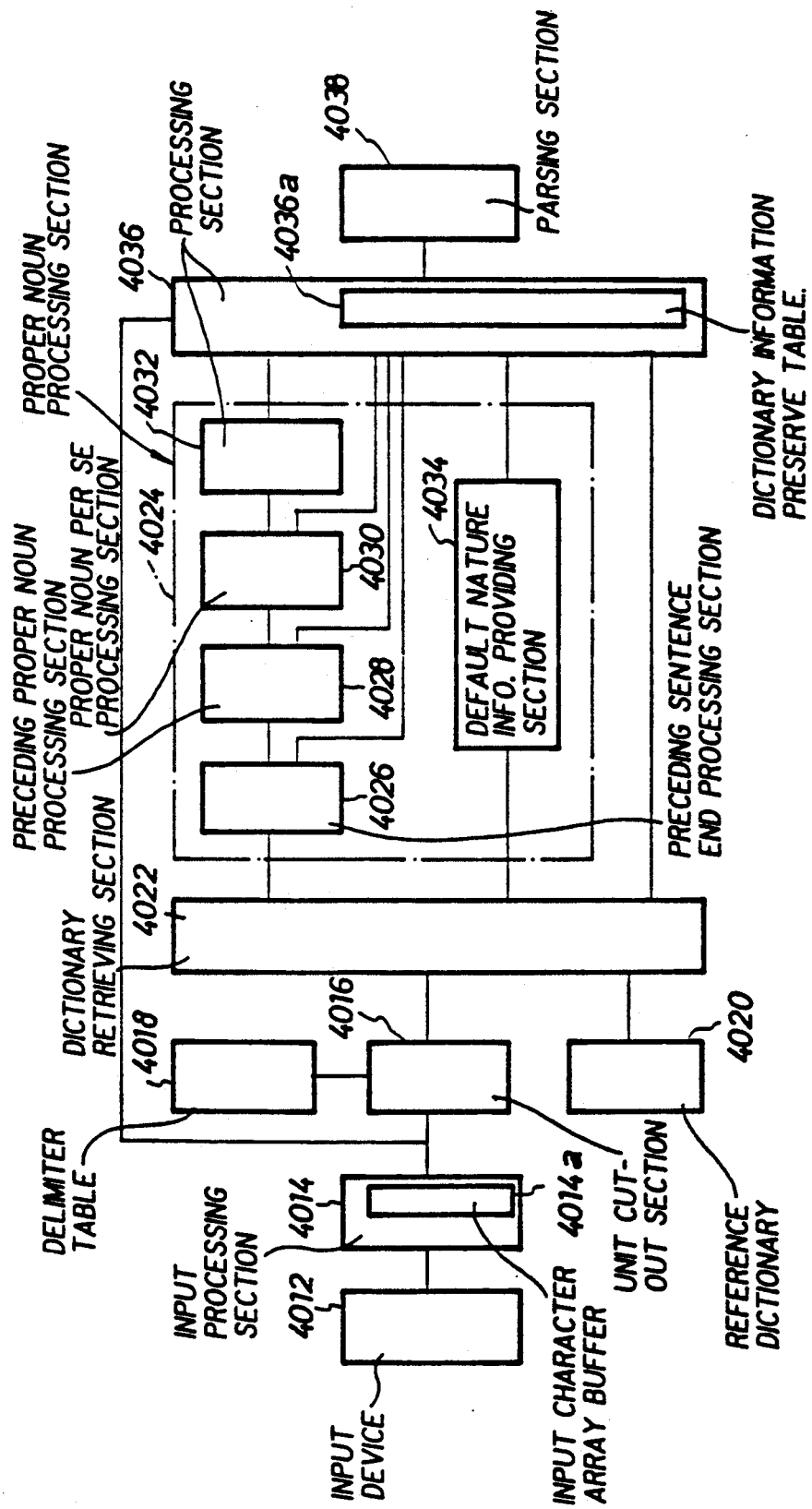

FIG. 30 shows the fourth embodiment of the language analyzer according to the present invention applied to an English-Japanese automatic translation device.

This embodiment has an input processing section 4014 and the input processing section 4014 is inputted with data from an input device 4012. The input device 4012 includes, for example, a key board having character keys such as alphanumerical keys and functional keys, an optical character reading device for reading an English text recorded on paper and a reader such as a magnetic disc.

The input processing section 4014 has an input character array buffer 4014a and stores the input English sentence inputted from the input device 4012 in the input character array buffer 4014a. The input processing section 4014 reads out an input sentence stored in the input character array buffer 4014a and outputs it to a unit cut-out section 4016. The unit cut-out section 4016 is a functional section that cuts-out the dictionary reference unit of the input sentence sent from the input processing section 4014. A delimiter 4018 stores delimiters such as space and comma.

The unit cut-out section 4016 reads out delimiters from the delimiter table 4018 and divides the input sentence sent from the input processing section 4014 into character arrays as the units in the case of retrieving a reference dictionary 4020 by parting the sentence at the portions where the delimiters are present. The divided character arrays are inputted to a dictionary retrieving section 4022.

The dictionary retrieving section 4022 retrieves the reference dictionary 4020 for the input sentence divided into dictionary reference units sent from the unit cut-out section 4016. The reference dictionary 4020 stores therein entries for the English character arrays, part of speech of them, feature information, etc. for example, as shown in FIG. 31. The reference dictionary 4020 also stores therein, in addition to proper nouns shown in the figure, character arrays for other part of speech, for example, verbs and adjectives. The record for the proper noun as the part of speech in the figure means to be applied with the processing for the registered proper noun described later but do not express usual grammatical proper nouns. Further, the feature information indicate those represented by the proper noun which may not always be restricted only to one because, as described later, a proper noun represents a plurality of natures depending on the case of use.

The dictionary retrieving section 4022 retrieves the reference dictionary 4020 for the character array divided into dictionary reference units and, if the character array is a proper noun, outputs it to the proper noun processing section 4024 where processing for the proper noun described later is conducted. If it is not a proper noun, it is outputted to a processing section 4036 and preserved in a dictionary information preserve table 4036a of the processing section 4036.

The proper noun processing section 4024 comprises a preceeding sentence and processing section 4026, a preceeding proper noun processing section 4028, a proper noun per se processing section 4030, a processing section 4032 for the preceeding proper noun and the proper noun per se and a default feature information providing section 4036.

The preceeding sentence end processing section 4026 judges as to whether the character array preceeding to the character array retrieved by and inputted from the dictionary retrieving section 4022 is at the end of the sentence or not and, if the preceeding character array is at the end of the sentence, converts the capital at the top of the character array to be processed into a small character, sends its to the dictionary retrieving section 4022 and causes the dictionary retrieving section 4022 to retrieve the reference dictionary 4020 again. The character array not retrieved even by the second retrieval is judged as a not registered proper noun, which is sent to the processing section 4036 and then stored in the dictionary information preserve table 4036a. Further, in a case if the preceeding character array is not at the end of the sentence, it is sent to the processing section 4036 as a proper noun the feature information of which is unknown and registered in the dictionary information preserve table 4036a as described later.

The preceeding proper noun processing section 4028 parses the feature information for the preceeding character array sent from the the preceeding sentence end processing section 4026 and outputs the result to the proper noun per se processing section 4030. The proper noun per se processing section 4030 examines the feature information of the proper noun to be parsed and, as described later, if the feature information for either of the proper noun and the proceeding proper noun is not registered, parses the proper noun and preceeding proper noun collectively by the registered information for the other of them and preserves it into the dictionary information preserve table 4036a in the processing section 4036.

The processing section 4032 for the preceeding proper noun and proper noun per se examines the portion in common with the feature information for the proper noun and the preceeding proper noun to be parsed, parses these proper nouns by the common portion, outputs the result to the processing section 4036 and then store it into the dictionary information preserve table 4036a in the processing section 4036.

The default feature information providing section 4036 provides feature information to a proper noun after read out from the dictionary information preserve table 4036a, sent through the unit cut-out section 4016 to the dictionary retrieving section 4022 and found to have no feature information as a result of retrieving the reference dictionary 4020 in the dictionary retrieving section 4022. Since it is effective that a proper noun has various kind of natures depending on the situations of use, all of feature informations considered necessary are provided. For instance, "person, place, group, and others." are provided. After providing the proper noun with the feature information, the default feature information providing section 4034 sends the data to the processing section 4036 and store them in the dictionary information preserve table 4036a in the processing section 4036.

Figure 32:
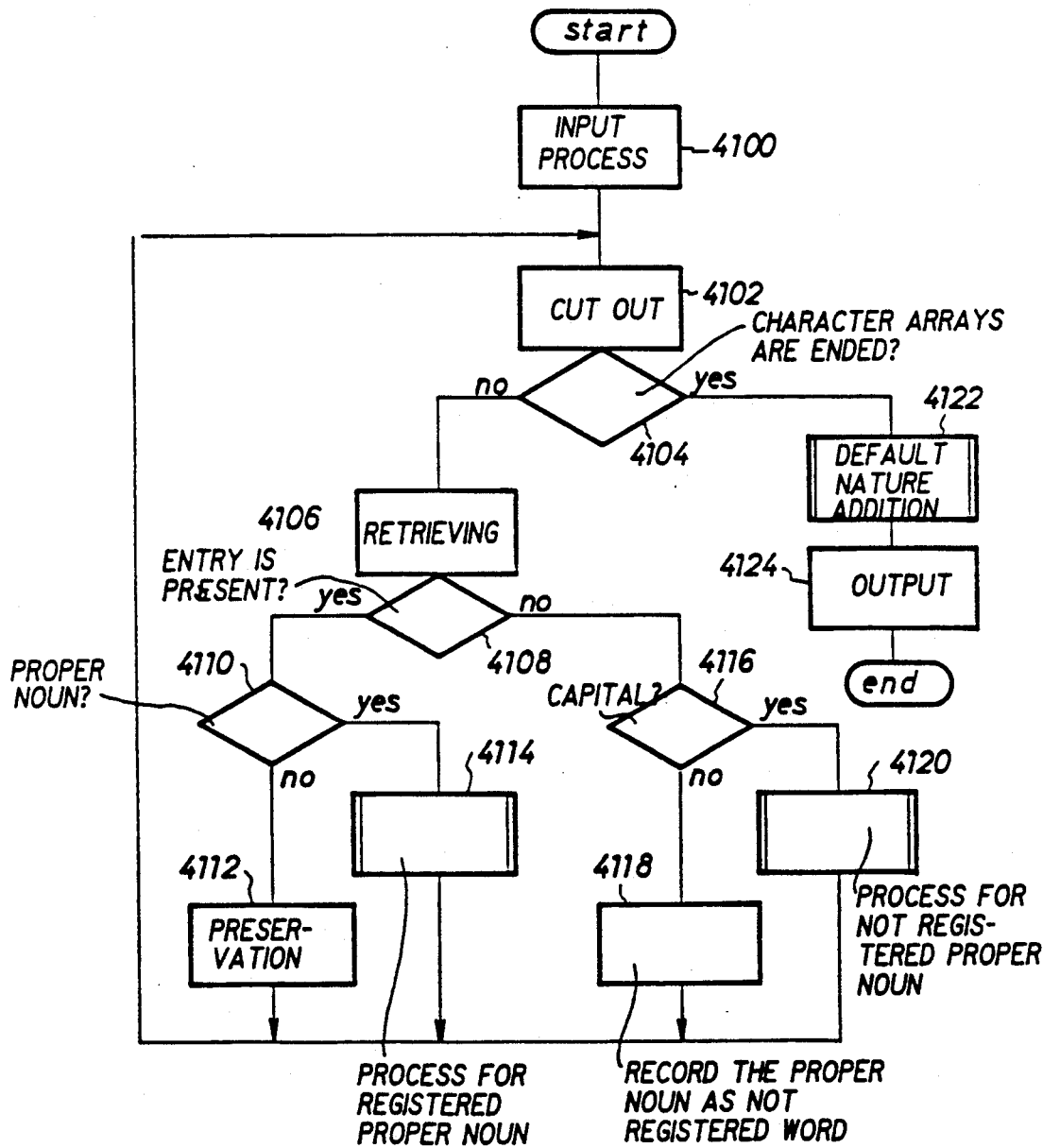

The processing section 4036, having the dictionary information preserve table 4036a, store the data sent from the processing section 4032 for the preceeding proper noun and proper noun per se, the default feature information providing section 4034 or the dictionary retrieving section 4022 into the dictionary information preserve table 4036a and, thereafter, reads out the stored data and outputs them to the parsing section 4038. The parsing section 4038 conducts the analysis for the input sentence after subjected to morpheme analysis and read out from the dictionary information preserve table 4036a. The operation of this device will be explained referring to the flow chart in FIG. 32.

At first, an English input sentence from the input device 40i2 is read into the input processing section 4014 (4100). The input sentence read into the input processing section 4014 is loaded in the input character array buffer 4014a. The input sentence loaded in the input character array buffer 4014a is read out to the unit cut-out section 4016.

When the input sentence is inputted, the unit cut-out section 4016 reads delimiters from the delimit table 4018 to cut-out the dictionary reference units (4102). That is, character arrays constituting the inputted input sentence are divided successively from the top of the character arrays into retrieve key character arrays as the unit for retrieving the reference dictionary 4020 by being divided at the portions where delimiters such as space and colon are present. The section judges whether the divided dictionary reference unit, that is, the retrieve key character arrays are ended or not (4104) and, if there are still retrieve key character arrays (not ended), sends the retrieving character array to the dictionary retrieving section 4022.

When a retrieve key character array is sent to the dictionary retrieving section 4022, the dictionary retrieving section 4022 retrieves the reference dictionary 4020 for the retrieving key character array (4106). The section judges whether the retrieve key character array is present or not in the entry of the reference dictionary 4020 as shown in FIG. 31 (4108) and,:if there is an entry, reads out the part of speech information stored in the reference dictionary 4020 and judges as to whether the retrieve key character array is a proper noun or not (4110).

If the retrieving key character array is not a proper noun, the dictionary retrieving section 4022 sends the data read out from the reference dictionary 4020 to the processing section 4036 and records them in the dictionary information preserve table 4036a (4112). When the data are stored in the dictionary information store table 4036a, the input indicating that the data have been stored in the unit cut-out section 4016 and the data for the retrieve key character array preserved just before are inputted from the processing section 4036. Then, the flow is returned to the step 4102 and the dictionary reference unit is cut-out again in the unit cut-out section 4016.

In the step 4110, if the retrieve key character array is a proper noun, the dictionary retrieve section 4022 sends the data for the proper noun read out from the reference dictionary 4020 (hereinafter simply referred to as a proper noun) to the proper noun processing section 4024, together with the data for the preceeding retrieve key character array inputted from the dictionary information preserve table 4036a in the processing section 4036 by way of the unit cut-out section 4016 to the dictionary retrieving section 4022, and the processing for the dictionary registered proper noun is conducted in the proper noun processing 4024 (4124).

Figure 33:
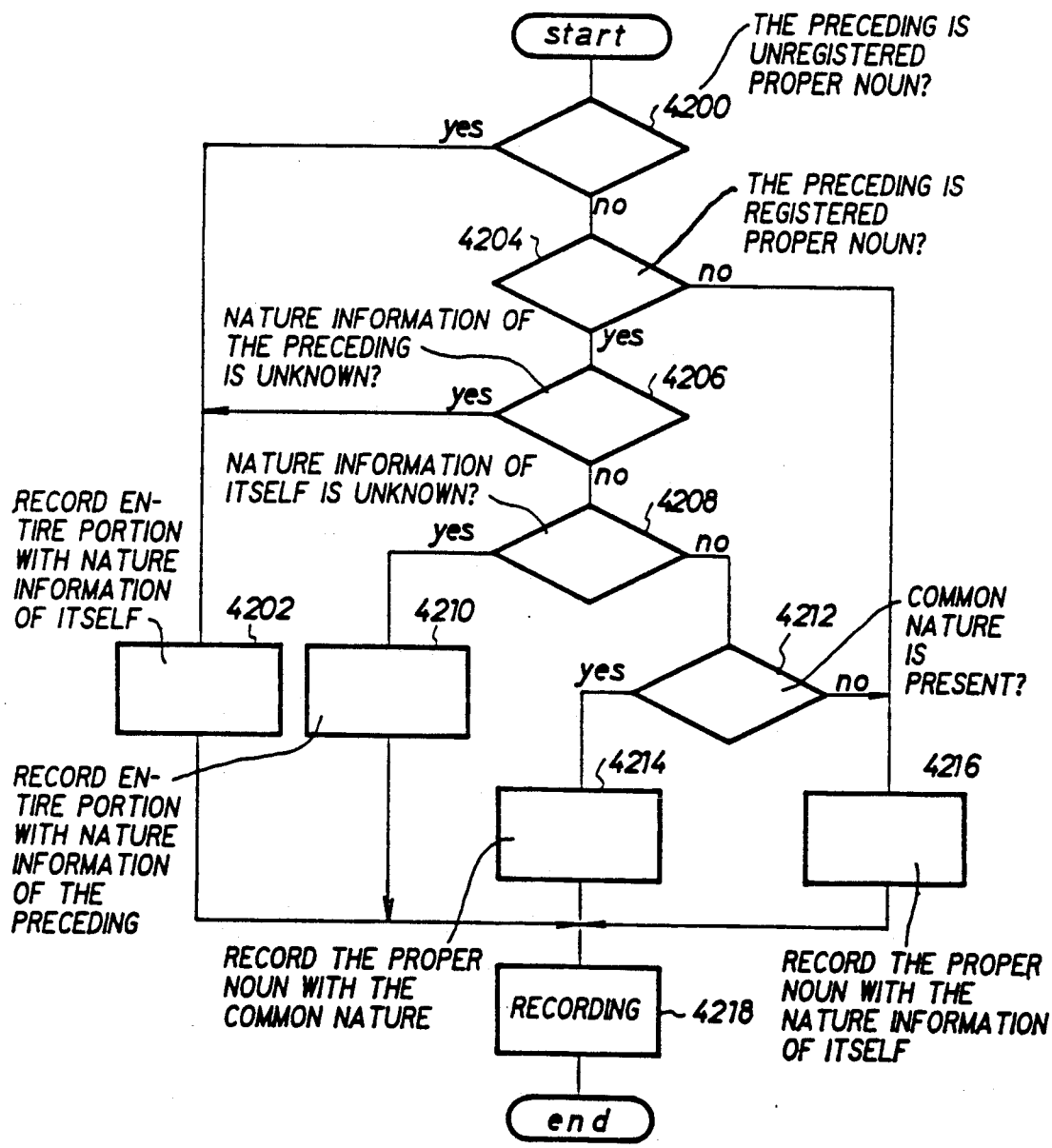

Processing for the dictionary registered proper noun is explained referring to the flow chart shown in FIG. 33.

The data sent from the dictionary retrieving section 4022 to the proper noun processing section 4024 are inputted by way of the preceeding sentence end processing section 4026 to the preceeding proper noun processing section 4028. In the processing for the dictionary registered proper noun, the preceeding sentence end processing section 4026 does not function.

The preceeding proper noun processing section 4028 judges as to whether the entry preceeding to the proper noun is a proper noun not registered in the reference dictionary 4020 or not, that is, whether it is applied with the processing for the dictionary not registered proper noun described later or not (4100). If it is a not registered proper noun, the processing section judges the entire portion of the proper noun and the preceeding not registered proper noun as a proper noun having the feature information for the proper noun (4202), sends the data to the processing section 4036 and stores them in the dictionary information preserve table 4036a (4218).

If the preceeding proper noun processing section 4028 judges in the step 4200 that the entry preceeding to the proper noun is not a registered proper noun, it judges as to whether the entry preceeding to the proper noun is a proper noun registered in the reference dictionary 4020 or not (4204). If the entry just preceeding to the proper noun is a registered proper noun, it is judged as to whether the feature information for the preceeding proper noun is unknown or not, that is, whether it is not registered in the reference dictionary 4020 or not (4206).

In a case where the feature information for the preceeding proper noun is unknown, the flow is advanced to the step 4202 and to judge the entire portion of the proper noun per se and the proper noun just preceeding thereto as a proper noun having a feature information (4202), and the processing section 4028 for the preceeding pronoun sends the data to the processing section 4036. The data sent to the processing section 4036 are recorded in the dictionary information preserve table 4036a (4218).

If the preceeding proper noun processing section 4028 judges in the step 4206 that the feature information for the preceeding proper noun is not unknown, that is, it is registered in the reference dictionary 4020, the data are sent from the preceeding proper noun processing section 4028 to the proper noun per se processing section 4030. The proper noun per se processing section 4030 judges as to whether the feature information of the proper noun is unknown or not (4208). If the feature information for the proper noun is unknown, the proper noun per se processing section 4030 judges the entire portion of the proper noun per se and the proper noun just preceeding thereto as a proper noun having feature information of the proper noun (4210), and sends the data to the processing section 4036. The data sent to the processing section 4036 are recorded in the dictionary information preserve table 4036a.

If the proper noun per se processing section 4030 judges that the feature information of the proper noun per se is not unknown, that is, it is registered in the reference dictionary 4020, the proper noun per se processing section 4030 sends the data to the processing section 4032 for the preceeding proper noun and the proper noun per se. The processing section 4032 for the preceeding proper noun and the proper noun per se judges as to whether there is any common nature in the feature information between the proper noun per se and the proper noun just preceeding thereto (4212) and, if there is a common nature, judges the entire portion for the proper noun per se and the proper noun just preceeding thereto as a proper noun having the feature information of the common portion (4214) and sends the data to the processing section 4036. The data sent to the processing section 4036 are recorded in the dictionary information preserve table 4036a (4218).

If there is no common nature for the feature information between the proper noun per se and the proper noun just preceeding thereto, the processing section judges that the proper noun is a proper noun having the feature information retrieved from the reference dictionary 4020 different from the proper noun just preceeding thereto (4216) and sends the data to the processing section 4036. The data sent to the processing section 4036 are recorded in the dictionary information preserve table 4036a (4218).

Referring again to FIG. 32, in the step 4108, if there is no retrieve key character array in the entry of the reference dictionary 4020, it is judged as to whether the first character of the retrieve key character array is a capital or not (4116) and, if it is not a capital, the dictionary retrieving section 4022 judges the retrieve key character array as a not registered word, sends it to the processing section 4036 for recording in the dictionary information preserve table 4036a (4118).

If the first character is a capital, the data for the retrieve key character array are sent together with the data for the preceeding retrieve key character array from the dictionary retrieving section 4022 to the proper noun processing section, where the processing for the dictionary not registered proper noun is conducted (4120).

Explanation will be made for the processing of dictionary not registered proper noun referring to FIG. 34.

The data for the retrieve key character array are sent together with the data for the preceeding retrieve key character array to the preceeding sentence end processing section 4026 and the preceeding sentence end processing section 4026 judges as to whether the end of the preceeding entry is a candidate for the end of the sentence or not (4300). The judgement as to if it is a candidate for the end of the sentence or not is conducted by the judgement as to whether the end of the preceeding entry is a candidate for the end of the sentence such as a separated period (.), etc. or not.

If the end of the preceeding entry is a candidate for the end of the sentence, data are sent from the preceeding sentence end processing section 4026 to the preceeding proper noun processing section 4028 and the preceeding proper noun processing section 4028 judges the preceeding entry as the end of the sentence (4302), converts the first character in the retrieve key character array into a small character and sends it to the dictionary retrieving section 4022.

The dictionary retrieving section 4022 retrieves the reference dictionary 4020 for the retrieve key character array converted into the small character (4304) and judges as to whether there is an entry or not in the reference dictionary 4020 (4306). If there is an entry, the dictionary retrieving section 4022 sends the data retrieved from the reference dictionary 4020 to the processing section 4036 and store them in the dictionary information preserve table 4036a (4308). If there is no entry, the dictionary retrieving section 4022 returns the first character in the retrieving character array into the capital and, sends the same as a not registered proper noun to the processing section 4036 for recording in the dictionary information preserve table 4036a (4310).

In the step 4300, if the preceeding sentence end processing section 4026 judges that the end of the preceeding entry is not a candidate for the end of the sentence, the data are sent from the preceeding sentence end processing section 4026 to the preceeding proper noun processing section 4028, and the preceeding proper noun processing section 4028 judges the preceeding entry as not the end of the sentence (4312). The data are sent from the preceeding proper noun processing section 4028 to the proper noun per se processing section 4030 and the proper noun per se processing section 4030 judges the retrieve key character array as a proper noun the feature information of which is unknown (4314).

The proper noun per se processing section 4030 returns the data to the preceeding proper noun processing section 4028 and the preceeding proper noun processing section 4028 conducts the processing for the dictionary registered proper noun (4316). The processing for the dictionary registered proper noun is the same as that shown in FIG. 33.

Referring again to FIG. 32, if the cut-out dictionary reference unit is at the end in the step 4104, the dictionary retrieving section 4022 sends a signal indicating this to the default feature information providing section 4034 and the default feature information providing section 4034 reads out the information recorded in the dictionary information preserve table 4036a in the processing section 4036 and provides the pronoun with the default feature information (4122).

Explanation will then be made to the operation of providing the proper noun with the default feature information referring to FIG. 35.

In the default feature information providing section 4034, a pointer is at first set to the top of the data in the dictionary information preserve table 4036a (4400). That is, the pointer is set to the entry at the top of the input sentence divided into entries, which are respectively provided with information by the retrieval to the reference dictionary 4020. Then, it is judged as to whether the entry indicated by the pointer is a proper noun or not (4402) and, if it is a proper noun, it is judged as to if the feature information of the proper noun is unknown or not (4404). It is not a proper noun, the flow is advanced to the step 4408 and the pointer is advanced to the next entry.

In the step 4404, if the feature information for the proper noun is unknown, the default feature information is provided (4406). Upon providing the default feature information, the default feature information is provided to a proper noun of which the feature information is unknown as shown in the lower part of FIG. 36. For example, as shown in the lower part of the figure, the proper noun "Johnson" the feature information of which is unknown is provided with all kinds of feature informations, i.e., "person, place, group, and others". By providing all kinds of feature informations to the proper noun, the feature information of which is unknown, it is possible to leave a a room capable of parsing the proper noun into any of the plurality of natures in the subsequent structure analysis.

In the step 4404, if the feature information for the proper noun is not unknown, the flow is advanced to the step 4408 and the pointer is advanced to a further entry.

It is judged as to if the entry indicated by the pointer is at the end or not (4408) and, if it is not at the end, the flow is returned to the step 4402 and then the next entry is judged as to if it is a proper noun or not. If the entry indicated by the pointer is at the end, the provision of the default information is ended.

After ending the provision of the default feature information to the proper noun, the data recorded in the dictionary information preserve table 4036a are outputted from the processing section 4036 to the syntactic analysis section 4036 (4124), by which the morpheme analysis in this embodiment has been ended.

Explanation will then be made to the operation of the aforementioned device referring to an example of an input sentence.

Explanation will be made to a case where an input sentence "In Tokyo Station Mr. Walter met Johnson" is inputted. At first an input processing (4100) for reading the input sentence into the input processing section 4014 is conducted. Then, the dictionary reference unit is cutout (4102) and the input sentence is divided into each of words by spaces. The reference dictionary 4020 is retrieved at first for "In" (4106). Since there is no entry for "In" as it is in the reference dictionary 4020, the step once enters into the processing for the dictionary not registered proper noun. However, since the preceeding part is at the top of the input character array, it is regarded as a candidate for the end of the sentence, retrieved as "in" by converting I into i from the reference dictionary 4020. Since it is not a proper noun (4110), the data retrieved from the reference dictionary 4020 are recorded in the dictionary information preserve table 4036a (4112).

Then, the reference dictionary 4020 is retrieved for "Tokyo" (4106). Since there is no entry in the reference dictionary 4020 for "Tokyo" (4108) and the first character is a capital (4116), processing for the dictionary not registered proper noun is conducted (4120). Then, the flow is advanced to FIG. 34. Since the preceeding part is "In" and there is no candidate for the end of the sentence (4300), "In" is judged as not the end of the sentence (4312) "Tokyo" is recognized as a proper noun the feature information of which is unknown (4314) and the processing for the dictionary registered proper noun is conducted (4316).

The flow is advanced to FIG. 33. Since "In" in the preceeding portion is not a not registered proper noun (4200) and not a registered proper noun (4204), it is recorded as a proper noun having by itself a feature information of its own, that is, as a proper noun the feature information of which is unknown (4216).

Returning then to FIG. 32, the retrieval for the reference dictionary 4020 is then conducted for "Station" (4106). Since there is an entry in the reference dictionary 4020 for "Station" (4108) and, since it is a proper noun (4110), processing for the dictionary registered proper noun is conducted (4114). The flow is advanced to FIG. 33. Since "Tokyo" in the preceeding portion is a not registered proper noun (4200), the "Tokyo Station" is recorded as a proper noun entirely having the feature information of "place and group" as the "Station" (4202). Then, the reference dictionary 4020 is retrieved in FIG. 32 for "Mr." (4106). Since "Mr." has an entry in the reference dictionary 4020 and it is a proper noun (4110), processing for the dictionary registered proper noun is conducted (4114). Then, the flow is advanced to FIG. 33. Since "Station" in the preceeding part is not a not registered proper noun (4200) but a registered proper noun (4204) and the feature information (place, group) are not unknown (4206). Since "Mr." has a feature information of "person" and is not unknown (4208), it is judged if there is any common portion or not in the feature information between "Station" in the preceeding portion and "Mr." (4212). Since "Station", means "place, group", while "Mr." means "person" and there is no common portion in them, "Mr." is registered alone as a proper noun with the feature information of "person" (4216).

Then, the flow is again returned to the FIG. 32, and the reference dictionary 4020 is retrieved for "Walter" (4106). Since there is an entry for "Walter" in the reference dictionary 4020 (4108) and it is a proper noun (4110), processing for the dictionary registered proper noun is conducted (4114). The flow is advanced to FIG. 33. Since "Mr." in the preceeding part is not a not registered proper noun (4200) and a registered proper noun (4204), as well as since the feature information being "person" is not unknown " (4206) and the feature information for "Walter" being "person, place, group" is not unknown as well (4208), the common portion for the feature information is judged (4212). Since there is a proper portion "person" is present for the feature information, "Mr. Walter" are collectively recorded as a common noun having the feature information "person" (4214).

Then, "met" is retrieved from the reference dictionary 4020 and, since there is an entry (4108) and it is not a proper noun (4110), data retrieved from the reference dictionary 4020 are recorded in the dictionary information preserve table 4036a (4112).

Further, "Johnson" is retrieved from the reference dictionary 4020 (4106). Since there is no entry for "Johnson" (4108) and the first character is a capital (4116), processing for the dictionary not registered proper noun is conducted (4120). Then the flow is advanced to FIG. 34. Since "met" in the preceeding part has no candidate for the end of the sentence (4300), it is judged that "met" is not the end of the sentence (4312), "Johnson" is regarded as a proper noun with the unknown feature information (4314) and processing is conducted for the dictionary registered proper noun (4316). Then, the flow is advanced to FIG. 33. Since "met" in the preceeding part is neither not registered proper noun (4200) nor a registered proper noun (4204), "Johnson" is recorded alone as a proper noun the feature information of which is unknown.

After the foregoing processings, default feature information is provided to the proper noun as shown in FIG. 35.

The pointer is set to "In" as the top dictionary reference unit (4400). Since it is not a proper noun (4402), the pointer is advanced (4408) and set to "Tokyo Station". Since "Tokyo Station" is a proper noun (4402) and the feature information is not unknown because the entire portion "Tokyo Station" have been recognized as place, group in the foregoing processing for the registered proper noun (4404), the pointer is advanced (4408) and set to "Mr. Walter".

Since, "Mr. Walter" is also a proper noun (4402) and the feature information is not unknown (4404), the pointer is advanced (4408). Since "met" is not a proper noun (4402), the pointer is advanced (4408). Since "Johnson" is a proper noun (4402) and the feature information of which is unknown (4404), default feature information is provided (4406) and "Johnson" is provided with feature information "person, place, group, and others" as shown in FIG. 36.

As has been described above in this embodiment, an English input sentence is divided into retrieve key character arrays, which are then retrieved from the reference dictionary 4020 and, if there is an entry as a proper noun in the reference dictionary 4020, processing for the registered proper noun is conducted. In the processing for the registered proper noun, the preceeding retrieve key character array is taken into consideration and if the preceeding retrieve key character array is a proper noun, the feature information for the preceeding retrieve key character array and the proper noun as the object are examined. If it has none of the feature information, the other feature information is provided, whereas if is any feature information is present for both of them, the common portion is regarded as the feature information of these proper nouns. Accordingly, it is possible to properly provide a proper noun having no feature information with feature information properly, as well as to properly restrict the provided feature information to more appropriate feature information. This enables to more effective analysis in the subsequent structure analysis and conduct appropriate translation.

Further, for the character array not registered in the reference dictionary 4020, if the first character is a capital and the preceeding character array is judged to be the end of the sentence, since the capital is converted into a small character and the reference dictionary 4020 is retrieved again, it is possible to retrieve also for the character array at the top of the sentence to the reference dictionary 4020. Furthermore, in a case where a character array starting from a capital appears in a portion other than the top of the sentence, it is judged as a proper noun and the feature information for the proper noun is provided by means of a proper noun with registered feature information if it exists before and after thereof. Accordingly, a proper noun not registered in the reference dictionary 4020 can be parsed to some extent.

Furthermore, since a proper noun not provided with feature information is provided with all of necessary feature informations and those of unrequired feature information are removed in the processing for the word, it is possible to analyze a proper noun the feature information of which is not known or a not registered proper noun.

Further, since a plurality of feature informations are provided to a specific proper noun and appropriate feature informations are selected depending on the feature information of the proper noun before and after thereof, it is possible to select appropriate feature informations in a case of parsing a proper noun having a plurality kinds of feature informations depending on the relationship with others before and after thereof to enable effective parsing for the input sentence.

Explanation will be made to the fifth embodiment of the present invention.

Figure 38:
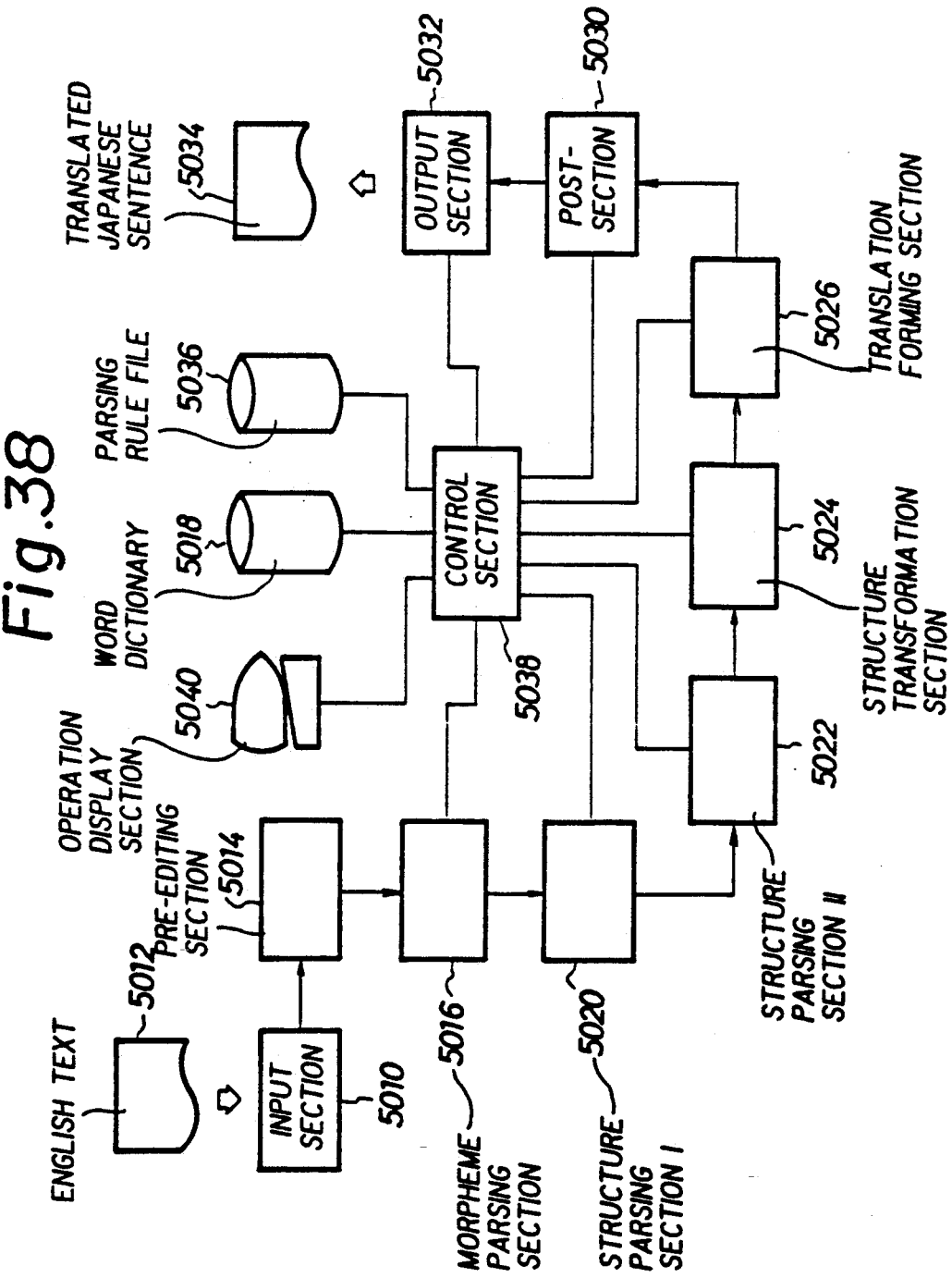

FIG. 38 illustrates the entire structure of the fifth embodiment of the language analyzer according to the present invention applied to an English-Japanese automatic translation device.

This embodiment comprises an input section 5010 and an English text 5012 to be translated into Japanese is inputted through the section. The input section 5010 may include, for example, a key board having character keys such as alphanumerical keys or functional keys, an optical character reading device (OCR) for reading the English text recorded on paper and/or a file memory device for reading the English text recorded on a memory medium such as a magnetic medium.

The English text inputted from the input section 5010 is read into a pre-editing section 5014 where pretreatment for the translation is conducted. In this case, the sentence recognition and the unknown word processing are mainly conducted. This functions as a portion of the morphological analysis.

The pre-edited English data are transferred together with the information obtained in the pre-edition to a morphological analysis section 5016. The morphological analysis section 5016 divides the data into sentences while retrieving a word dictionary 5018, parses English morphemes, conducts processing for unknown words, proper nouns, various arrangements such as expression for time and numeral, as well as conducts processings for the entire sentence such as tag question and apposition recognition. The morphological analysis rules are stored in a parsing rule file 5036.

The English data after the morphological analysis are transferred together with the dictionary information obtained in the morphological analysis to a syntactic analysis section I 5020. The syntactic analysis section I 5020 is a functional section that parses the surface structure for the sentence by applying grammatical rules to the English data and finds out all of the structural possibility.

The English data subjected to the syntactic analysis in the syntactic analysis section I 5020 are sent together with the analyzed information to a syntactic analysis section II 5022, where a solution is selected from the result of the syntactic analysis in view of the surface structure by the syntactic analysis I by applying the structural description. A plausible parsing tree for the English sentence is thus prepared and the structure thereof is formed. The syntactic analysis rules are also stored in a parsing rule file 5036.

The English data after subjected to: syntactic analysis are transferred as the data of parsing tree to a structure transformation section 5024. In the structure transformation section 5024, a structural tree of the corresponding Japanese sentence is prepared from the structural tree which is an intermediate structure of the English sentence and converted into a Japanese underlying structure from which the Japanese sentence can be translated with ease.

The data for the structural tree indicating the Japanese underlying structure thus subjected to the structure transformation are sent to a translation forming section 5026, where a translated sentence is generated. This is a functional section that generates a Japanese sentence from the tree structure of the Japanese structural tree.

Japanese data as a result of forming the translation, that is, data for the translated sentence are sent to a post-editing section 5030. The post-editing section 5030 modifies the translated data by retrieving a dictionary 5018 using information utilized in the translation processing to complete a more natural Japanese sentence. The data for Japanese sentence are transferred to an output section 5032 and outputted as translated Japanese sentence 5034 from the output section 5032. The output section 5032 may include, for example, a printer, a display and a file memory device such as a magnetic disc.

A flow of such a series of translation processings is controlled by a control section 5038 that governs the control of the entire device.

The word dictionary 5018 stores dictionary data for English and Japanese words and various informations are stated therein such as connective relationship, that is, co-existent relationship, aw well as meanings, singular or plural form, part of speech, etc., in addition to vocabularies. Further, parsing rule file 5036 stores rule data for the morphological analysis and syntactic analysis.

The control section 5038 is connected with an operation display section 5040. The operation display section 5040 has operation keys providing various indications from an operator to the present device, for example, translation indication key, cursor key, etc., and a display or an indicator that visually displays an input English text, Japanese text as the result of the translation, intermediate data such as dictionary information, various indications to the operator, etc. It may be so constituted that most of the operation indication functions are included in a key board if it is disposed to the input section 5010, or in a display if it is disposed to the output section 5032.

Figure 37:
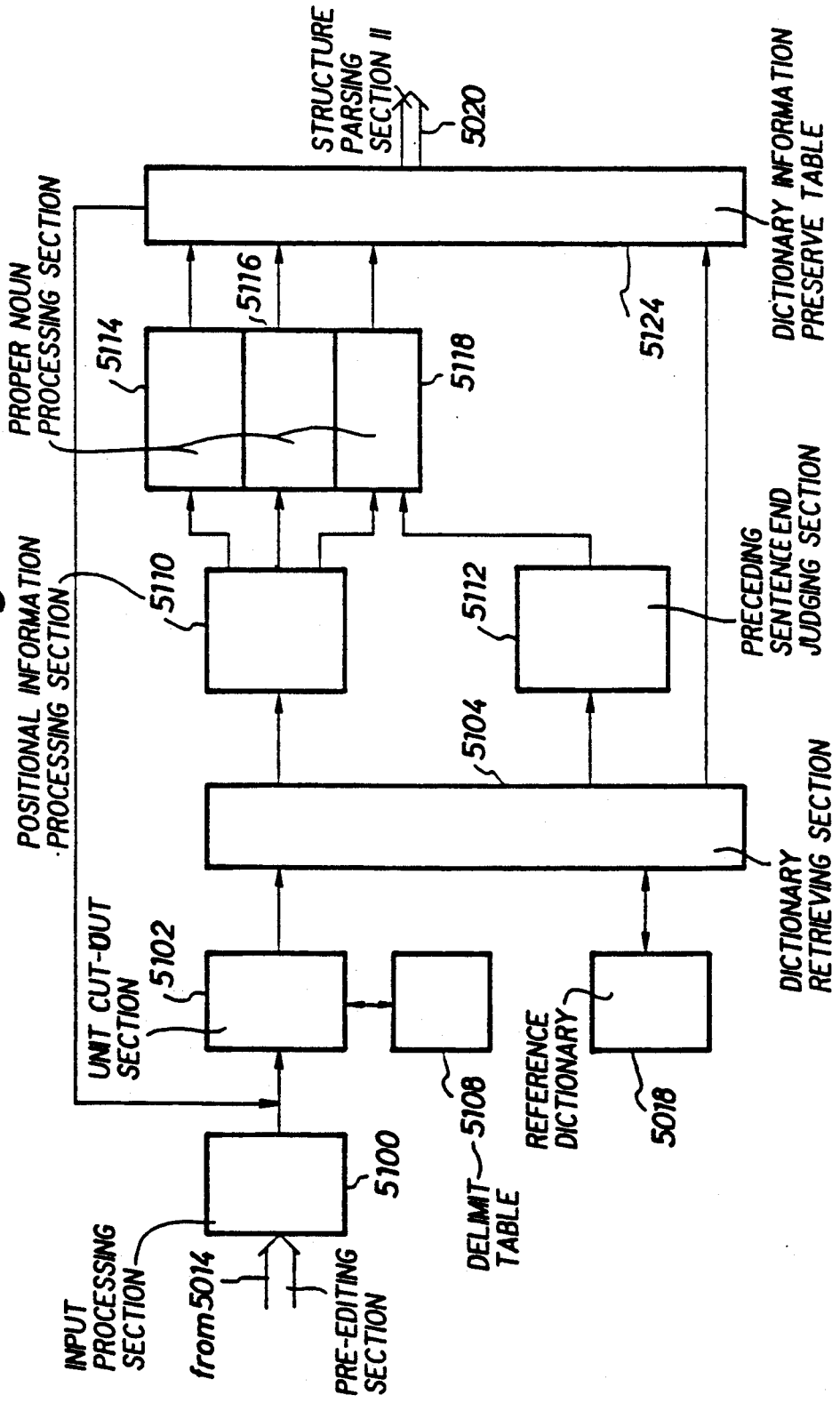

Referring then to FIG. 37, detailed structures regarding the processing for proper noun in the morphological analysis section 5016 is exemplified. The morphological analysis section 5016 is illustrated for the portion having direct concerns with the understanding of the present invention, although it naturally has other parsing functional sections. The morphological analysis is conducted by instructing the dictionary retrieval from the top of the input character array successively in accordance with the retrieving key character array and executing the processing for the dictionary information obtained in accordance therewith from the dictionary retrieving section 5104 according to the positional information of the proper noun described later.

The morphological analysis section 5016 has an input processing section 5100 for receiving the data for the input character array inputted from the pre-processing section 5014 and conducting the input processing. The input processing section 5100 is provided with an input character array buffer which is inputted with the English character array data in the form of code data, for example, ASCII and temporarily accumulates the character array data.

The data for input character array temporarily accumulated in the input processing section 5100 are sent to a unit cut-out section 5012 that cut-out the data into dictionary reference units such as words. The unit cut-out section 5102 is a functional section that distinguishes the dictionary reference units constituting the retrieve key character arrays upon retrieving the dictionary 5018 in the dictionary retrieving section 5104 subsequently. The dictionary reference delimiters used in the cut-out processing for the dictionary reference unit are placed at the position of English character, numeral, apostrophy, characters other than hyphen and period, as well as apostrophy succeeding to a vacant character. They are stored in a delimit table 5108 and referred to upon cutting-out the dictionary reference unit in the unit cutout section 5102.

The reference dictionary 5018 stores, particularly, the information for retrieving the cut-out unit. For instance, as shown in FIG. 38 for the example of the entry information, grammatical information such as part of speech is contained for each of the dictionary reference units, for example, entry for word. The part of speech information contains, for the noun, an indication as to if it is a common noun or proper noun. For the proper noun, a distinguishing indication showing the way of limiting the position in the sentence, that is, a positional information for the proper noun is stored. This is to be described specifically later. There are also registered as other informations, for example, countability or not-countability of a noun, distinguishment as to intransitive verb or transitive verb, translation thereof, etc.

There are four kinds of positional information for the proper noun, that is, patterns "0"–"3" in the present embodiment. The pattern "0" indicates a proper noun with no positional restriction, for example, "City" or name of person "Walter". The pattern "1" indicates that it is a proper noun, for example, "Mr." situated at the top of a single proper noun, or a succession of a plurality of proper nouns, that is, a proper noun arranged in a single set of proper nouns. The pattern "2" indicates that it is a proper, for example, "Station" or "Bay" noun situated at the end of a single proper noun, or a proper noun arranged into one word as a set of proper nouns and which is other than the pattern "3" described below. The pattern "3" indicates that it is a proper noun, for example, "River" in "the Sumida River", which is the same as pattern "2" but accompanies a definitive article "the" at the top of a proper noun arranged into one as a set of proper nouns.

The dictionary retrieving section 5104 is a functional section that takes out a dictionary information by retrieving the word dictionary 5013 based on the retrieve key character array inputted from the unit cutout section 5102 and transfers the same to the dictionary information preserve table 5124, the positional information processing section 5110 and the preceeding sentence end judging section 5112.

The processing based on the patterns "0"–"3" in accordance with the positional information for the proper nouns retrieved from the dictionary 5018 are conducted by proper noun processing sections 5114, 5116 and 5118. Processings for the proper nouns are conducted by the pattern 1 in the proper noun processing section 5114, by the patterns 2 and 3 in the proper noun processing section 5116 and by the pattern 0 in the proper noun processing sections 5118 and 5114 respectively.

In this embodiment, the proper nouns are collectively arranged using, as a key, a word constituting a portion of a set of proper nouns grouped into a single proper noun and undergoes a positional restriction when arranged as a proper noun. Thus, even a plurality of proper nouns are present continuously, they can be arranged properly along with the context with no such erroneous arrangement of always arranging them simply as a single set of proper nouns. The processings for such purpose are conducted in the proper noun processing sections 5114, 5116 and 5118.

Proper nouns to some extent are registered in the reference dictionary 5018. Such dictionary registered proper nouns are subjected to parsing in the positional information processing section 5110 and the proper noun processing sections 5114, 5116 and 5118. They constitute a dictionary registered proper noun processing section. Those proper nouns not registered in the dictionary 5018 are parsed in the preceeding sentence and judging section 5112 and the pattern "0" proper noun processing section 5118. These constitute the processing section for dictionary not registered proper nouns.

Processing for a proper noun is conducted by the following two steps. At first, a proper noun in the input character array is recognized. In the case of a word registered in the dictionary 5018 this is done by that the proper noun is indicated in the morpheme actuation information thereof. Further, in the case of a word not registered in the dictionary 5018, it is done by that one character at the top is an English capital, for example, "John" or "U.S.", etc.

Then, a set of proper nouns is collectively arranged to render the entire portion as a single proper noun. When it is recognized as a proper noun from the dictionary information and if the next dictionary reference unit is also a proper noun, the entire portion is collectively synthesized into one proper noun.

For instance, "M. Weber" is analyzed as one proper noun as a whole. The result of the parsing forms a candidate for grouping the idiomatic expression including proper nouns in the local parsing.

Then, necessary local parsing is conducted. In this case, a succession of parsing units actuated by the morpheme actuation information for each of the parsing based on a local parsing rule, for instance, arrangement by a till is effected. For example, "Mr. Brown" is collectively arranged into "Brown shi". Further, words constituting a portion of a district name are also arranged collectively. For instance, "Lake Biwa" is collectively arranged into "Biwako". In the same way, words constituting a portion or a group name are also collectively arranged. For example, "Yale University" is analyzed as "Yale Daigaku".

In the case of the proper noun "Mr.—" or "Lake—", an end in view of the context is always present just before the word. Accordingly, in the English sentence "With Tom Mr. Brown went to—", a certain end is present between "Tom" and "Mr." in view of the context. Accordingly, if "Tom Mr. Brown" is arranged collectively into a single proper noun, an error is caused in the subsequent parsing. For example, a proper noun "University" is always followed by end just thereafter. For instance, in an English sentence "At Yale University Tom is—", it is recognized that there is a punctuation between "University" and "Tom". In this embodiment, information for the position where respective proper nouns in the succession of proper nouns undergo a positional restriction is stored in the dictionary 5018 as the positional information described above, that is, patterns "0"-"3". The collective arrangement using these positional informations are conducted in the processing sections 5110, 5112, 5114, 5116 and 5118. The dictionary information for the input character array after the completion of these processings are stored in the retrieved dictionary information buffer, that is, the dictionary information preserve table 5124.

The result of the morphological analysis is transferred from the dictionary information preserve table 5124 to the syntactic analysis section I 5020.

Figure 40:
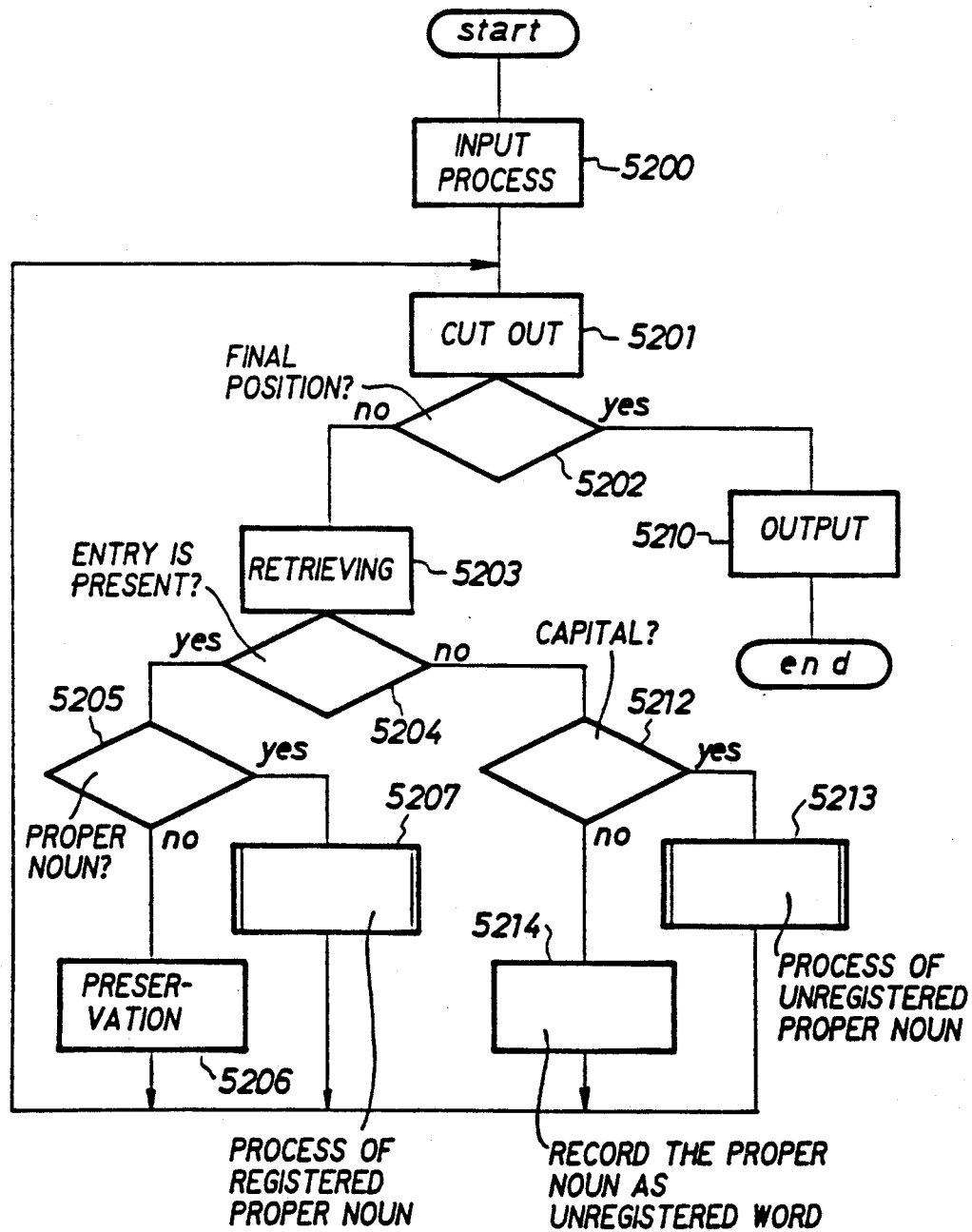
Figure 42:
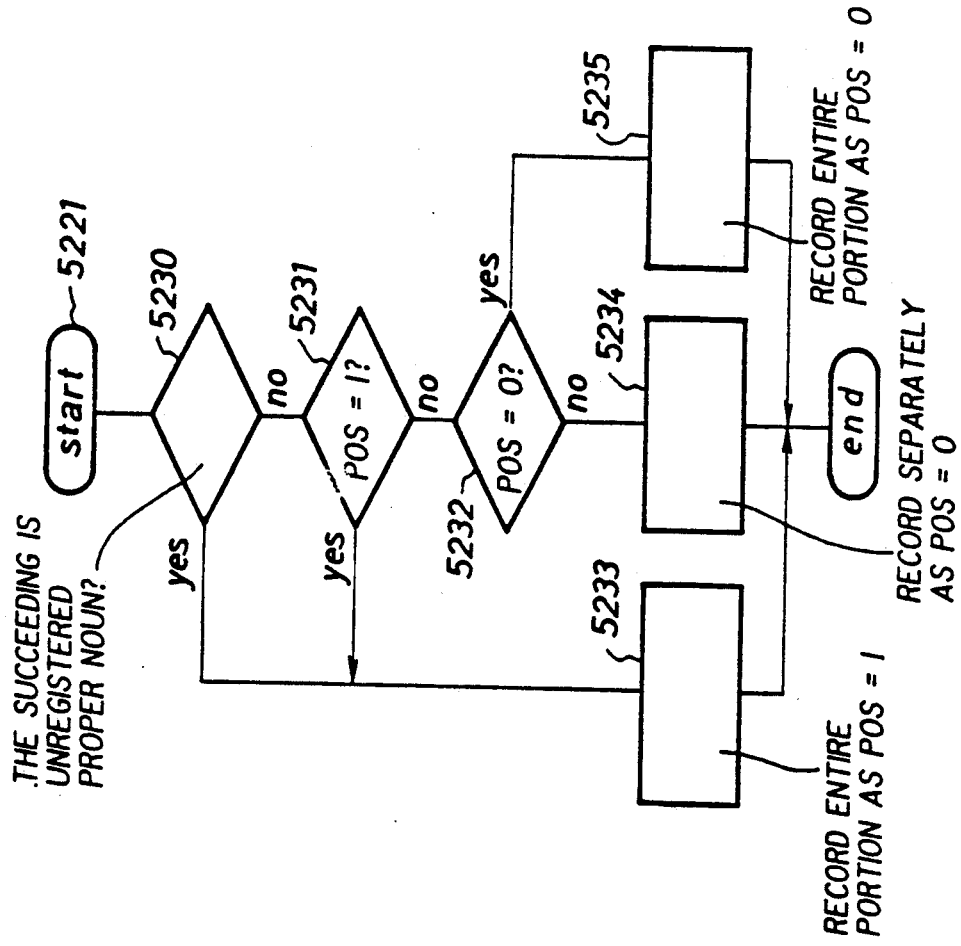

The processing by the proper noun position information is conducted through the sequence as shown in FIG. 40. Input processing is conducted by receiving the data for the input character array in the input processing section 5100 (5200). Then, the unit cut-out section 5102 cut-outs the input character array into dictionary reference units for retrieving the dictionary 5018 (5201). The dictionary retrieving section 5104 retrieves the dictionary 50i8 in accordance therewith (5203) and, if there is a dictionary entry (5204), examines the part of speech thereof (5205). If the part of speech is not a proper noun, the processing for the proper noun in this embodiment is not conducted but the dictionary information is accumulated in the dictionary information preserve table 5124 (5206). If it is a proper noun, processing for the dictionary registered proper noun 5207 is conducted in the positional information processing section 5110 and the proper noun processing sections 5114, 5116 and 5118. When these processings are conducted to the final position of the sentence indicated by the data for the input character array (5202), the result of the morphological analysis is outputted to the sentence syntactic analysis section I 5020 (5210).

As a result of the dictionary reference, if there is no entry in the step 5204 and if the element starts from a capital (5212), it is recognized as a proper noun not registered in the dictionary and processing for dictionary not registered proper noun 5213 is conducted in the preceeding part judging section 5112 and the proper noun processing section 5118. If the initial character is not a capital, since this is a word not registered in the dictionary 5018, it is preserved as a not registered word in the dictionary information preserve table 5124 (5214). The proceeding is executed to the final position (5202).

Figure 41:
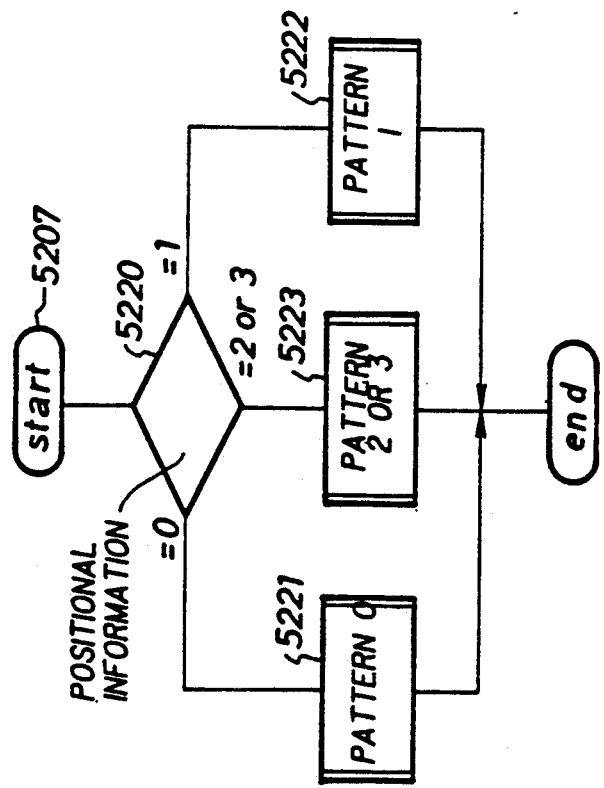

The processing for the dictionary registered proper noun 5207 is conducted in the processing sections 5110, 5114, 5116 and 5118 in the process flow as shown in FIG. 41. At first, the obtained positional information contained in the dictionary information is referred to (5220). Then, the proper noun processing 5221 for the pattern 0 is conducted if it indicates the pattern "0", the proper noun processing 5222 is conducted for the pattern 1 if it indicates the pattern "1" and the proper noun processing 5223 is conducted for the patterns 2, 3 if it indicates the pattern "2" or "3" respectively.

The proper noun processing 5221 for the pattern 0 is executed in the processing section 5114. The processing is applied to a proper noun having no positional restriction. At first, if a part preceeding to the dictionary reference unit in question is a not registered proper noun (5230), the entire portion is collectively arranged into a proper noun with the proper noun positional information pos is "1" and stored in the dictionary information preserve table 5124 (5233). If the preceeding part is a proper noun with the positional information pos "1" (5231), the processing is conducted in the same way.

If the preceeding part is a proper noun with a positional information "0" (5231), the entire portion is collectively arranged into a proper noun with a positional information of "0" and stored in the dictionary information preserve table 5124 (5235). Further, if the preceeding part is not a proper noun with a positional information "0", the entire portion is stored alone as a proper noun with a positional information "0" into the dictionary information preserve table 5124 (5134).

The proper noun processing 5222 for the pattern 1 is conducted as described below. This processing is applied to a proper noun such as, for example, "Mr." situated at the top of a single proper noun or at the top of a proper noun arranged into one group as a succession of a plurality of proper nouns. At first, if the part preceeding to the dictionary reference unit in question is a not registered proper noun (5240), the word is converted into not-registered (5241). If it is not a not registered proper noun, it is stored alone as a proper noun with the positional information pos "1" into the dictionary information preserve table 5124 (5242).

Figure 44:
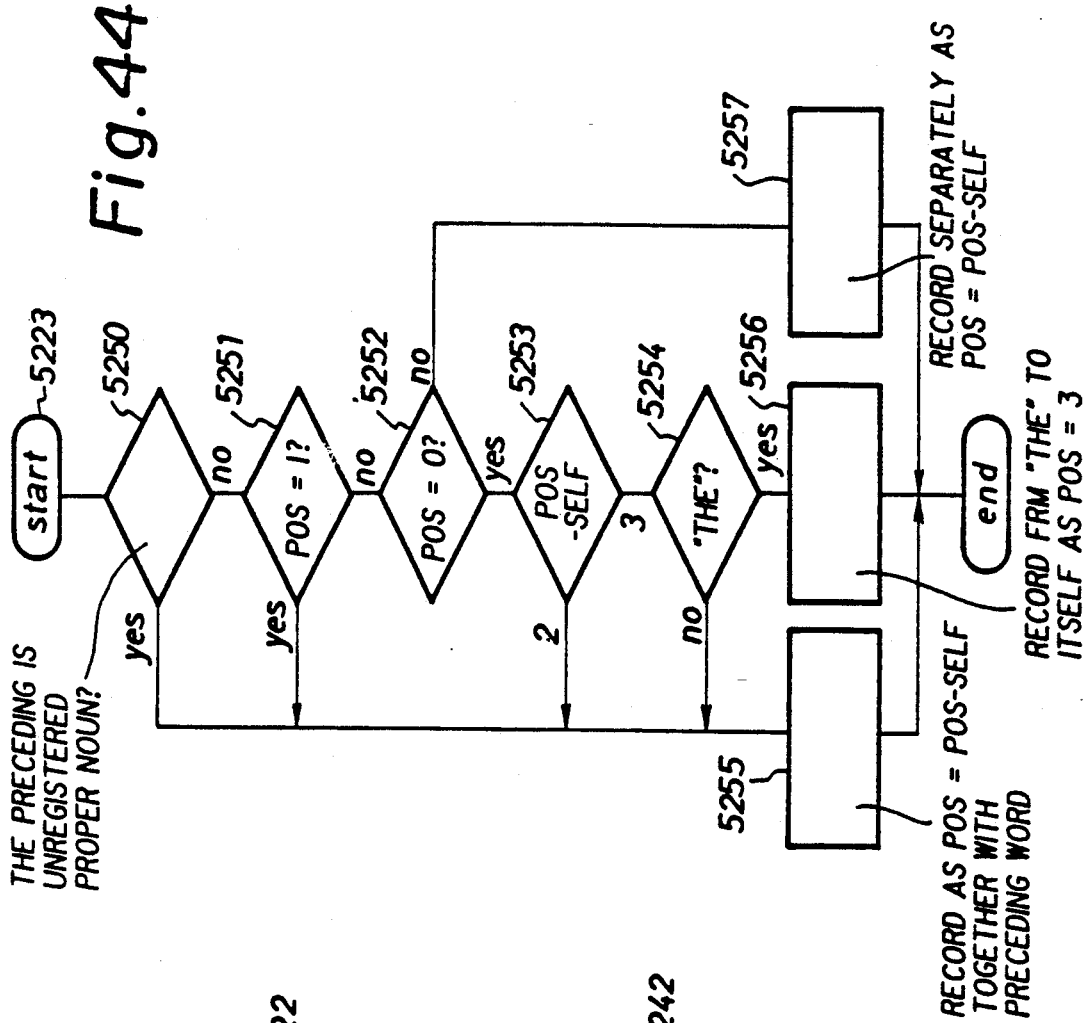
Figure 43:
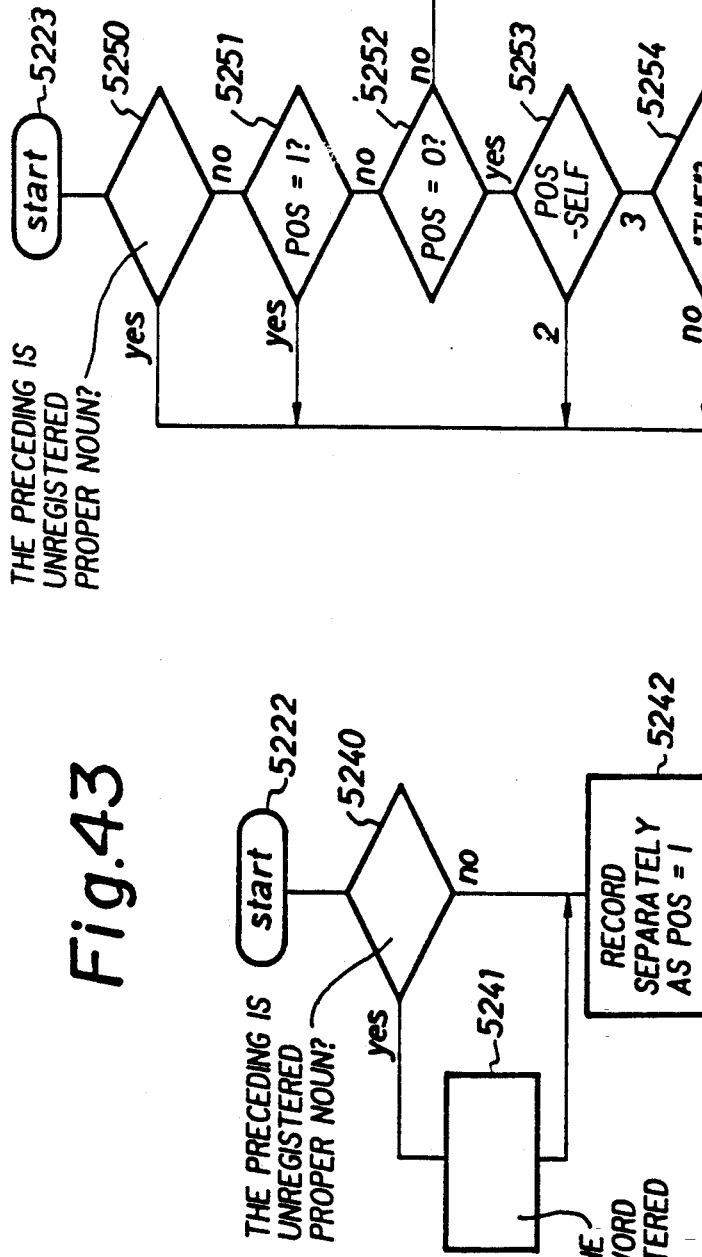
Figure 45:
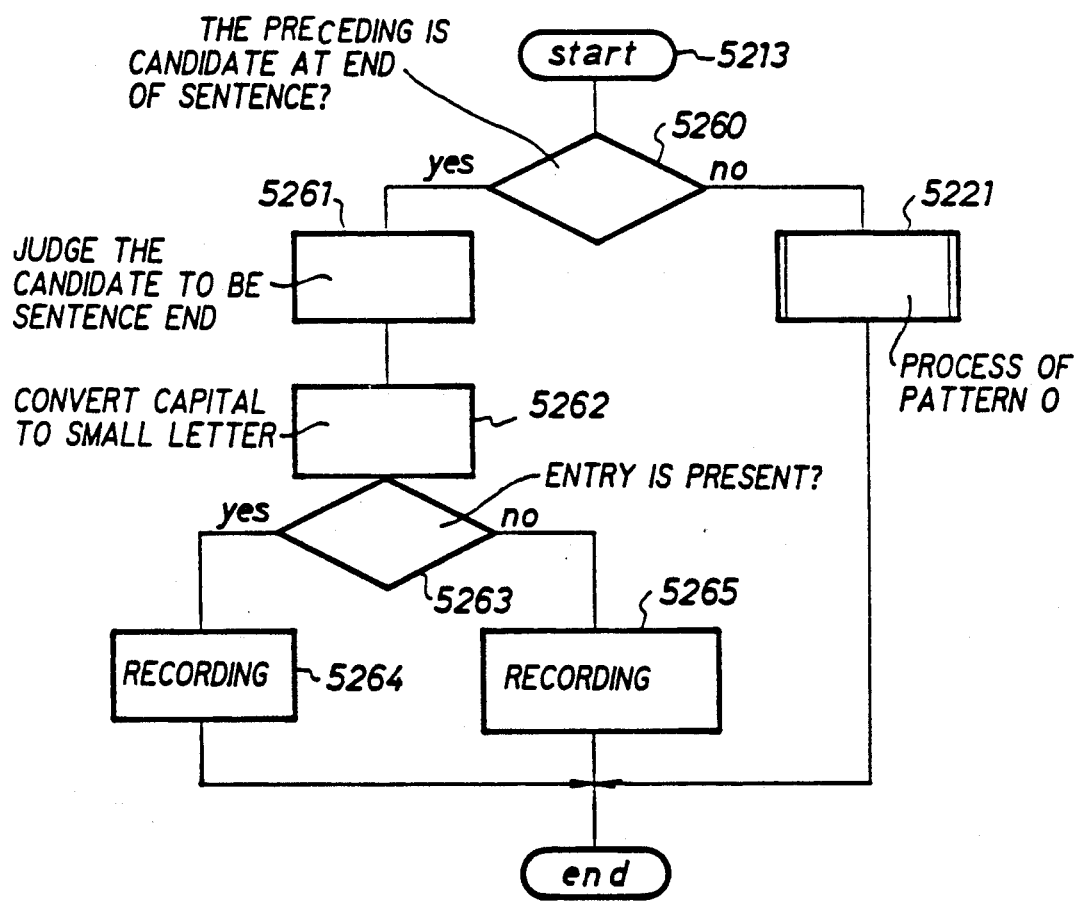

Explanation will then be made to the proper noun processing 5223 for pattern 2, 3 while referring to FIG. 44. The processing is applied, for example, to such a proper noun as "Station" or "River" situated at the end of a single proper noun, or a proper noun arranged into one set as a successive of a plurality of proper nouns. At first, if the part preceeding to the dictionary reference unit in question is a not registered proper noun (5250), it is collectively arranged together with the preceeding word as a proper noun having the proper noun positional information pos-self of its own as the proper noun positional information pos and stored in the dictionary information preserve table 5124 (5225). Further, the processing is conducted in the same way if the preceeding part is a proper noun with the positional information "1" (5251).

If the preceeding part is not a proper noun with the positional information "0" (5252), it is collectively arranged alone into a proper noun having the proper noun positional information pos-self of its own as the proper noun positional information and stored in the dictionary information preserve table 5124 (5257).

In the step 5252, if the preceeding part is a proper noun of the positional information "0", the proper noun positional information pos-self of its own is checked (5253) and the processing 5255 it effected if it is the pattern "2". If the proper noun positional information pos-self of its own is the pattern "3", it is further checked as to whether the element before one dictionary reference unit is "the" or not. If it is not the definite article "the", the processing 5255 is conducted. If it is "the", the group from "the" to the element of its own is collectively arranged as a proper noun with the proper noun position information "3" and stored in the dictionary information preserve table 5124 (5256).

For a word starting from a capital and recognized as a not registered word for which no entry is obtained from the reference dictionary 5018 as a result of the dictionary retrieval 5203, flow is transferred by way of the step 5204 and 5212 to the processing 5213 and the processing 5213 is executed in the preceeding sentence end judging section 5112. At first, if the preceeding part to the dictionary reference unit in question is not a candidate for the end of the sentence, the proper noun processing 5221 for the pattern 0 as described above is conducted in the processing section 5118.

The preceeding part can be a candidate for the end of the sentence in the following four cases. The first is a case where a separated period "." is present. Next, there is a case where the preceeding entry has the period at the last and the positional information for the proper noun is not "1". This case includes, for example, an abbreviation "U.S.A.". Furthermore, there is a case of colon ":" semicolon ";" a succession of a period and a apostrophy ".'" and a succession of a period and a quotation mark ".'''". The final case is that it is at the top of the input character array buffer.

If the preceeding part is any one of the abovementioned four cases, the preceeding candidate for the end of the sentence is recognized as the sentence end (5261) and the dictionary is retrieved after converting the capital of that word into a small character (5262). As a result of the retrieval, when a dictionary entry is obtained (5263), it is recorded in the dictionary preserve table 5264 (5264). If not, it is recorded as a not-registered proper noun into the dictionary preserve table 5264 with the top character being left unchanged as the capital (5265).

Explanation will be made referring to an example. For instance, when dictionary is referred to for an input character array "Along the Sumida River Paul and Mr. Gold Smith went—", the dictionary entry information is at first written into the dictionary information preserve table 5124 as shown in FIG. 46A. Referring, for example, to "the", the starting position in the sentence is "7" and end position is "9" in the sentence and the part of speech is a definitive article. No entry can be obtained for the word "Along" at the top of the input character array in the dictionary retrieval 5203 and it is judged as not registered. However, since the preceeding part can satisfy the condition of the candidate for the sentence end that it is at the top of the input buffer (5260), the capital "A" at the top is converted into a small character and dictionary retrieval 5262 is conducted as "along".

Then, the pointer is incremented to transfer to the processing for "Sumida". This word is not registered in the dictionary 5018 in this embodiment. Since the preceeding part is not a candidate for the end of the sentence, the flow is transferred to the proper noun processing 5221 for pattern 0. As shown in FIG. 46A, a proper noun for the part of speech and "0" for the proper noun positional information are retrieved.

The next dictionary reference unit "River" is a proper noun with the proper noun positional information "3". The preceeding part is a proper noun with the positional information "0" and a further preceeding part is "the". In view of the above, "the Sumida River" is collectively arranged into a single proper noun by way of the steps 5250–5254 and stored, as the proper noun positional information "3" into the dictionary information preserve table 5124 (FIG. 46B).

Then, the next dictionary reference unit "Paul" is a not registered proper noun with the proper noun positional information "0", to which processing 5213 is executed. Although the preceeding word is a proper noun, since the positional information therefor is "3", it is not collectively arranged therewith but the dictionary information is accumulated as it is in the table 5124 (FIG. 46C). Ordinary processing is applied to the conjunction "and" succeeding thereto.

The next word "Mr." is a proper noun with the positional information "1", which is accumulated at it is in the dictionary information preserve table 5124 (FIG. 46D). Even if the preceeding part is a proper noun "Paul", since punctuation between words is present just before "Mr.", it may be preserved as it is into the dictionary information preserve table 5124.

Further, the word "Gold" is a proper noun not registered in the dictionary and applied with the processing 5213. Since the word "Mr." preceeding thereto has a positional information "1", both of them are collectively arranged and the entire portion is formed into a proper noun with the positional information "1" (FIG. 46E). Then, the processing is similarly conducted to the next word "Smith" (FIG. 46F). The subsequent "went" is a past form of a verb and usual parsing is conducted hereinafter.

As described above in the present embodiment, proper nouns are collectively arranged by using, as a key, a word that constitutes a portion of a group of proper noun collectively arranged into a single proper noun and undergoes a positional restriction when they are collectively arranged into a proper noun. In this way, even if a plurality of proper nouns are present continuously, it is possible to conduct proper collective arrangement along with the context with no such erroneous collective arrangement of simply grouping them into a set of proper nouns. In the above-mentioned example, "the Sumida River" are analyzed as a group of proper nouns being separated from the succeeding "Paul". Further, "Mr. Gold Smith" is also analyzed as a group of proper nouns.

Explanation will then be made to the sixth embodiment according to the present invention.

Figure 47:
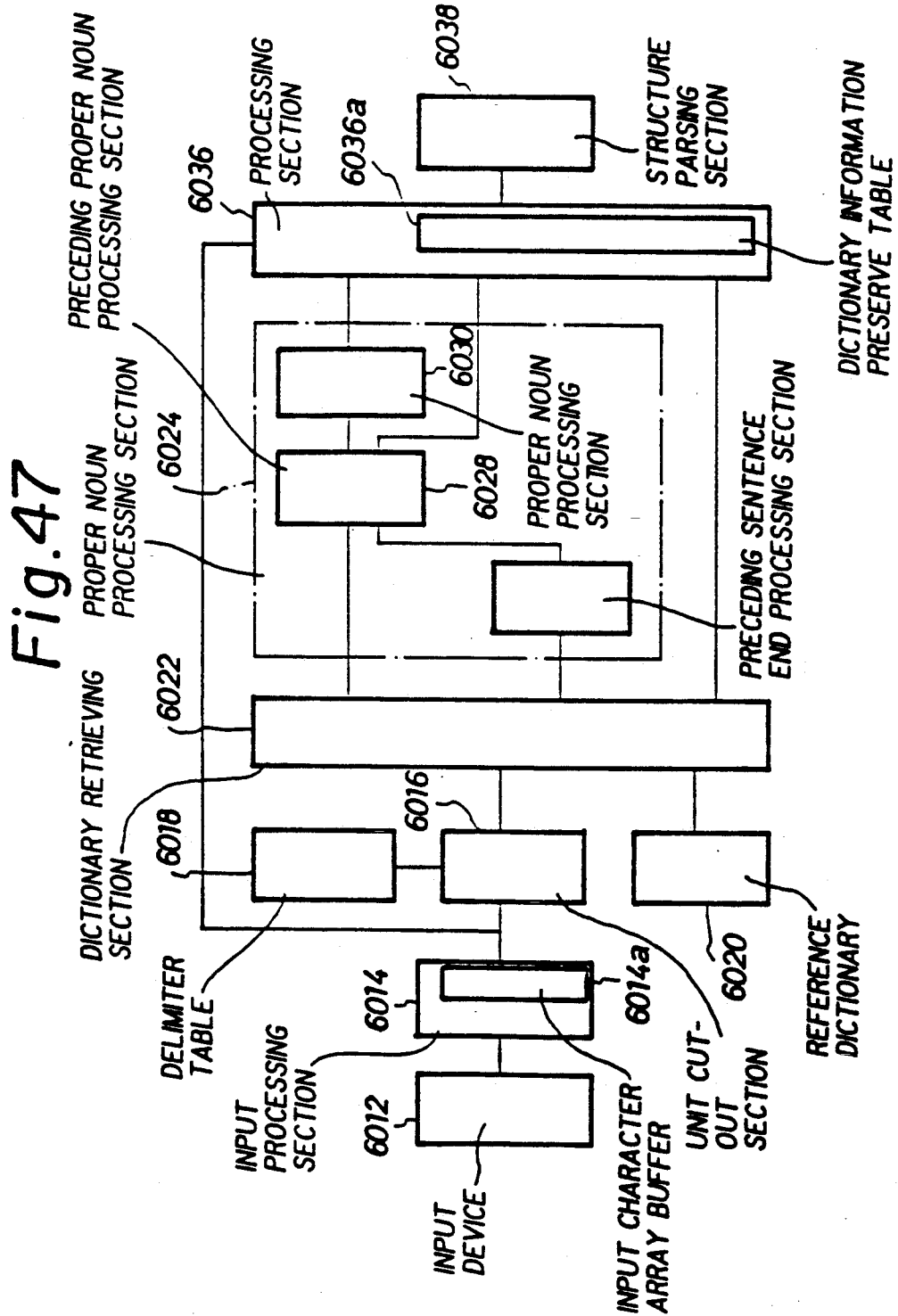

FIG. 47 illustrates the sixth embodiment of the language analyzer according to the present invention applied to an English-Japanese automatic translation device.

The present embodiment has an input processing section 6014 and data are inputted to the input processing section 6014 from an input device 6012. The input device 6012 includes, for example, a key board comprising a character keys such alphanumerical keys or function keys, an optical character reading device for reading the English text recorded on paper and reading device for a magnetic disc.

The input processing section 6014 has an input character array buffer 6014a and stores the English input sentence inputted from the input device 6012 in the input character array buffer 6014a. The input processing section 6014 reads out the input sentence stored in the input character array buffer 6014a and outputs it to a unit cutout section 6016. the unit cut-out section 6016 is a functional section that cut-outs the dictionary reference units from the input sentence sent from the input processing section 6014 by the retrieval to a delimiter table 6018. The delimiter table 6018 contains delimiters such as space, comma, etc.

The unit cut-out section 6016 reads out the delimiters from the delimiter table 6018 and divides the input sentence sent from the input processing section 6014 into character arrays as the units for retrieving a reference dictionary 6020 by dividing the sentence at the portions where the delimiters are present. The divided character arrays are inputted to a dictionary retrieving section 6022.

The dictionary retrieving section 6022 retrieves the reference dictionary 6020 for the input sentence sent from the unit cut-out section 6016 divided into dictionary reference units. The reference dictionary 6020 contains, for example as shown in FIG. 48, entries for the character arrays, part of speech thereof, feature information, etc. of the English sentence. The reference dictionary 6020 contains, in addition to proper nouns shown in the figure, those character arrays for other part of speech, for example, verb, adjective, etc. The proper noun as the part of speech in this figure, means those applied with the registered proper noun processing described later but does not express usual grammatical proper noun. Further, the feature information indicates what the proper noun concerned expresses and is not restricted only to one.

The dictionary retrieving section 6022 retrieves the reference dictionary 6020 for the character array divided into the dictionary reference unit and, if the character array is a proper noun, outputs it to a proper noun processing section 6024 for conducting the proper noun processing described later. Further, if it is not a proper noun, it is outputted to a processing section 6036 and is stored in the dictionary information preserve table 6036a in the processing section 6036.

The proper noun processing section 6024 comprises a preceeding sentence end processing section 6026, a preceeding proper noun processing section 6028 and a proper noun per se processing section 6030.

The preceeding sentence end processing section 6026 judges as to whether a character array preceeding to the inputted character array retrieved from the dictionary retrieving section 6022 is at the end of the sentence or not and, if the preceeding character array is at the end of the sentence, sends it to the dictionary retrieving section 6022 after converting the capital at the top of the character array to be processed into a small character and causes the dictionary retrieving section 6022 to retrieve the reference dictionary 6020 again. The character array not retrieved by the second retrieval is judged as a not registered proper noun, sent to the processing section 6036 and preserved in the dictionary information preserve table 6036a. Further, if the character array preceeding to the inputted character array is not at the end of the sentence, it is sent to the processing section 6036 as a proper noun the feature information of which is unknown and registered in the dictionary information preserve table 6036a as described later.

The preceeding proper noun processing section 6028 parses the feature information for the preceeding character array sent from the preceeding sentence end processing section 6026 and outputs the result to the proper noun per se processing section 6030. The proper noun per se processing section 6030 checks the feature information for the proper noun to be parsed and, as described later, if the feature information is not registered to either one of the proper noun and the preceeding proper noun, parses the proper noun and the preceeding proper noun together by means of the registered feature information of the other and stores the result thereof in the dictionary information preserve table 6036a in the processing section 6036.

The processing section 6036 has the dictionary information preserve table 6036a, stores the data sent from the preceeding proper noun processing section 28 or the dictionary retrieving section 6022 into the dictionary information preserve table 6036a and then reads out the thus stored data and outputs them to a syntactic analysis section 6038. The syntactic analysis section 6038 conducts the structure analysis for the input sentence, read out from the dictionary information preserve table 6036a and subjected to the morpheme analysis.

The operation of the device will be explained referring to the flow chart illustrated in FIG. 49.

At first, an English input sentence from the input device 6012 is read into the input processing section 6014 (6100). The input sentence read into the input processing section 6014 is stored in the input character array buffer 6014a. The input sentence stored in the input character array buffer 6014a is read out to the unit cut-out section 6016.

When the input sentence is inputted, the unit cut-out section 6016 reads out delimiters from the delimit table 6018 to conduct cut-out for the dictionary reference units (6102). That is, the character arrays constituting the inputted input sentence are divided successively from the top thereof into retrieve key character arrays as the units upon retrieving the reference dictionary 6020 by dividing at the positions where the delimiters such as space and colons are present. It is judged as to whether the divided dictionary reference units, i.e., the retrieve key character arrays have been ended or not (6104) and, if there is still present a retrieve key character array (not ended), the retrieve key character array is sent to the dictionary retrieving section 6022.

When the retrieve key character array is sent to the dictionary retrieving section 6022, the dictionary retrieving section 6022 retrieves the reference dictionary 6020 for the retrieve key character array (6106). It is judged as to whether the retrieve key character array is present or not in the entry of the reference dictionary 6020 as shown in FIG. 48 (6108) and, if there is an entry, part of speech information stored in the reference dictionary 6020 is read out and judged if the retrieve key character array is a proper noun or not (6110).

In a case if the retrieving character array is not a proper noun, the dictionary retrieving section 6022 sends the data read out from the reference dictionary 6020 to the processing section 6036 and stored them in the dictionary information preserve table 6036a (6112). When the data are stored in the dictionary information preserve table 6036a, an input indicating that the data are stored and the data for the retrieve key character array stored just before are inputted from the processing section 6036 to the unit cut-out section 6016. Thus, the flow is returned to the step 6012 and the cut-out for dictionary reference unit again conducted in the unit cut-out section 6016.

In the step 6110, if the retrieve key character array is a proper noun, the dictionary retrieving section 6022 sends the proper noun read out from the reference dictionary 6020 (hereinafter simply referred to as a proper noun), together with the data of the preceeding retrieve key character array inputted from the dictionary information preserve table 6036a in the processing section 6036 by way of the unit cut-out section 6016 to the dictionary retrieving section 6022, to the proper noun processing section 6024, where the processing for the dictionary registered proper noun is conducted (6114).

Figure 50:
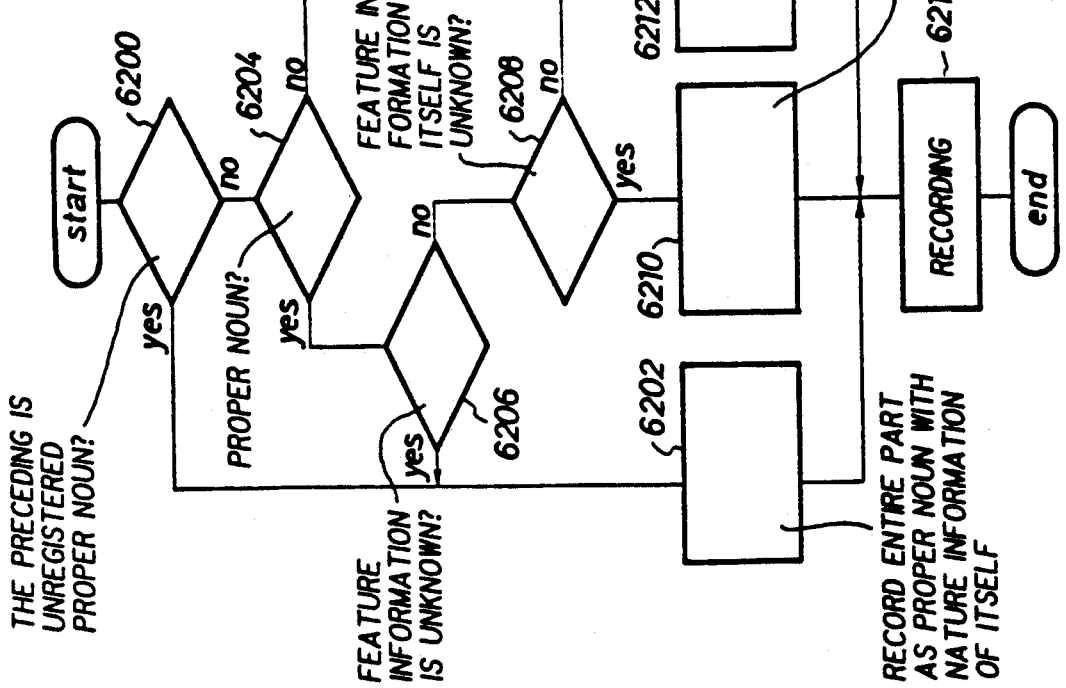

Then, explanation is made to the processing for the dictionary registered proper noun while referring to the flow chart shown in FIG. 50.

The data sent from the dictionary retrieving section 6022 to the proper noun processing section 6024 are inputted by way of the preceeding sentence end processing section 6026 to the preceeding proper noun processing section 6028. In the processing for the dictionary registered proper noun, the preceeding sentence end processing section 6026 does not function.

In the preceeding proper noun processing section 6028, it is judged as to whether the retrieve key character array preceeding to the proper noun is a proper noun not registered in the reference dictionary 6020 or not, that is, if it is a proper noun subjected to the processing for the dictionary not registered proper noun (6200) or not as described later. If it is a not registered proper noun, the entire portion of the proper noun and the preceeding not registered proper noun is judged as a proper noun having the feature information of proper noun (6202), and the data are sent to the processing section 6036 and stored in the dictionary information preserve table 6036a (6214).

In the preceeding proper noun processing section 6028, if the retrieve key character array preceeding to the proper noun is judged to be a not registered proper noun, in the step 6200, it is judged as to whether the retrieve key character array preceeding to the proper noun is a proper noun registered in the reference dictionary 6020 or not (6204). If the retrieve key character array preceeding to the proper noun is a registered proper noun, it is judged as to whether the feature information of the preceeding proper noun is unknown or not, that is, whether it is not registered in the reference dictionary or not 6020 (6206).

If the feature information of the preceeding proper noun is unknown, the flow is advanced to the step 6202, where the entire portion of the proper noun and the preceeding proper noun as a single proper noun having the feature information of the proper noun (6202), and the preceeding proper noun processing section 6028 sends the data to the processing section 6036. The data sent to the processing section 6036 are stored in the dictionary information preserve table 6036a (6214).

In the preceeding proper noun processing section 6028, if the feature information of the preceeding proper noun is judged not unknown, that is, if it is judged to be registered in the reference dictionary 6020, the data are sent from the preceeding single proper noun processing section 6028 to the proper noun processing section 6030. In the proper noun processing section 6030, it is judged as to whether the feature information of the proper noun is unknown or not (6208). In a case where the feature information for the proper noun is unknown, the proper noun processing section 6030 judges the entire portion of the proper noun and the preceeding proper noun as a proper noun having the feature information of the preceeding proper noun (6210), and sends the data to the processing section 6036. The data sent to the processing section 6036 are recorded in the dictionary information preserve table 6036a (6214).

In the proper noun processing section 6030, if it is judged that the feature information of the proper noun is not unknown, that is, it is registered in the reference dictionary 6020, the proper noun processing section 6030 judges the proper noun as a proper noun having a feature information retrieved from the reference dictionary 6020, independently from the preceeding proper noun (6212), and sends the data to the processing section 6036. The data sent to the processing section 6036 are recorded in the dictionary information preserve table 6036a (6214).

Returning again to FIG. 49, if there is no retrieve key character array in the entry of the reference dictionary 6020 in the step 6108, it is judged as to whether the first character in the retrieve key character array is a capital or not (6116) and, if it is not a capital, the dictionary retrieving section 6022 judges the retrieve key character array as a not registered word, sends it to the processing section 6036 and stores it in the dictionary information preserve table 6036a (6118).

If the first character is a capital, the data for the retrieve key character array are sent together with the data for the preceeding retrieve key character array from the dictionary retrieving section 6022 to the proper noun processing section 6024 where the processing for dictionary not registered proper noun is conducted (6120).

Figure 51:
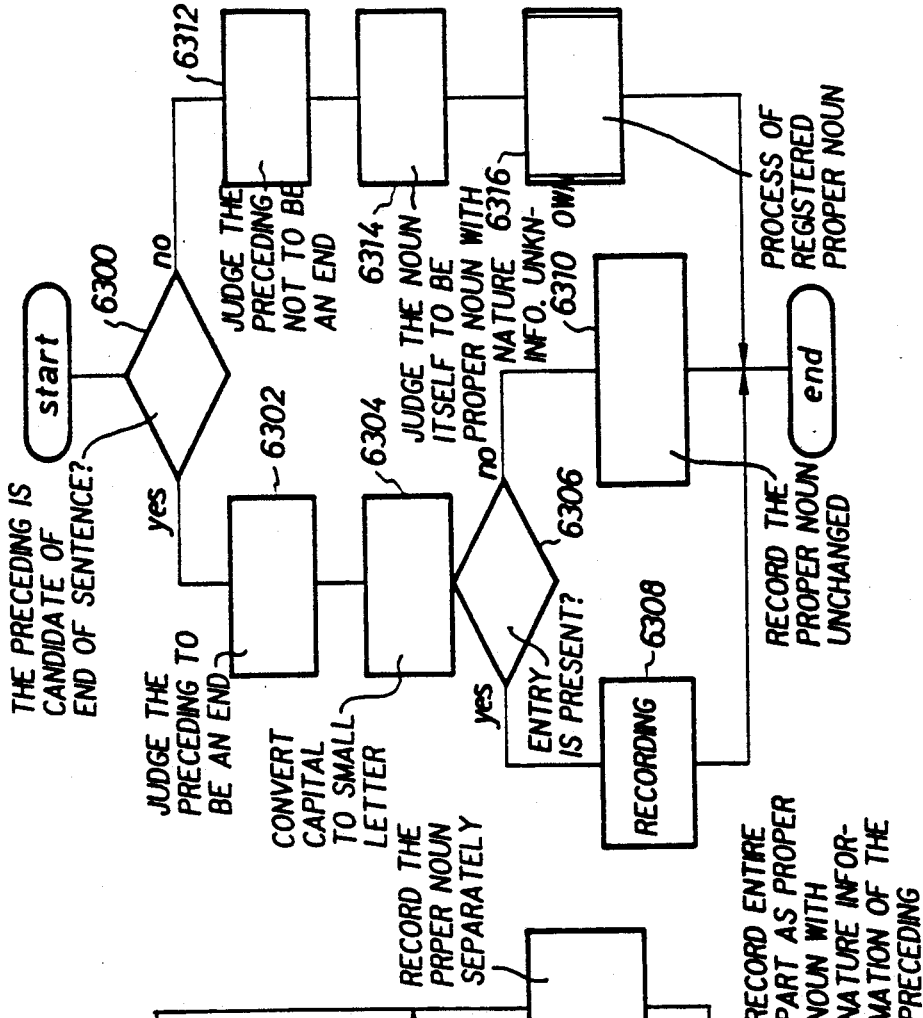

Explanation will be made to the processing for dictionary not registered proper noun referring to FIG. 51.

The data for the retrieve key character array are sent together with the data for the preceeding entry recorded in the dictionary information preserve table to the preceeding sentence end processing section 6026 when it is judged as to whether the end of the preceeding entry recorded in the dictionary information preserve table is a candidate for the end of sentence or not (6300). This judgement on the candidate for the end of the sentence is made by judging as to if the end of the preceeding entry recorded in the dictionary information preserve table is a candidate for the end of the sentence such as a separate period (.), etc. or not.

If the end of the preceeding entry recorded in the dictionary information preserve table is a candidate for the end of the sentence, data are sent from the preceeding sentence end processing section 6026 to the preceeding proper noun processing section 6028 and the processing section 6028 judges the preceeding entry recorded in the dictionary information preserve table as the end of the sentence (6302), and sends them to the dictionary retrieving section 6022 after changing the capital at the top of the retrieve key character array into a small character.

The dictionary retrieving section 6022 retrieves the reference dictionary 6020 for the retrieve key character array reformed to the small character (6304), and judges as to if there is an entry in the reference dictionary 6020 (6306). If there is an entry, the dictionary retrieving section 6022 sends the data retrieved from the reference dictionary 6020 to the processing section 6036 and stores them in the dictionary information preserve table 6036a (6308). If there is no entry, the dictionary retrieving section 6022 returns the first character in the retrieve key character array into the capital, sends it as a not registered proper noun to the processing section 6036 and stores it in the dictionary information preserve table 6036a (6310).

In the step 6300, if the preceeding sentence end processing section 6026 judges that the end of the preceeding entry recorded in the dictionary information preserve table is not a candidate for the end of the sentence, the data are sent from the preceeding sentence end processing section 6026 to the preceeding proper noun processing section 6028, and the preceeding proper noun processing section 6028 judges that the preceeding entry recorded in the dictionary information preserve table is not the end of the sentence (6312). The data are sent from the preceeding proper noun section 6028 to the proper noun processing section 6030 and the processing section 6030 judges the retrieve key character array as a proper noun the feature information of which is unknown (6314).

The proper noun processing section 6030 returns the data to the preceeding proper noun processing section 6028 and the processing for dictionary registered proper noun is conducted in the preceeding proper noun processing section 6028 (6316). The processing for the dictionary registered proper noun is the same as those shown in FIG. 50.

Returning to FIG. 49, if the dictionary reference units cut-out in the step 6104 are ended, the data recorded in the dictionary information preserve table 6036a are outputted from the processing section 6036 to the syntactic analysis section 6038 (6122), by which the morpheme analysis according to this embodiment is completed. The operation of the present device as has been described above will now be explained referring to an exemplified input sentence.

Explanation will be made referring to FIG. 52 in a case, for example, of an input sentence "In Tokyo Station Mr. Walter—" is inputted. At first, input processing 6100 for reading the input sentence into the input processing section 6014 is conducted. Then, the dictionary cutout unit is cut-out (6102), to divide the input sentence into respective words by spaces. At first, the reference dictionary 6020 is retrieved for "In" (6106). There is no entry for "In" in the reference dictionary 6020. When the step is advanced to the processing for dictionary not registered proper noun, since the proceeding part is recognized as the top of the sentence (top of the file), "In" is converted into "in". Since "in" has an entry in the reference dictionary 6020 and it is not a proper noun (6110), the data retrieved from the reference dictionary 6020 are recorded in the dictionary information preserve table 6036a (6112).

Then, the reference dictionary 6020 is retrieved for "Tokyo" (6106). Since there is no entry for "Tokyo" in the reference dictionary 6020 (6108) and the first character is a capital (6116), processing for dictionary not registered proper noun is conducted (6120). Then, the step is advanced to FIG. 51. Since the preceeding part is "In" and there is no candidate for the end of the sentence (6300), "In" is recognized as not the end of the sentence (6312), "Tokyo" is recognized as a proper noun the feature information of which is unknown (6314) and the processing for dictionary registered proper noun is conducted (6316).

Then, the step is advanced to FIG. 50. Since the preceeding "In" is neither a registered proper noun nor a not registered proper noun (6204), "Tokyo" is recorded alone as a proper noun having a feature information of its own, that is, a proper noun the feature information of which is unknown (6216).

Figure 49:
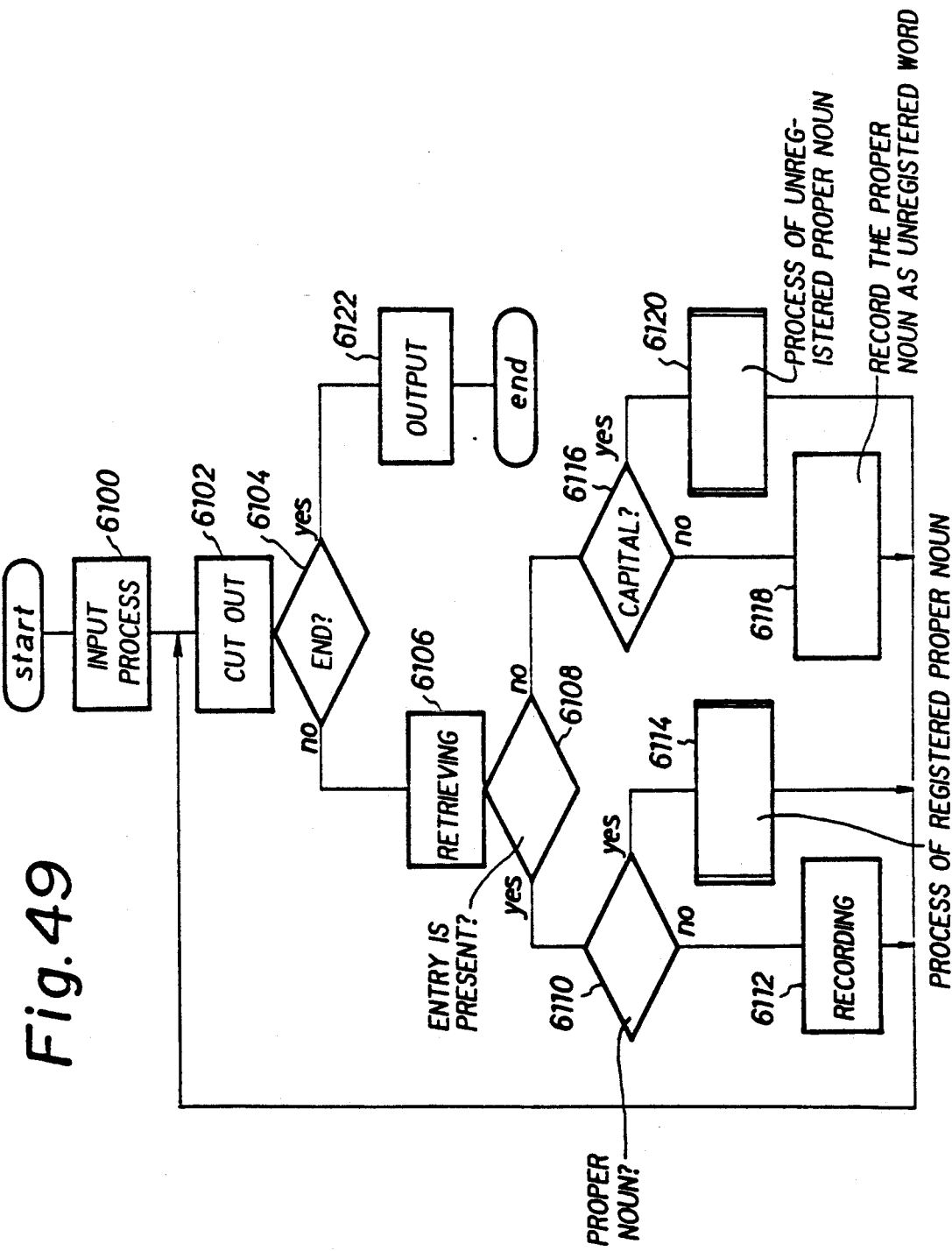

Then, the step is returned to FIG. 49 and the reference dictionary 6200 is retrieved for "Station" (6106). Since there is an entry for "Station" in the reference dictionary 20 (6108) and this is a proper noun (6110), processing for dictionary registered proper noun is conducted (6114). The step is advanced to FIG. 50. Since the preceeding "Tokyo" is a not registered proper noun (6200), the entire portion for "Tokyo Station" is recorded as a proper noun having the feature information "place" of "Station" (6202).

Then, the reference dictionary 6200 in FIG. 49 is retrieved for "Mr." (6016). Since there is an entry for "Mr." in the reference dictionary 6020 and it is a proper noun (6110), processing for dictionary registered proper noun is conducted (6114). Then, the step is advanced to FIG. 50. The preceeding "Station" is not a not registered proper noun (6200) but a registered proper noun (6204) and the feature information "place" is not unknown (6206). Since "Mr." has the feature information of "person" not unknown (6208), "Mr." is registered alone as a proper noun with the feature information of "person" (6212).

Then returning again to FIG. 49, the reference dictionary 6020 is retrieved for "Walter" (6016). Since "Walter" has an entry in the reference dictionary 6020 (6108) and it is a proper noun (6110), processing for dictionary registered proper noun is conducted (6114). Then the step is adversed to FIG. 50. Since the preceeding "Mr." is not a not registered proper noun (6200) but a registered proper noun (6204) with the feature information of "person" being not unknown (6202) while the feature information for "Walter" is unknown (6208), "Mr. Walter" are collectively arranged and recorded as a proper noun having the feature information of "person" (6210).

As has been described above, in the present embodiment, the English inpuy sentence is divided into retrieve key character arrays for which the reference dictionary 6020 is retrieved at first. If there is an entry as a proper noun in the reference dictionary 6020, processing for registered proper noun is conducted. The processing for registered proper noun is conducted while considering the preceeding entry recorded in the dictionary information preserve table. If the preceeding entry recorded in the dictionary information preserve table is a proper noun, the feature information is checked for the preceeding entry recorded in the dictionary information preserve table and the current proper noun to be processed. If either of them lacks in the feature information the feature information of the other of them is provided, whereas if both of them have feature information, they are recognized as proper nouns individually having inherent feature informations respectively.

Accordingly, it is possible to provide a proper noun having no feature information with feature information appropriately, as well as to restrict the provided feature information more properly. This enables more effective analysis in the subsequent structure analysis and adequate translation.

Further, for the character array not registered in the reference dictionary 6020, if the first character is a capital and the preceeding character array is judged to be the end of the sentence, the reference dictionary 6020 is retrieved again after changing the capital into a small character, and, accordingly, it is possible to retrieve the reference dictionary 6020 also for the character array at the top of the sentence. Furthermore, if a character array starting from a capital appears at a position other than the top of the sentence, it is judged as a proper noun and the feature information of the proper noun is provided by a proper noun with a registered feature information present before or after thereof. Accordingly, a proper noun not registered in the reference dictionary 6020 can be parsed to some extent.

Explanation will be made to the seventh embodiment of the present invention.

FIG. 54 illustrates the entire structure of the seventh embodiment of the language analyzer according to the present invention applied to an English-Japanese automatic translation device.

This embodiment has an input section 7010, by which an English text 7012 to be translated into Japanese is inputted. The input section 7010 may include, for example, a key board having character keys such as alphanumerical keys or function keys, an optical character reading device (OCR) reading the English text recorded on paper and/or a file memory device for reading the English text recorded on a memory medium such as a magnetic disc.

The English text inputted from the input section 7010 is read into a pre-editing section 7014 where the pre-treatment of translation is conducted. In this case, sentence recognition and unknown word treating are mainly conducted. This functions as a portion of morphological analysis.

Pre-edited English data are transferred together with the information obtained in the pre-edition to a morphological analysis section 7016. The morphological analysis section 7016 parses the morphemes of the English sentence while dividing them by retrieving a word dictionary 7018, conducts various kind of arrangements such as unknown word processing, expression for proper noun, time, numeral, etc. and conducts processing for the entire sentence such as tag question and apposition recognition. The morphological analysis rules are contained in a parsing rule file 7036.

The English data subjected to the morphological analysis are transferred together with the dictionary information obtained by the morphological analysis to a syntactic analysis section I 7020. The syntactic analysis I section 7020 is a functional section that parses the surface layer structure for the sentence while applying grammatical rules to English data and finds all of structural possibilities.

The English data subjected to the parsing in the syntactic analysis I section 7020 are sent together with the parsing information to a syntactic analysis II section 7022, in which a solution is selected from the result of the parsing in view of the surface layer structure in the syntactic analysis I by applying structural description. Thus, a plausible parsing tree of the English sentence is prepared and the structure is made. The parsing rules are also stored in the parsing rule file 7036.

The English data after subjected to the parsing are transferred as the data for the parsing tree to a structure transformation section 7024. The structure transformation section 7024 prepares a corresponding Japanese structure tree from the structure tree which is an intermediate English structure and transforms it into a Japanese-underlying structure from which a Japanese sentence can be translated with ease.

The structural tree data showing the Japanese-underlying structure thus transformed are sent to a translation generation section 7026 where a translated sentence is are generated. This is a functional section of generating a Japanese sentence from the Japanese structure tree.

The data for the Japanese formed as a translated sentence, that is, translated sentence data are sent to a post-editing section 7030. The post-editing section 7030 modifies the translation sentence data referring to the dictionary 7018 while using information utilized in the translation processing to complete a more natural Japanese sentence. The data for the Japanese sentence are transferred to an output section 7032 and then outputted therefrom as a translated Japanese sentence 7034. The output section 7032 can include, for example, a printer, a display and/or file memory device such as a magnetic disc.

The flow of a series of translation processings is controlled by a control section 7038 that governs the control for the entire device.

In the Word dictionary 7018, the dictionary data for English and Japanese words are stored in this embodiment. There are stated vocabularies, as well as connective relationship, that is, co-existent relationship or various informations such as meanings, singular or plural from, part of speech, etc. Further, rule data for morphological analysis and syntactic analysis are stored in the parsing rule file 7036.

The control section 7038 is connected with the operation display section 7040. The operation display section 7040 comprises operation keys for providing various instructions from an operator to the present device, for example, a translation instruction key and a cursor key, and a display or an indicator that visually displays the input English sentence text, the Japanese sentence as the result of translation, intermediate data such as dictionary information and various instructions to the operator.

It may be adapted such that most of the operation display functions may be included in a key board if it is disposed to the input section 7010, or a display if it is disposed to the output section 7032.

Referring to FIG. 53, detailed structures for the morphological analysis section 7016 regarding the processing for numerals are exemplified. Those portions having direct concerns with the understanding of the present invention are shown, although the morphological analysis section 70i6 naturally has other parsing functional sections.

The morphological analysis section 7016 has an input processing section 7100 for receiving and processing the input character array data inputted from the pre-editing section 7014. The input processing section 7100 is disposed with an input character array buffer inputted with data for the English character array in the form of code data such as ASCII and temporarily accumulate the data for the character array.

The input character array data temporarily accumulated in the input processing section 7100 are sent to a unit cut-out section 7102 that cut-outs the data into dictionary reference units such as words. The unit cut-out section 7102 is a functional section that distinguishes a dictionary reference unit constituting the character array upon retrieving dictionary 7018 in the dictionary retrieving section 7106 subsequently. Dictionary reference delimiters used in the cut-out processing for the dictionary reference unit are placed at the position of English character, numerical character, apostrophy, characters other than hyphen and period, as well as apostrophy succeeding to a vacant character. They are stored in a delimit table 7104 and referred to upon cutting out the dictionary reference unit in the unit cutout section 7102.

The dictionary 7018 contains information particularly for retrieving the cut-out unit. Further, the dictionary 7018 stores therein morpheme processing information such as name of month, name of day of week, cardinal number representing only numerical figure, ordinal number, unit for expressing gram or the like, time, the, of, comma (,), period (.), etc.

The dictionary retrieving section 7106 is a functional section that retrieves the dictionary 7018 to take out the dictionary information based on the character array inputted from the unit cut-out section 7102 and transfers the same to a morpheme processing information providing section 7108.

The morpheme processing information providing section 7108 contains morpheme processing providing information (refer to FIG. 56) indicating that a succession of characters having morphemic feature has a meaning of time such as hour, year, month, etc., where a further specific information is provided to the character array recognized to contain a cardinal number or meaning of time in the dictionary retrieving section 7016. For instance, such an information that "'numerical figure numerical figure" means "year" is provided.

The character array provided with information in the morpheme processing information providing section 7108 is further applied with necessary local parsing.

In this case, a unit set of the dictionary reference unit such as a word actuated by the morpheme actuation information is collectively arranged into one unit by using local parsing rules. For instance, "name of month", "numerical expression" are collectively arranged into "name of month+numerical expression". i.e., "Oct." and "18" are grouped into "Oct.18". Besides, collective arrangement are also made, for example "November the 2nd" for "name of month+the+-numerical expression ", "22 March" for "numerical expression * name of month", "the 23rd May" for "the+numerical expression * name of month", "the 11th of June" for "the+numerical expression+of+-name of month", "'86, Jan. 27. Mon." for "year+, +month and day+, +day of week", "Sunday, 26, Jan., 1986" for "day of week+, +month and day+, +year", "11:30 a.m." for "numerical figure:numerical figure-+a.m. (or p.m.)" or "name of month+year" "name of month+of+year", etc.

The processing for the local parsing is conducted in an initial value setting section 7110, a matching retrieving section 7112, a unit cut-out section 7114, a morpheme processing information providing section 7118, retrieving sections 7116 and 7120 and processing sections 7122 and 7124, as well as a matching table 7128 containing a morpheme processing indication table which is a distinguishing/referring table for distinguishing that a succession of units comprising numerical figure and time factors shown in FIG. 57 is an assembly unit of a time factors having a certain rule. The initial value setting section 7110 sets the initial value of a counter n that counts the number of dictionary reference units of matching upon retrieving a succession of dictionary reference units as a unit set described above in the matching retrieving section 7112.

The matching retrieving section 7112 retrieves the matching table 7128 for each of the dictionary reference units to conduct matching. The unit cut-out section 7114 distinguishes the dictionary reference units, assumed as "p", completed with the dictionary retrieval in the dictionary retrieving section 7106, from dictionary reference units constituting character arrays after the dictionary reference units completed with the dictionary retrieving by the counter n.

The retrieving section 7116 is a functional section having the similar function as that of the dictionary retrieving section 7106, retrieving the dictionary 7018 to take out the dictionary information based on the character array distinguished in the unit cut-out section 7114 and transferring the same to the morpheme processing information providing section 7118. The morpheme processing information providing section 7118 has the same function as the morpheme processing information providing section 7108, where a further specific information is provided to each of those recognized as an ordinal number or time factor in the retrieving section 7116.

The retrieving section 7120 and the processing sections 7122 and 7124 collectively arrange a succession of dictionary reference units up to "p+n" obtained from the matching retrieving section 7112 through the processing in the morpheme processing information providing section 7118 into one dictionary reference unit. Then, the result is stored in the dictionary information preserve table 7126 which is a buffer for storing the dictionary information completed with the retrieval.

The result of the morphological analysis is transferred from the dictionary information preserve table 7126 to the syntactic analysis section I 7020.

Figure 55B:
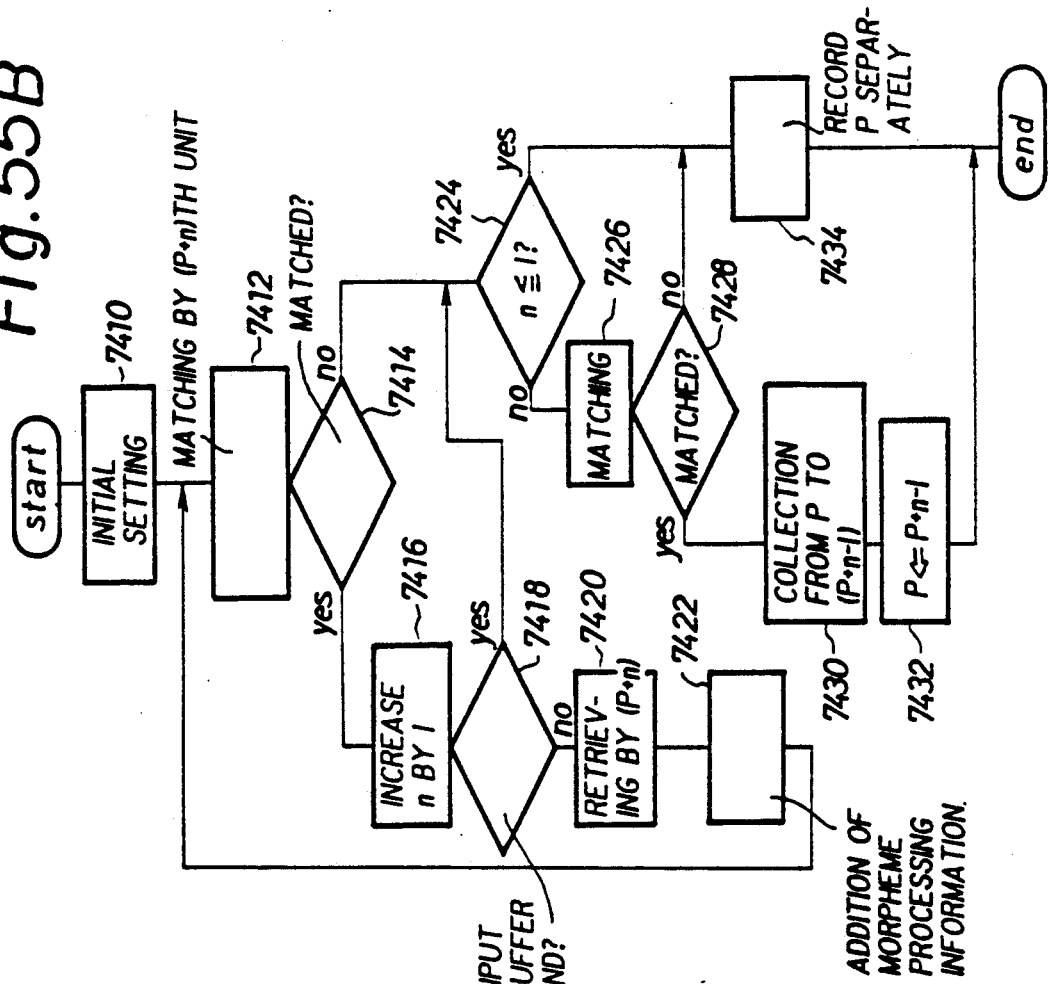
FIGS. 55A and 55B are flow charts illustrating an example of the morphological analysis.
Figure 55A:
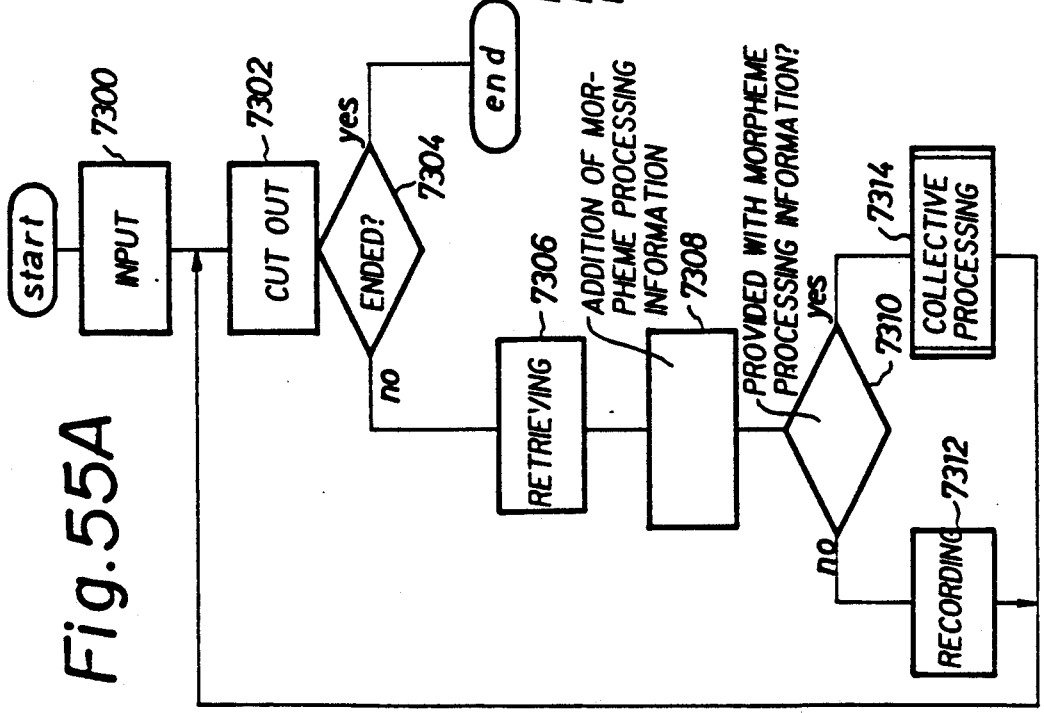

Then, explanation is made to the collective arrangement by the morpheme processing information according to the present invention referring to the flow charts shown in FIGS. 55A and 55B.

Assuming, for example, that the following character array is inputted to the input processing section 7100 (7300).

Input Character Array:
". . 26 Jan., '80 he . ."

The unit cut-out section 7102 cuts-out the input character array by the dictionary reference unit for retrieving the dictionary 7018 (7302). "26" in the input character array is cut-out as the unit by the cut-out of the dictionary reference unit. It is judged as to if the cut-out of the dictionary reference unit has been ended or not for the input character array and, if it is ended, the operation is ended (7304) whereas, if it is not yet, the flow is advanced to the following step 7306.

The dictionary 7018 is retrieved for "26" in the input character array cut-out by the unit for the dictionary reference to take out the dictionary information indicating that "26" is "numerical figure" (7306). Then, a morpheme processing information indicating that "numerical figure" has a morphemic feature, that is, it is a succession of numerical figures and treated as a grouped cardinal number (7308). It is judged if the group obtaining the dictionary information has been provided with the morpheme processing information or not in the step 7308 (7310). Then, if it is provided, the flow is advanced to the step 7314 for further applying processing based on the local analysing rule whereas not provided group is recorded in the dictionary information preserve table 7126 (7312) and the flow is returned to the step 7302. Accordingly, "26" provided with the morpheme processing information is advanced to the step 7314.

The processing in the step 7314 is conducted in accordance with the operation of the flow chart shown in FIG. 55B.

At first, a initial value "O" is set to a counter n that counts the number of matching dictionary reference units of matching when the dictionary reference units are retrieved in the matching retrieving section 7112 (7410). Further, since the dictionary reference unit completed with the dictionary retrieval in the dictionary retrieving section 7016 is set as "p", the matching table 7128 is retrieved for the p+nth (n=0) dictionary reference unit, that is, "26" by the matching retrieving section 7112 (7412). Since "26" has been provided with the morpheme processing information indicating that it is a cardinal number in the step 7308 and since those arrangements "each having a cardinal number" at the top of them are present at and after the second in the item for the arrangement in the matching table 7128 (refer to FIG. 57), the dictionary reference unit "26" is equal to and thus matched with the information of the matching table 7128. In this case, matching is conducted for Ms-Me while setting the second matched arrangement as "Ms", while the last data of the combination having the "cardinal number" at the top thereof as "Me" in the matching table 7128.

Based on the result of the matching in the matching table 7128 at $p+n_{th}$ (n=0) dictionary reference unit matching state is judged (7414) and, if it is judged to be matched, the flow is advanced to the step 7416 whereas, if it is judged not matched, the flow is advanced to the step 7424.

If it is judged to be matched, "1" is set to the counter n to conduct the cut-out for the dictionary cutout unit at $p+1_{th}$ (n=1) in the input character array. The cut-out is conducted in the same way as in the step 7302. The dictionary 7018 is retrieved for "Jan.," in the input character array cut-out as the dictionary reference unit next to "26" by the processing to provide the morpheme processing information (7420, 7422). These processing are conducted in the same manner as in the step 7306 and the step 7308.

By repeating the procedures from the step 7412 to the step 7422 above, the flow is looped up to "26 Jan., '80 he". However, since "he" does not match in the matching with the matching table 7128 in the step 7412, the flow is advanced in the step 7414 to the step 7424. This means that while the data are upto "26 Jan., '80" are matched with "cardinal number, month, year" in the matching table 7128, they are not matched for "26, Jan., '80 he".

Further, if the sentence is ended at the input character array, for example, "26 Jan., '80", that is, there is no next cut-out for the next dictionary reference unit, the flow is advanced in the step 7418 to the step 7424.

In the case if it is judged not matched in the step 7414, it is judged as to whether the content of the counter n not more than is 1 or not (7424) and, if it is nor more than 1, it is recorded as a single dictionary reference unit in the dictionary information preserve table 7126 (7434).

If it is not less than 1, matching is conducted taking that p+n (n=3), i.e., "he" in "26 Jan., '80 he" is "EOS" indicating the end of the arrangement (7426, 7428). If it is not matched, the flow is advanced to the step 7434. If it is matched, "26 Jan., '80" which is p−(p+n−1) for the dictionary reference unit is collectively arranged in accordance with the result of arrangement corresponding to the arrangement Ms in the matching table 7128 and the result is recorded in the dictionary information preserve table 7126 (7430).

Then, it is regarded that the dictionary reference units have been ended to (p+n−1)th unit and resets (p+n−1) to "p" (7432).

The-eighth embodiment according to the present invention will be explained.

Figure 63:
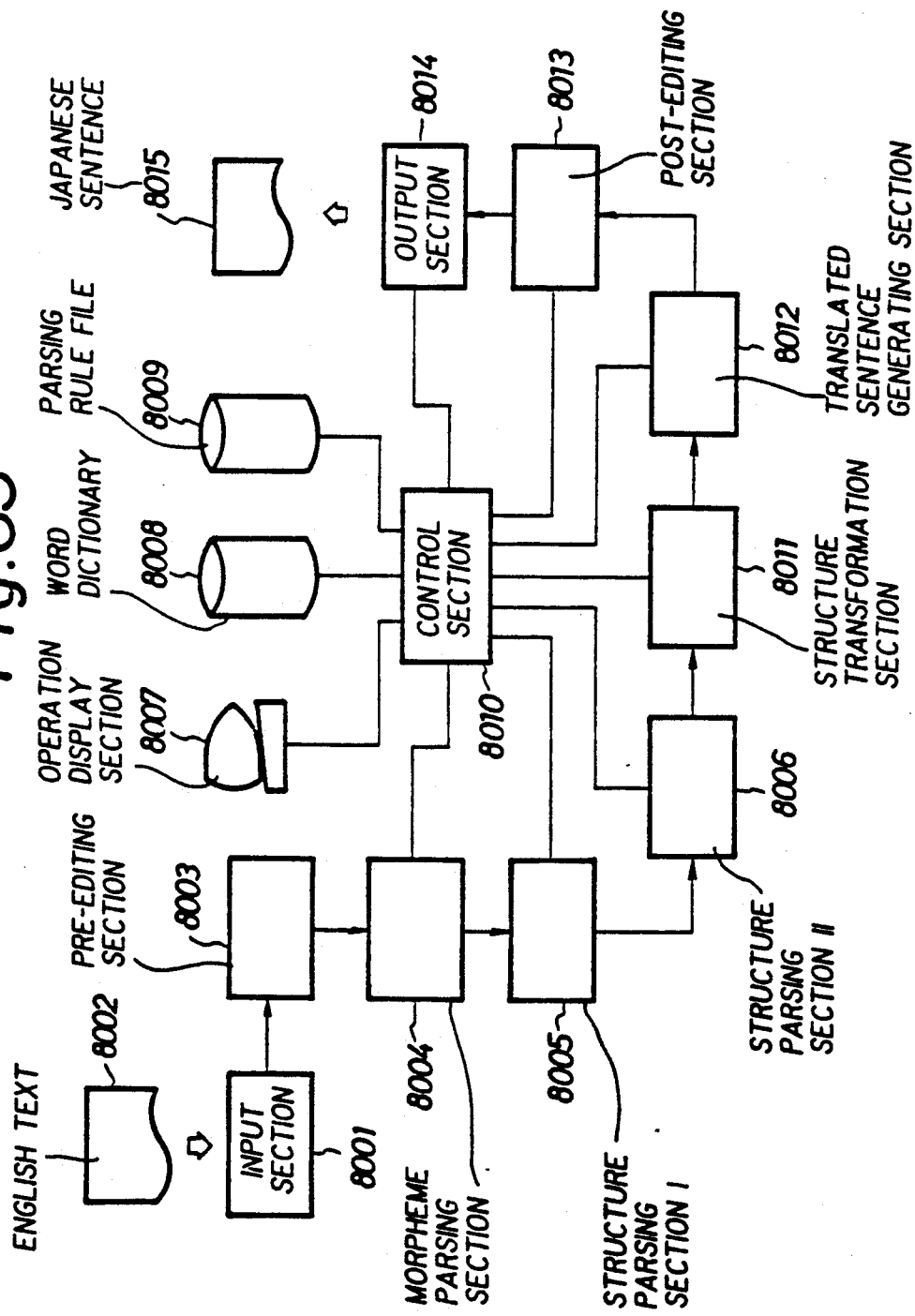

FIG. 63 illustrates the entire structure of the eighth embodiment of the language analyzer according to the present invention applied to an English-Japanese automatic translation device.

In FIG. 63, are shown input section 8001, English Text 8002, pre-editing section 8003, morphological analysis section 8004, syntactic analysis section I 8005, a sentence syntactic analysis section II 8006, operation display section 8007, word dictionary 8008, parsing rule file 8009, control section 8010, structure transformation section 8011, translated sentence generating section 8012, post-editing section 8013, output section 8014 and Japanese sentence 8015. The present translation device has, as illustrated in the figure, the input section 8001 by which the English text 8002 to be translated into Japanese is inputted. The input section 8001 may include, for example, a key board having character keys such as alphanumerical keys and function keys, an optical character reading device (OCR) for reading the English text and/or a file memory device for reading the English text recorded in a memory medium such as a magnetic disc.

The English test inputted from the input section 800i is read into the pre-editing section 8003, where the pretreatment for the translation is conducted. In this case, the sentence recognition and the unknown word processing are mainly conducted. This functions as a portion of the morphological analysis.

The pre-edited English data are sent together with the information obtained in the pre-edition to the morphological analysis section 8004. The morphological analysis section 8004 divides the data by referring to the word dictionary 8008, parses the english morphemes, conducts various types of arrangements such as unknown word processing, expression of proper noun, time and numerals, and conducts processing for the entire sentence such as tag question and opposition recognition. The morphological analysis rules are contained in the a parsing rule file 8009.

The English data after subjected to the morphological analysis are transferred together with the dictionary information obtained by the morphological analysis to the syntactic analysis section I 8005. The syntactic analysis section I 8005 is a functional section that parses the surface layer structure for the sentences by applying a grammatical rule to the English data and finds all of the structural possibilities.

The English data after subjected to the parsing in the syntactic analysis section I 8005 are sent together with the parsing information to the syntactic analysis section II 8006, where a solution is selected from the result of the syntactic analysis in view of the surface layer by the syntactic analysis I by applying the structural description. Thus, a plausible parsing tree of English description is prepared to make the structure thereof. These parsing rules are also contained in the parsing rule file 8009.

The English data subjected to the syntactic analysis are transferred as the data for the parsing tree to a structure transformation section 8011. The structure transformation section 8011 prepares a corresponding Japanese structure tree from the structure tree which is an intermediate structure of English sentence to convert it into a Japanese-underlying structure from which the Japanese sentence can be translated with ease.

The data for the structure tree indicating the Japanese-underlying structure thus transformed are sent out to a translation generating section 8012, where the translated sentence is generated. This is a functional section of generating a Japanese sentence from the structure of the Japanese sentence structure tree.

The Japanese sentence data thus translated, that is, the data for the translated sentence are sent to the post-editing section 8013. The post-editing section 8013 modifies the translated data by retrieving the dictionary 8008 while using the information utilized in the translation processing to complete a more natural Japanese sentence. The data for the Japanese sentence are transferred to the output section 8014 and the data for translated Japanese sentence are transferred to the output section 8014 and outputted as the translated Japanese sentence 8015 from the output section 8014. The output section 8014 includes, for example, a printer, a display and/or a file memory device such as a magnetic disc.

The flow of a series of translation processings is controlled by the control section 8010 that governs the control for the entire device. The word dictionary 8008 contains, in the case of the illustrated embodiment, dictionary data for English and Japanese words, in which there are stated in addition to the vocabulary, various informations such as connective relationship, that is, coexistent relationship, meanings, singular or plural forms, part of speech, etc. Further, the parsing rule file 8009 contains rule data for the morphological analysis and English sentence parsing.

The control section 8010 is connected with the operation display section 8007. The operation display section 8007 includes operation keys for providing various instructions from an operator to the present device, for example, translation instruction key, cursor key, etc. a display or indicator that visually displays the input English sentence text, Japanese sentence as the result of the translation, intermediate data such as dictionary information and various instructions to the operator. It may also be so constituted that most of these operation display functions are contained in the key board if it is equipped to the input section 8001, or to the display if it is disposed to the output section 8014.

The embodiment of the present invention concerns the automatic translation device as describe above and it is adapted so that if a derivative word is contained in the English text 8002, a grammatical feature, a semantic feature, (Japanese) equivalent, etc. are estimated depending on the conditions to that derivative word recognized as such by means of affix or the like, thereby increasing the reliability for the obtained parsing result or the translation result. An affix dictionary is used for the estimation of the dictionary information to unknown words in the morphological analysis. As the mode of processings, three kinds of processings are required, i.e., processing for the prefix, prefix for the suffix and the estimated processing by the suffix. However, the kind of data substantially include two types, i.e., prefix estimation data and suffix estimation data.

Explanation will at first be made for the prefix estimation data and the suffix estimation data described above.

(1) Prefix Estimation Data

If the prefix portion of a dictionary not registered word agrees with that described hereinafter and the remaining portion is present in the dictionary, the word is treated as according to the dictionary data for the root thereof. In the dictionary data, it is possible to add an internal feature to the row of the original internal feature and add a Japanese suffix to the original translation word. For the input word "electrochemical", for instance the entry in the dictionary information preserve table "electrochemical" can be formed as according to the dictionary data by the prefix entry "electro" and the dictionary entry "chemical" as shown below:

| Prefix entry | Dictionary entry |
|---|---|
| electro | chemical |
| Input word | Dictionary information preserve table entry |
| electrochemical | electrochemical |

By the way, the entry in the dictionary information preserve table entry takes over all of the dictionary informations to which the root of words are corresponded.

(2) Suffix Estimation Data

If the suffix portion of a dictionary not registered word agrees with that described hereinafter and the remaining portion is present in the dictionary, this word is registered by providing a new dictionary data in accordance with the information described in the suffix dictionary. In this case, the first (Japanese) equivalent in the dictionary data corresponding to the portion of the root of the word is taken out and used for the (Japanese) equivalent in the new dictionary data.

For the input word "controler", for instance, an entry in the dictionary information preserve table "controler" is registered based on the suffix entry "−(e)r" and the dictionary entry "control".

| Suffix entry | Dictionary entry |
|---|---|
| (verb)-(e)r | control |
| noun | verb |
| Input word | Dictionary information preserve table entry |
| controler | controler noun |

Then, explanation will be made to the outline for the processing of a derivative and the processing of an unknown word.

(1) For a dictionary not registered word, if a prefix or suffix is contained at the top or the end of a word and the remaining portion of the word is registered in the dictionary, English part of speech information, internal feature and the Japanese equivalent are synthesized based on the dictionary information and the affix information.

(2) Prefix and suffix are respectively listed as film system and can be edited independently of a program.

(3) Possibility for the prefix is tried at first and, if failed, possibility for the suffix is tried. If both of them are contained, trial is not conducted.

(4) For the word failed in the trial estimation processing for the ending portion is conducted as an unknown word.

Explanation will be made more specifically to the eighth embodiment according to the present invention while referring to the drawings.

Figure 58:
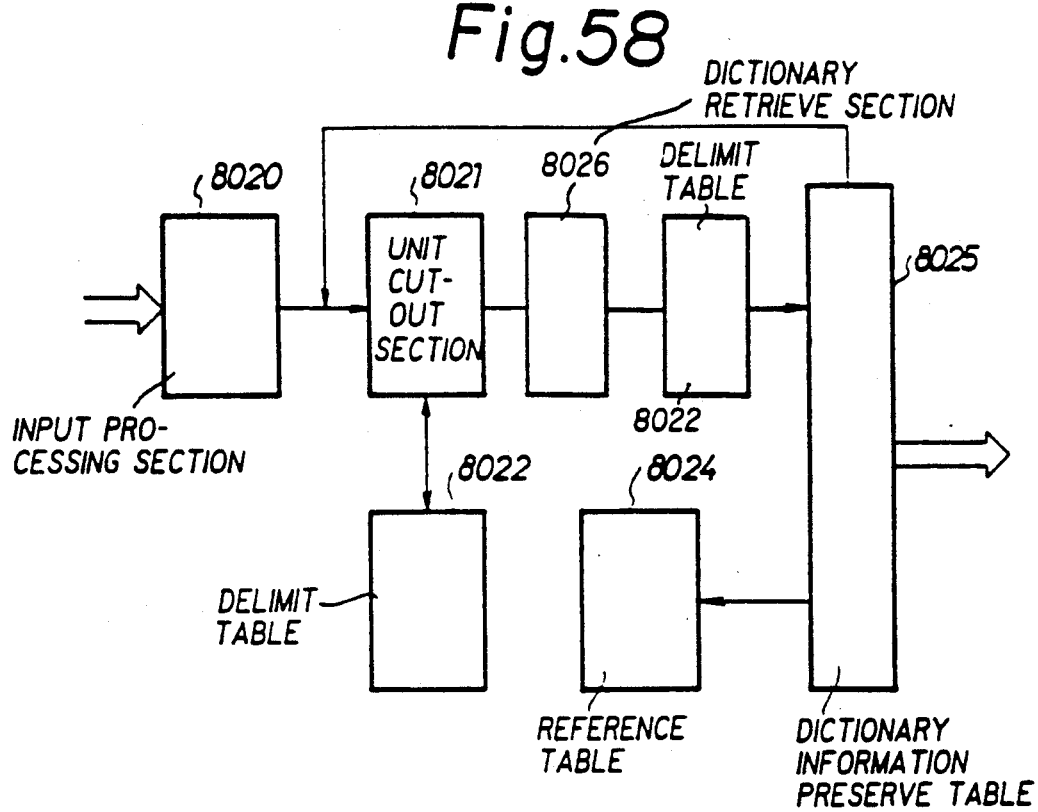

FIG. 58 is a block diagram for explanating one embodiment according to the present invention. In the figure, are shown input processing section 8020, unit cutout section 8021, delimit table 8022, dictionary retrieve section 8026, derivative processing section 8023, reference dictionary 8024 and dictionary information preserve table 8025. At first, an English sentence is read into the input processing section from an input device comprising an input document file or key board, OCR, etc. Then, the dictionary reference unit is cut-out in the dictionary reference unit cut-out section while referring to the delimit table and, if it is not end, the dictionary retrieval is conducted by using the reference dictionary. Then, if there is an entry as the result of the retrieval, the result of the retrieval is recorded in the dictionary information preserve table, whereas processing for a derivative is conducted if there is no entry.

Figure 59:
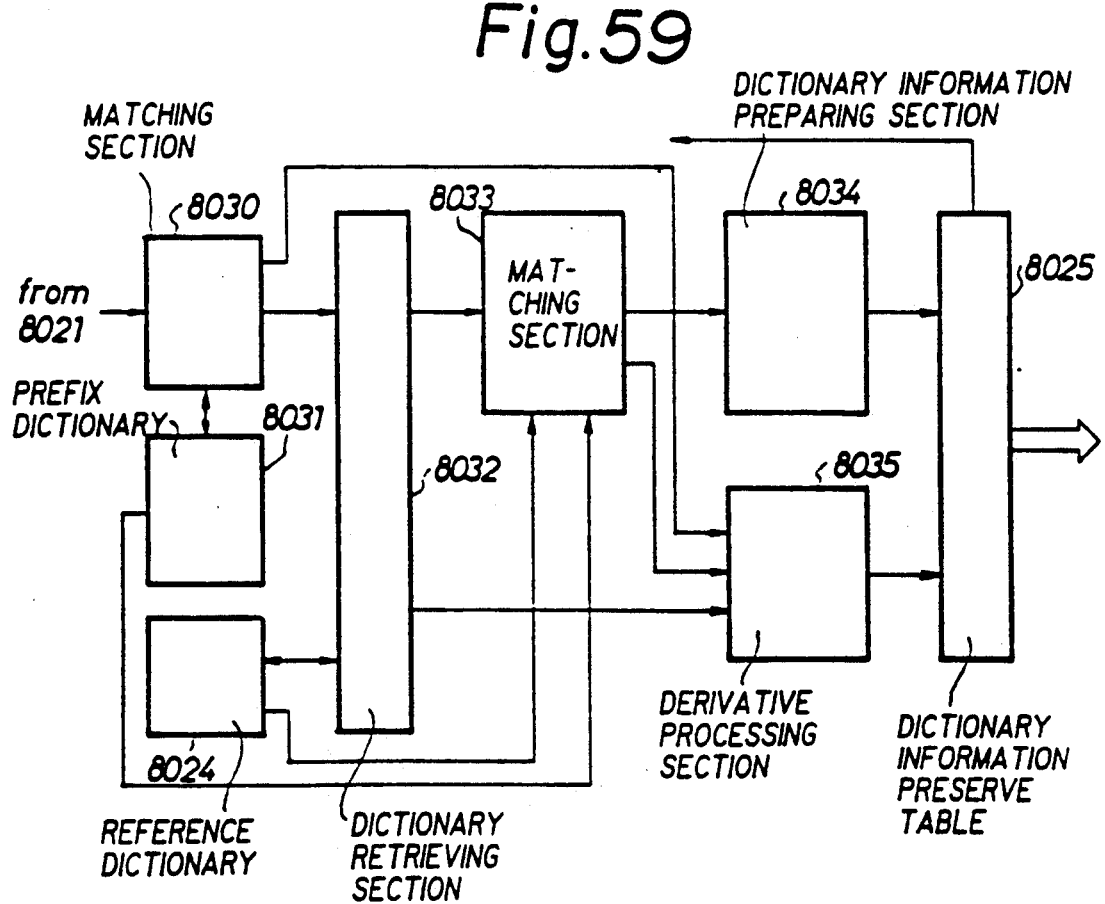

FIG. 59 is a block diagram for explanating one embodiment of the derivative processing by way of a prefix. In the figure are shown matching section 8030 between the top portion and the prefix dictionary, prefix dictionary 8031, a dictionary retrieving section 8032 for the dictionary retrieval excepting for the prefix portion, matching section 8033 for the part of speech in the prefix dictionary and the part of speech of the entry, a dictionary information preparing section 8034 by the prefix estimation, and a derivative processing section 8035 by the prefix.

Figure 60:
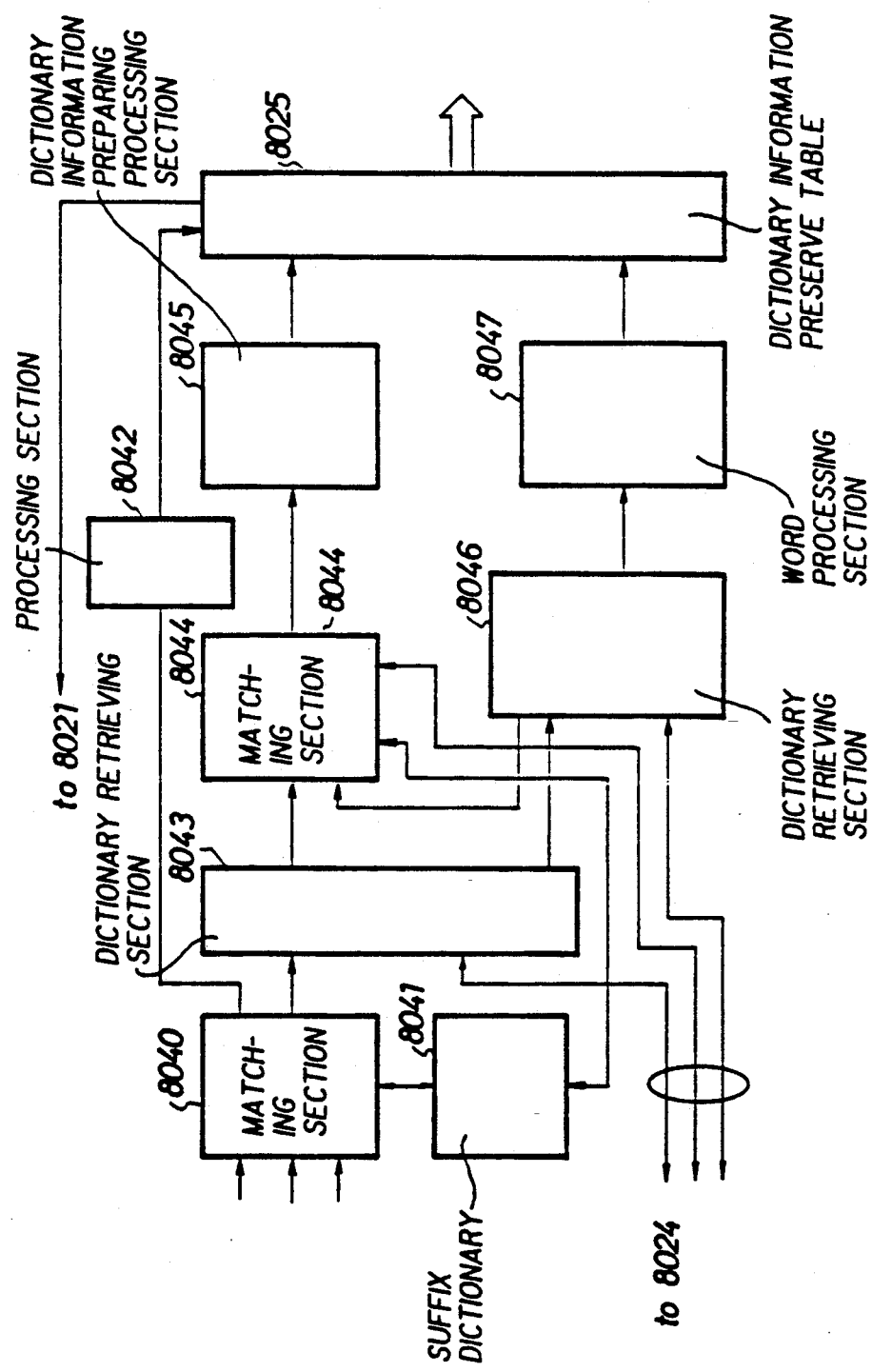

FIG. 60 is a block diagram for illustrating one embodiment of the derivative processing by way of suffix. In the figure are shown matching section 8040 between the ending portion and the suffix dictionary, suffix dictionary 8041, a processing section 8042 for completely (quite unknown) not registered word, dictionary retrieving section 8043 for retrieving the dictionary to the portion excepting for the suffix portion, a matching section 8044 between the part of speech of the root and the entry part of speech in the suffix, dictionary information preparing processing section 8045 by suffix estimation, dictionary retrieving section 8046 for conducting dictionary retrieval by adding the root change in the suffix to the portion except for the suffix portion, and not registered word processing section 8047 by way of suffix estimation. At first, matching is made between the ending portion and the suffix dictionary. If it is not matched, the word is processed as a completely (quite unknown) not registered word whereas, if it is matched, the dictionary is retrieved for the portion except for the suffix portion. As a result of the dictionary retrieval, if there is no entry, dictionary retrieval is conducted while adding the root change in the suffix dictionary to a portion except for the suffix portion. As a result if there is no entry, not registered word processing is conducted by way of the suffix estimation. While on the other hand, if there is an entry, matching is made between the part of speech of the entry and the part of speech of the root in the suffix dictionary in the same manner as in the case where the entry is present as the result of the dictionary retrieval for the portion except for the suffix portion. If it is matched, dictionary information preparation processing is conducted by way of suffix estimation, whereas if it is not matched, not registered word processing is conducted by way of suffix estimation.

Figure 61:
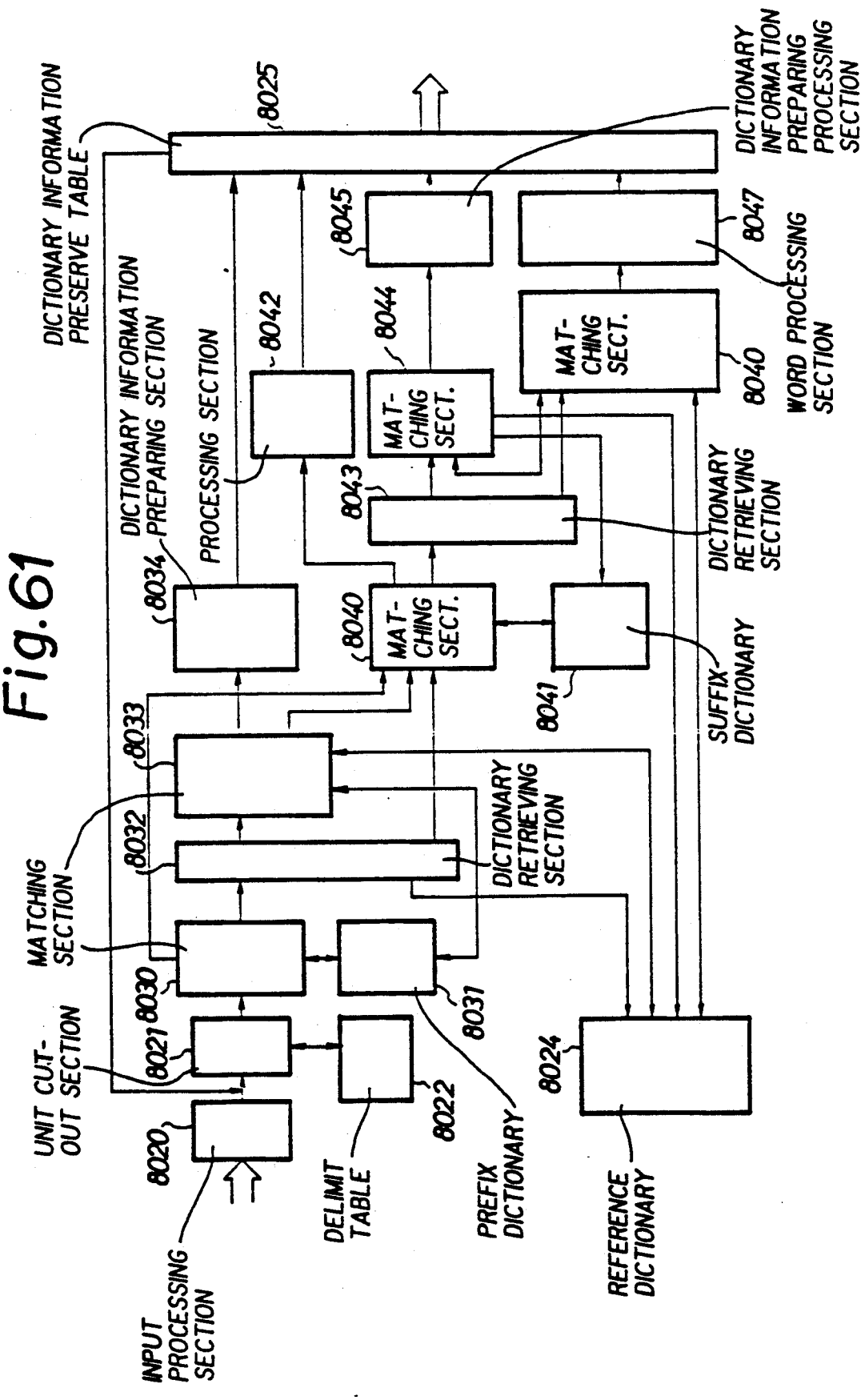
Figure 62:
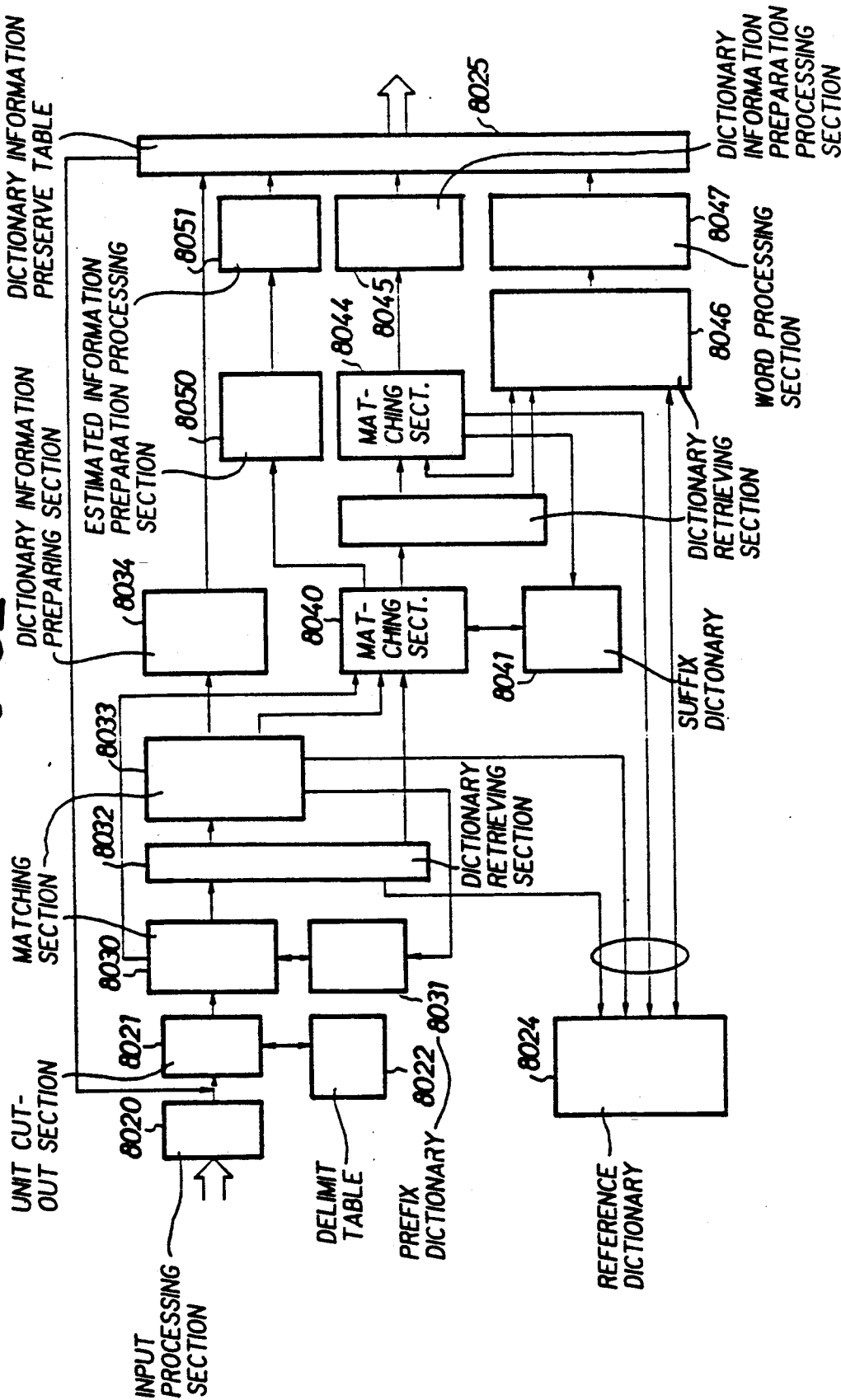

FIG. 61 is a block diagram showing the details for the entire structure obtained by synthesizing the portions of FIGS. 58, 59, and 60 and FIG. 62 illustrates the details for the completely (quite unknown) not registered word processing section 8042 shown in FIG. 61. The completely not registered word process 8042 shown in FIG. 61 comprises an estimated information preparation processing section 8050 for a noun and an estimated information preparation processing section 8051 for a verb. However, since each of the portions in FIGS. 61 and 62 has already been described specifically, the explanations therefor are omitted here.

The ninth embodiment according to the present invention will be described.

FIG. 64 illustrates the entire structure of the ninth embodiment according to the present invention applied to an English-Japanese automatic translation device.

This embodiment has an input section 9010, by which an English text 9012 to be translated into Japanese is inputted. The input section 9010 may include a key board having character keys such as alphanumerical keys or function keys, an optical character reading device (OCR) for reading the English text recorded on paper and/or a file memory device for reading the English text recorded on a memory medium such as a magnetic disc.

The English text inputted from the input section 90i0 is read into a pre-editing section 9014, where the pre-treatment of translation is conducted. In this case, sentence recognition and unknown word processing are mainly conducted. This functions as a part of morphological analysis.

The pre-edited English data are transferred together with the information obtained in the pre-edition to a morphological analysis section 9016. The morphological analysis section 9016 divides the sentence by retrieving a word dictionary 9018, parsing the English morphemes, conducts various arrangement such as unknown word processing, proper noun processing, expression for time, numerical, etc. and also conducts processing for the entire sentence such as tag question and apposition recognition. The morphological analysis rules are contained in a parsing rule file 9036.

The English data subjected to the morphological analysis are transferred together with the dictionary information obtained from the morphological analysis to a syntactic analysis section I 9020. The syntactic analysis section section I 9020 in this embodiment is a functional section that parses the surface layer structure in bottom-up and right-to-left manner for the sentence by applying the cfg rule to the English data and finds out all of the structural possibilities.

The English data after parsed in the syntactic analysis section I 9020 are sent together with the parsed information to a syntactic analysis section II 9022. The section selects a solution from the result of the parsing in view of the surface layer structure in the syntactic analysis section I by applying a structural description. In this way, a plausible parsing tree for English sentence is prepared to make the structure thereof. These parsing rules are also stored in a parsing rule file 9036.

The English data after subjected to the parsing are transferred as the data for the parsing tree to the structure transformation section 9024. In the structure transformation section 9025, the parsing tree for the corresponding Japanese sentence is prepared from a structural tree which is an intermediate structure of an English sentence and transformed into a Japanese underlying structure, from which a Japanese sentence is easily be translated.

The data for the structural tree indicating the Japanese-underlying structure thus transformed are sent to a translation generating section 9026 where the translated sentence is generated. This is a function of generating a Japanese sentence from a tree structure of the Japanese structure tree. At first, a generation of sentence structure is conducted in which the tree structure is changed by exchanging the order so as to agree with that of Japanese and then morpheme generation is conducted to generate a translated sentence in top-down, left-to-right manner in the sentence structure tree.

The data for the Japanese sentence thus generated, is, translation data are sent to a post-editing section 9030. The post-editing 9030 modifies the translation data by retrieving the dictionary 9018 using the information utilized in the translation processing to complete a more natural Japanese sentence. The data for the Japanese sentence are transferred to an output section 9032 and then outputted as the translated Japanese sentence 9034 from the output section 9032. The output section 9032 includes, for example, a printer, a display and/or a file memory device such as a magnetic disc.

The flow of series of translation processings is controlled by a control section 9038 that governs the control for the entire device. The dictionary file 9018 stores therein dictionary data for English and Japanese words and the parsing rule file 9036 stores therein rule data for the morphological analysis and syntactic analysis in this embodiment.

The control section 9038 is connected with an operation display section 9040. The operation display section 9040 includes operation keys for providing various instructions from an operator to the present device, for example, a translation instruction key or cursor key, and a display or indicator that visually displays inputted English text, Japanese sentence as the result of translation, intermediate data such as dictionary information and various instructions to the operator. It may be so constituted that most of the operation display functions are contained in a key board if it is disposed to the input section 9010, or to a display if it is disposed to the output section 9032.

By the way, in the syntactic analysis section I 9020, the cfg rule is applied to the English sentence in bottom-up, right-to-left manner for the English data after morphological analysis, to derive all of possible solutions for the sentence structure. The solutions are generally understood in the form of a structure tree. This shows a relationship for words or groups contained in each of sentences that are related to each other in a subsidiary or coexistent relationship such as a modifying relationship or case relationship, for example, a subsidiary relationship between each other such as for parent, child and grandchild, etc. Each of the words or the groups situates at the node of the structure tree.

In this embodiment, prior to the syntactic analysis, features regarding form and vocabularies of a sentence are distinguished to judge the collective arrangement in view of the sentence structure. The arrangement in view of the sentence structure is referred to herein as "unit" and "block".

The "unit" is a word or a group of words forming the minimum unit for the translation process, which is treated identically with one word in the parsing and the dictionary information for each of the constitutional elements contained therein is not used.

"block" is a structural arrangement, to which the parsing is conducted preferentially for the interior thereof to that for the exterior part and, which is treated in an equivalent manner to a unit relative to the exterior part thereof. For example, it may be a clause, phrase, etc., as well as that corresponding to intermediate symbols used in- the cfg grammar. Further it may be of a nest structure, that is, a block may further contain therein another block. Further, the concept of the block may also include a sentence, paragraph, entire sentences, each of which may be regarded as one block. The processing giving a preference to the partial parsing is referred to herein as "partial parse". This can decrease wasteful structural solutions described above to improve the parsing efficiency and obtain a more plausible parsing result.

For the block, two natures are defined in this embodiment. One of them is a symbol in the cfg rule referred to as "goal" in the present specification which is to be arranged as the result of the parsing upon conducted for each of the constitutional elements in the interior of the block, that is, a symbol describing the structure or the attribute of the block. The other is a symbol in the cfg rule referred to as a "role" which is carried by the block upon conducting the parsing to the exterior of the block for the sentence, phrase or the clause in which the block is contained, that is, a symbol describing the relationship or the role of the block to the others.

For instance, in the case of an English sentence I said, "White House isn't white", the goal is a sentence and the role is a noun (clause). While the goal and the role are generally identical in most of cases, they may some time be different from each other as in this instance.

For the embodiment shown in FIG. 64, when the structural arrangement of the input English sentence is recognized as a block, the functional sections for estimating the goal and the role thereof are summarized into the structure as shown in FIG. 65. As can be seen from the figure, the structural arrangement of the English sentence data pre-edited in the pre-editing section 90i4 is distinguished in the morphological analysis section 9016 using the word dictionary 9018 and the parsing rule file 9036.

The word dictionary 9018 stores therein dictionary information for English words and phrases. For example, as shown in FIG. 68, entries are formed on every variations for each word in this embodiment and all of the informations are developed. For the part of speech information, for example, a plurality of part of speech informations can be provided as shown in the figure. It will be apparent that the way of the constituting the dictionary 9018 is not limited only to this example.

The parsing rule file 9036 stores those data for the top condition indicating the top of the block, the end condition indicating the ending, as well as block preparation information for providing the block with the goal and the role in the form of a table. One example is shown in FIG. 69. For example, one block is started by ", conjunction" and it is ended at the end of the sentence. Accordingly, one block is formed starting from the top to "," just preceding to the conjunction thereof and the goal is clause, while the role is a sentence. Further, another block is formed starting from the conjunction to the end of the sentence in which both of the goal and the role are clause.

Further, a block is started by ", relative pronoun" and it is ended by "," or at the end of the sentence. As in this case, possibility for a plurality of end conditions is allowed for one top condition. In the case where the block is ended by ",", a cluster from "," just preceding to the relative pronoun to the next occurring "," forms one block in which the goal is a clause and the role is an adverb or adjective. That is, this means that the cluster functions as an adverb clause or adjective clause. In the case of ending at the end of the sentence, a cluster from "," just preceeding to the relative pronoun to the end of the sentence constitutes one block, in which the goal is a clause and the role is an adverb or adjective. These are according to the conditions for forming group, clause or sentence appearing in usual modern English sentences. In the figure, the symbol " " represents a space.

By the way, in the morphological analysis section 9016, the English text inputted from the pre-editing 9014 is at first divided into sentences as the translation units. In this case, erroneous spellings or not-registered words are detected. The dictionary 9018 is retrieved on every sentence units and the dictionary information for each of constituents is fetched. Various modes of arrangement are conducted in accordance with these dictionary informations.

FIG. 66 shows a flow for the collective arrangement of a block conducted in the morphological analysis section 9016. at first, a position pointer indicating the read out position for an English sentence is set to the top (9100). The top position means not the word at the top but the top (imaginary) of the sentence just preceeding thereto. The word take-out processing 9101 is executed at the position. As shown in FIG. 67, in the word take-out processing 9101, a word is taken out by advancing the position by one (9111) unless it is at the end of the sentence (9110), and the dictionary 9018 is retrieved for the word (9112) to write out the word information (9113).

In this way, when the word information is taken out in the word take-out processing 9101, the table 9036 for the conditions of top and end of the block is referred to, to judge if there is any that matches the top condition or not (9102). In this way, the steps 9101 and 9102 are repeated until the word matching the top condition is detected.

When the top condition is matched, the next word and the words succeeding thereto taken out by the required number and referred to for the agreement with the top condition of the block (9104). In this case, the dictionary is retrieved for each of the words if required. The position pointer is not advanced.

If it is matched with the top condition of the block in the step 9104, then a word that agrees with the block end condition regarding the top condition is retrieved (9105). the steps 9104-9106 are recycled till the word that agrees with the end condition is found. When a word agrees with the end condition (9106), a cluster including the word is recognized as a block and block is written (9107). More specifically, a block is prepared judging that the block preparing condition is satisfied at the position where the end condition is at first satisfied. Then, referring to the block preparing information table 9036, the position for the word indicated by the pointer at the position where its advance was stopped in the processing 9103 is defined as the top position for the block, and the position of the word satisfying the end condition appearing at first thereafter is defined as the end position for the block. Simultaneously, the goal and the role of the block are also written.

Figures 70, 71:
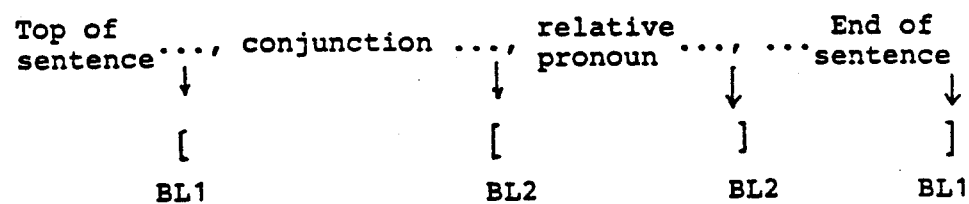

As a result of a such a block recognition, if there is " . . . , conjunction . . . " in the English sentence, for example, as shown in FIG. 70, the cluster from the top of the sentence to the part preceeding to "," is recognized as one block, while the cluster from ", conjunction" to the end of the sentence is recognized as another block. In the figure, the inside of [ ] indicates one block. In this block, both of the goal and the role are sentence. Further, a cluster from the word after the conjunction to the end of the sentence forms another one block, in which both of the goal and the role are sentence as well. Alternatively, the cluster from the conjunction to the end of the sentence may be defined as one block. In this case, the goal is a clause and the role is an adverb.

The block may also be defined as starting from the position not containing ",". Furthermore, punctuation or the like may be excluded from the object of the parsing as the information possessed in the block.

In the same way, if there is " . . . relative pronoun . . . ", relative pronoun . . . " may be recognized as one block. In this block, the goal is a clause or sentence and the role is an adverb or an adjective.

The block may of course be in a nest structure. For instance, if the English sentence has such a structure "(top of the sentence) . . . , conjunction, . . . , relative pronoun . . . (end of the sentence)" as shown, for example, in FIG. 71, the cluster from ", conjunction" to the end of the sentence constitutes one block BL1-BL1, in which ", relative pronoun . . . ," is contained as another block BL2—BL2.

In this way, the morphological analysis section 9016 distinguishes the feature of the sentence in view of the form and vocabulary to descriminate the structural arrangement as a block. Further, in addition to such block recognition, the morphological analysis section 9016 also conducts various processing such as expression for proper noun, derivative, unknown word, abbreviated word, numerical, time, hyphenated word, apostrophy ('), as well as apposition estimation and processing for tag question, to prepare morphological analysis data.

The English sentence subjected to morphological analysis in this way is transferred together with the parsed information to the syntactic analysis section I 9020. FIG. 72 shows an example of the output data. The figure shows the result that an English sentence I said, "White House isn't white." is inputted from the input section 9010 and parsed in the morphological analysis section 9016. The block 1 is started at the word position #4 and ended at the position #10, in which both of the goal and the role are optional in this case. In the same way, the block 2 is started at the position #5 and ended at the position #6, in which the goal is a noun group while the role is a proper noun. That is, the block "White House is'nt white." contains therein in another block White House as a nest. In one block, that is, a smaller block "White House", each of the constituents in the inside functions as a proper noun, while possesses a position as a noun clause relative to the exterior, that is, "isn't white.". "White House" may be treated as a unit.

Together with such a block information, word information retrieved from the word dictionary 9018 is added and sent out from the morphological analysis section 9016 to the syntactic analysis section I 9020.

The syntactic analysis section I 9020 parses the surface layer structure of the English sentence by applying a cfg rule stored in the parsing rule file 9036 to find out all of possible structural trees. In this case, if a block is contained, the partial parse described above is conducted while giving a preference to the local parsing. This can improve the efficiency and the accuracy of the parsing.

More specifically, the block inclusion relationship is prepared from the positional information for the block. Then, the inner most block is parsed. The block completed with the parsing is regarded as a unit and no further processing is conducted to the interior thereof. In this way, the range of the parse is gradually enlarged toward the outer side blocks. Finally, the entire sentence is parsed. The parsing is conducted based on the cfg rule in a bottom-up, right-to-left manner in the English sentence. Parsing is conducted in a manner while maintaining all of the possibilities allowed by the grammar rule.

Figure 73:
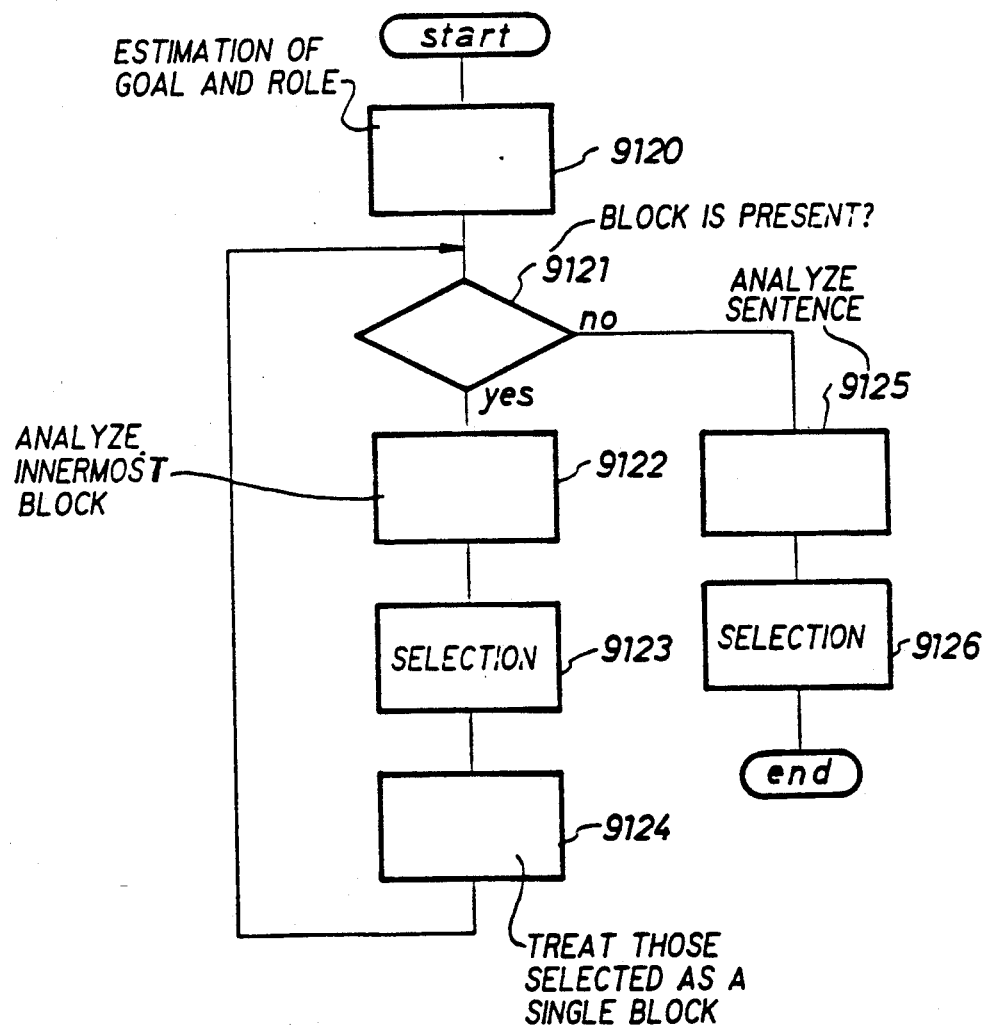
Figure 76:
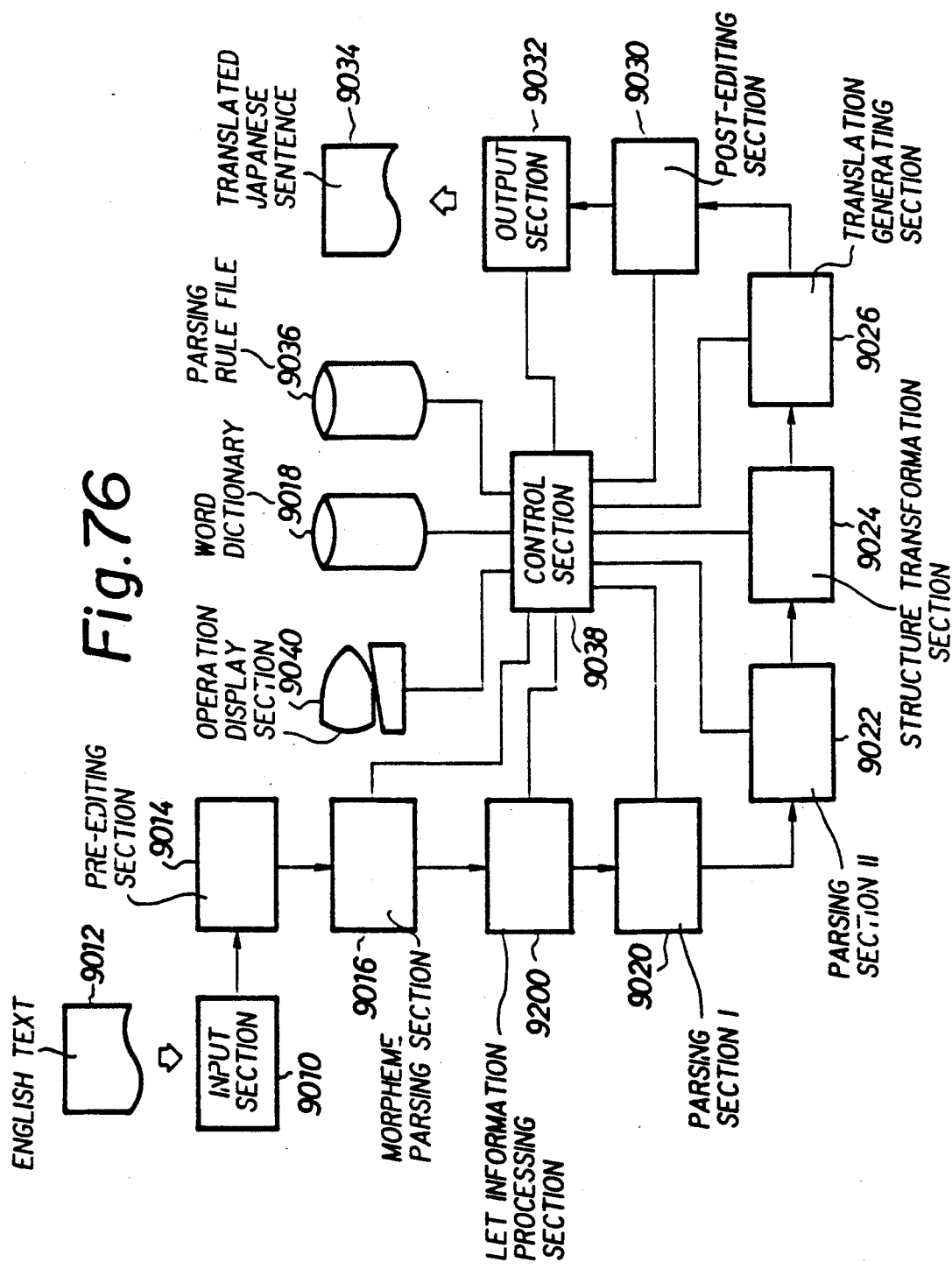

FIG. 73 illustrates an example of such a parsing processing flow. At first, based on the English data supplied to the syntactic analysis section I 9020, all of structural arrangements for one sentence are recognized as blocks and the goal and the role therein are estimated (9120). The way of arrangement is as illustrated in FIG. 70. Then, if there is no block present in such an arrangement (9121), the sentence is analyzed (9125), and only one sentence collectively arranged as a symbol is selected and the parsing for the sentence is ended (9126). Since the processings 9125 and 9126 are included in the processings 9121-9124 if the processing system of treating the entire sentence as one block is employed and, accordingly, they are not unnecessary.

If a block is present, the innermost block is at first analyzed (9122). In the example shown in FIG. 71, the interior of the block BL2—BL2 is parsed. While various solutions are generally obtained by the parsing, a solution in which the block is collectively arranged as one cfg symbol and which agrees with the goal of the block is selected among these solutions (9123). In this case, for those having optional goal for the block, all of those arranged into one symbol are selected. Then, those selected in this way are treated as single arrangement having the role for the block (9124). In the block having optional role a role of the symbol which is collected in the processing 9123 is defined as the role. The processings 9121-9124 are repeated successively.

In this way, in the example of FIG. 71, the interior of block BL2—BL2 is at first parsed and then the interior of BL1—BL1 is parsed. In this case, the block BL2—BL2 is treated equally with a single word and each of the constituents contained therein is not parsed.

In this way, when the data defining the structural arrangement and the subsidiary relationship are obtained, they are sent to the syntactic analysis section II 9022. The data can be recognized easily in the form of a structure tree as described above. The data are further transformed into the structure of the Japanese sentence in the structure transformation section 9024 and, in the translation generating section 9026, translated sentence is generated for each of the nodes contained therein. The node processing in the structural tree is conducted in the top-down, let-to-right manner.

The thus generated translated sentence is subjected to post-processing in the post-editing section 9030, visually displayed in the operation display section 9040 and, for example, printed out as a Japanese sentence 9034 in the output section 9032.

In this way, according to the present embodiment, the feature of the English sentence in view of the form and vocabulary is distinguished to discriminate the structural arrangement as a block. For the block, a goal that can be the parsing result and the structural role, with which the block functions to the outside are estimated. Then, the surface layer structure of the English sentence is parsed by applying cfg rule to find out all of the possible structural trees. This enables to decrease the number of wasteful solutions and improve the parsing efficiency, as well as provide more reliable parsing result.

By the way, since there are various patterns for appositional expression and it is difficult to recognize them in the parsing, particularly, context-free type parsing. In view of the above, since it is generally difficult to conduct the apposition recognition after the parsing, ambiguous translation is inevitable. Further, if a rule capable of recognizing them were prepared, there would be a risk that no appositional expression is recognized as an identical case or the number of possible combinations become expressive. That is, wasteful local parsing is conducted between the portions contained in the appositional expression and other portions.

In view of the above in the present embodiment, the burden on the processing in the parsing step can be mitigated by recognizing the appositional expression by the feature of the sentence in view of the form or the semantic feature of words. Estimation for the apposition is conducted by recognizing the next pattern as a block.

For the English sentence structure "~, relative pronoun ~.~", the relative pronoun is recognized by providing the part of speech code for the word with a specific code, for example "R". In this case, the interior surrounded with "," is regarded as a block on the condition that it does not intersect with a block or unit indicated in the pre-edition and it does not contain "and" or "or" in the portion after the second ",". For the English sentence structure "~, relative pronoun ~.", the interior surrounded with "," and "," is regarded as a block. The period may be other symbol used for the end of sentence.

For conducting such apposition estimation, the dictionary 9018 is so constituted as to store the meaning information for words. The meaning information illustrate the discrimination for the article, place, person, etc. as shown in FIG. 74. Further, also for the block preparing condition, the table 9036 is so constituted as shown in FIG. 75 that the top of the block is recognized by "proper noun (person), noun (person)" as the top condition, and the top of the block is recognized by "proper noun (person), article ⊔ noun (person)". It is thus possible to estimate the appositional expression in view of the morphemic and semantic features without conducting parsing and to conduct parsing in accordance with the apposition estimation in the example shown in FIG. 64 for other processings.

By the way, in the English sentence, there are those groups carrying extremely particular information and used only in restricted ways. If they are parsed in the same manner as that for usual groups, they are parsed into the sentence of quite another nature and it is difficult to obtain the original nature of the sentence by parsing. Further, this results in much loss.

For instance, "let's" or "let us" just after the punctuation etc, is parsed as an imperative sentence with the causative verb "let" and it should be parsed as a group having the nature of invitation "let". "let" also have various usage as a transitive verb and usage as a noun and not restricted to the usage of invitations like that of as the auxiliary verb. Accordingly, parsing has to be proceeded for the respective possibilities to reduce the efficiency. Further, it is difficult to preferentially induce the usage as the invitation from the result of the parsing, since there are no difference between the usage as the causation and the invitation only in view of the sentence structure and it is difficult to distinguish them only in view of the sentence structure.

Then, the wasteful loss in the course of parsing can be decreased by excluding "let's" or "let us" just after the punctuation from the object of the parsing. Further, by separating them from the fundamental usage of the word, that is, causative usage, semantic parsing can easily be conducted.

When "please", "let's" or "let us" appears at the top of the block, a flag is set up the block information and the for each of the cases in information for the unit is not issued. For instance, English sentence "let's go to school." is processed as <go to school> <attached with let's>.

In order to conduct such "let" processing, a let information processing section 9200 is disposed between the morphological analysis section 9016 and the syntactic analysis section I 9020 in a modification of this embodiment. FIG. 77 illustrates the concerned sections collectively. In these figures, the same elements as those shown in FIG. 64 carry the same reference numerals.

Further, the dictionary 9018 is so constituted as to store the let information for the word. As shown in FIG. 78, the let information provides "O" for ordinary words, "i" to "let's" and "let us" and "2" for "please".

The let information processing section 9200 has a function of receiving the result of the morphological analysis together with the input English sentence from the morphological analysis section 9016 and adding the let information as the additional information to the information of a word during parsing as shown in FIG. 79. In this case, a block for the sentence is disposed. In the example shown in the figure, the block 0 is (start:1, end:10, goal:sentence, role:sentence). That is, the block in this example includes, for example, a sentence in addition to a clause, group, etc. In this case, the concept for the block also includes a paragraph and the entire sentence, each of which may be regarded as one block. Further, "transitive verb root (attached with 's)" is described as a part of speech to "let's" for the information of the word and the let information is "1".

Figure 81:
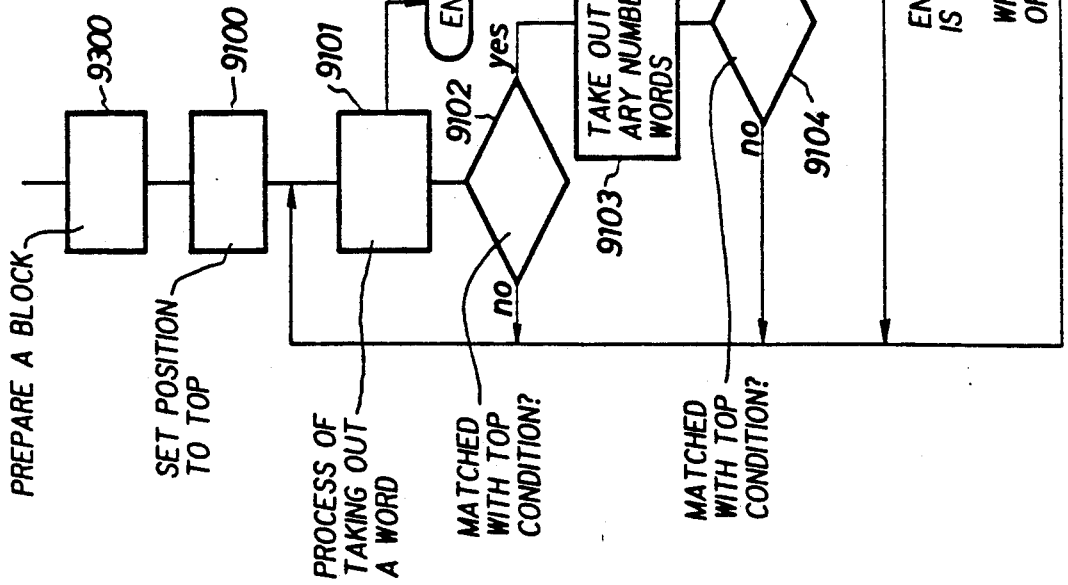

As shown in FIG. 81, a processing for preparing a block of the sentence 9300 is conducted prior to the starting of the collective arrangement of the block to the input English sentence. The subsequent processings may be the same as in the flow shown in FIG. 66. For instance, in the English sentence, I said, "Let's go to school.", the block O (start:top of the sentence, end:end of the sentence, role:sentence, goal:sentence) is formed.

As shown in FIG. 81, in the syntactic analysis section I 9020, each of the structural arrangements is recognized as a block based on the English data supplied thereto and the goal and the role thereof are estimated (9120). If the block is not present in the arrangement (9121). The parsing is ended. If blocks are present in the input sentence, the innermost block is at first parsed (9122). While various solutions are generally obtained by the parsing, only the solution collectively arranged as a cfg symbol is selected among them (9123). The subsequent processings are the same as those in FIG. 73.

Such let information processing is conducted in the let information processing section 9200 in accordance with the processing flows exemplified in FIGS. 83A and 83B. At first, a pointer is set to the top block (9330), to check the word positioned at the top of the block (9331). If the let information is "O", the pointer is advanced stepwise (9339) to transfer to the next word.

If the let information is not "O", the preceeding dictionary reference unit is checked (9322). If it is not a punctuation or if the pointer does not indicate the top, the pointer is advanced stepwise (9339) to transfer to the next word.

When the preceeding dictionary reference unit is a punctuation upon checking, or if the pointer indicates the top, the innermost layer block containing the word is marked (9333).

Then, if the let information is "1" (9334) since this is "let's" or "let us" just after the punctuation, the role of the marked block is recognized as (inviting sentence) (9336). If the information is "2", since this is "please", the role of the marked block is recognized as "requesting sentence" (9335). Then, the goal of the marked block is recognized as an imperative sentence (9337) and the word information indicated by the pointer is deleted (9338). Then, the pointer is advanced stepwise (9339) to transfer to the next word. The proceeding is executed to the word at the final position (9340).

FIG. 80 shows examples for the result of parsing in which such let information processing has been executed to the example of the afore mentioned input sentence: I said, "let's go to school.". The let information processing section 9200, when adds the let information to the information for the word, eliminates the information for the word concerning the let information from the table and the block information is described as "imperative sentence" for the goal and as "inviting sentence" for the role as shown in FIG. 80.

By the way, in a case where the dictionary 9018 is retrieved for the entire of a plurality of words coupled with hyphen upon handling hyphenated words in the English sentence, if their entries are present in the dictionary 9018, the proceeding is succeeded. For the hyphenated word not registered in the dictionary 9018, if the entire portion is treated as an unknown word, e.g., an adjective, since the dictionary information for each of the words coupled by hyphen in the hyphen-attached words can not be utilized, it can not be translated. Further, if the entry for the information for each of constituents of the hyphenated words is present in the dictionary 9018, they can not but be neglected. In addition, if the parsing is conducted by decomposing them into each of constituent elements, the way of coupling in the hyphenated words is extremely versatile.

In view of the above for dissolving the problem, the entire hyphenated words are parsed as an adjective in the sentence, as well as parsing is conducted only for the interior part of the hyphenated words by using the constituents of the hyphenated words and the result thereof are combined. This enables the parsing for the hyphenated words while utilizing the information for each of constituents. That is, for the hyphenated words not registered in the dictionary 9018, the entire portion is treated equally with an adjective. The nouns coupled by the hyphen are referred to the dictionary and parsing is conducted in a closed form only for the interim of the hyphenated words.

That is, if the hyphenated word is a not registered word in the dictionary 9018, a block information is sent regarding the entire portion as one block and dictionary reference is conducted for each of constituents for the inside of the block to lead out the respective unit informations, in which hyphen is not included. For the not registered word in the dictionary reference, end estimation processing is among unknown word processing is conducted as a sort of unknown word processings.

Such a hyphenated processing can be conducted in the example of the structure shown in FIG. 64. In this case, the position of the word in the sentence is not expressed by the number applied to the word, but the number of characters from the top of the sentence, that is, character number.

Figure 84:
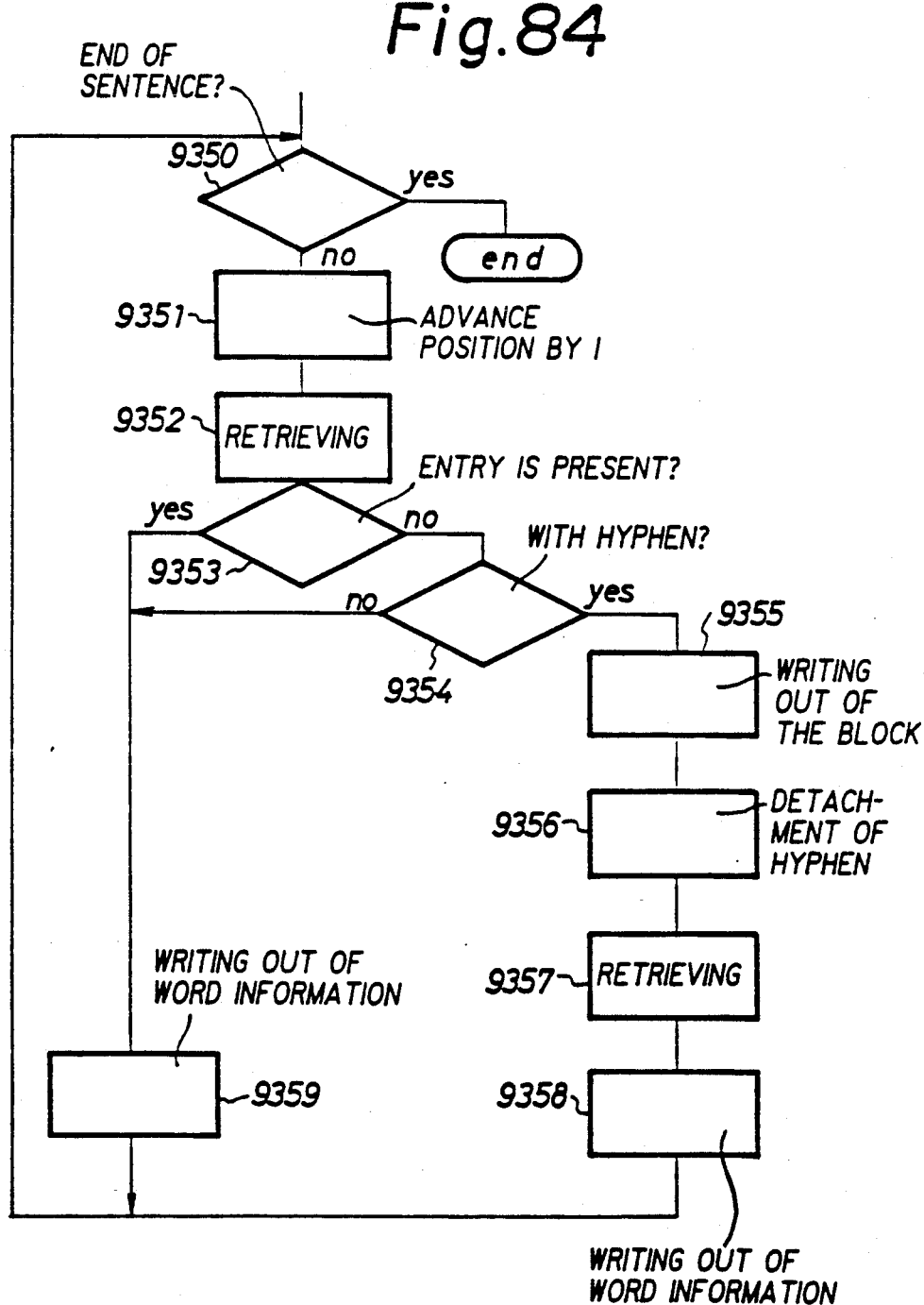
Figure 86:
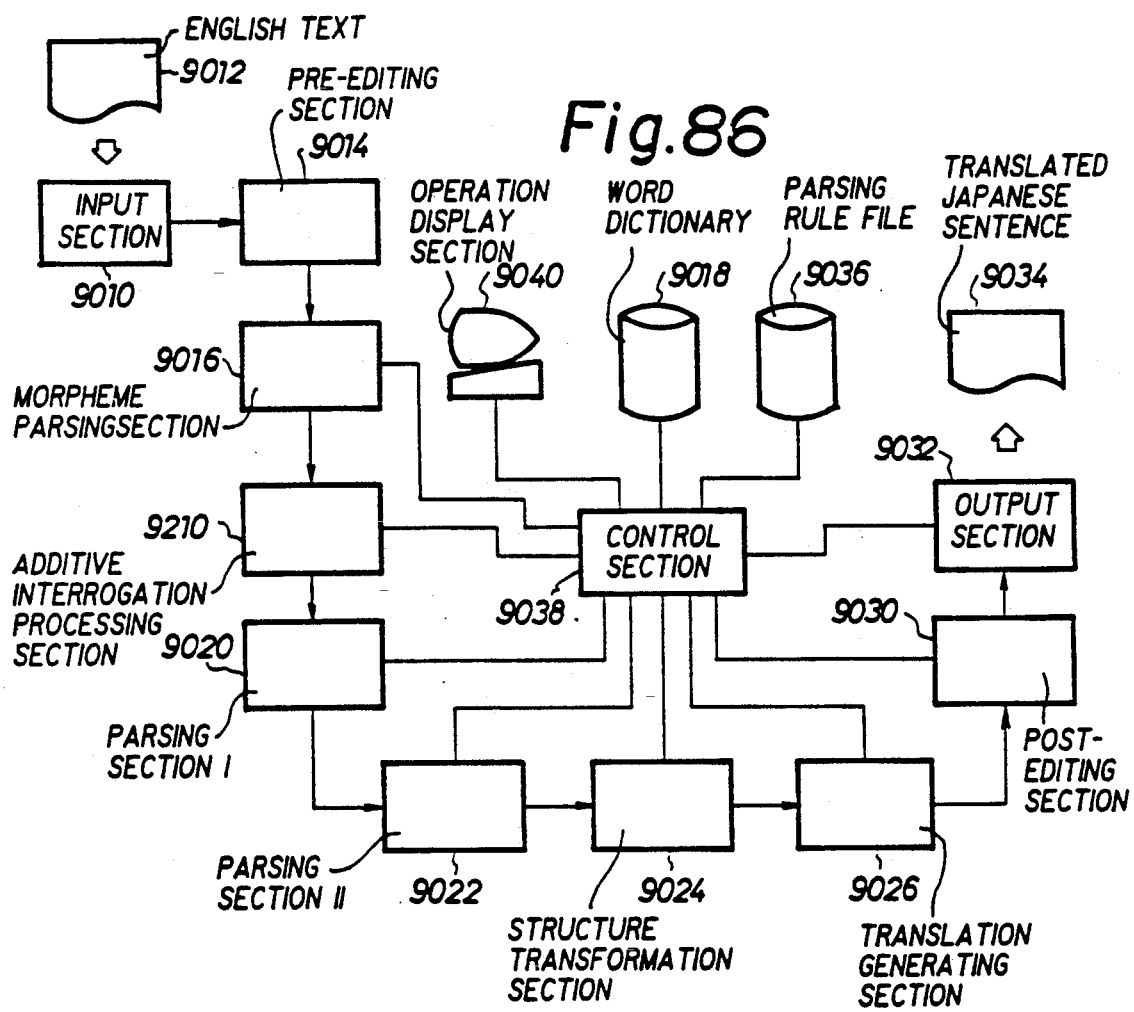

FIG. 84 illustrates an example for the processing of hyphenated words conducted in the morphological analysis section 9016. For the input English sentence, for example, "The anti-war attitude is her open-door policy.", the position pointer is advanced stepwise to take out a word (9135) and conducts dictionary retrieval (9353). In this case, hyphen is not used as the delimiter for the word. If the entry is present (9353), the word information is written out (9359). This is repeated till the end of the sentence.

In a case where the entry is not present as a result of the dictionary reference 9352, if it is not a word containing hyphen (9354), word information is written out (9359) whereas if it is a hyphen-containing word, block having the hyphen is written 9355. In the block having hyphen, the starting position is the starting position for the hyphenated and the end position is the end position for the hyphenated word. The goal is optional and the role is adjective/noun. Then, the hyphen is detached to take out each of the constituents words (9356), and respective constituent words are retrieved from the dictionary (9357). The word information obtained from the result of the dictionary retrieval (9358) in written. On the case of writing out the word information in the steps 9359 and 9358, it is written out as part of speech-=word not registered in the dictionary in the case of a dictionary not registered word.

FIG. 85 shows examples for the block information and the word information of the English block arranged collectively into a block as a result of the processing of the input sentence example. In this example, hyphenated words "anti-war" are registered in the dictionary 9018 and the words "open-door" are not registered in the dictionary. Accordingly, the entry for the hyphenated word "anti-war" is written out as the information for the word. However, for the hyphenated words "open-door", they are decomposed as "open" and "door" and written out as the information for the words, and block 1 (start:30, end:38, goal:optional, role::adjective/noun) is written out as the information for the block.

By the way, although the form of the English tag question is extremely limited, the processing therefor is very much complicated in the usual parsing method. Further, it is not easy to determine the verb to which tag question is related.

In view of the above, after recognizing that it is an tag question based on the feature of the sentence in view of its form, it is treated as an information relative to the structural arrangement belonging thereto, by which the verb concerned with the tag question can be specified, that is, the portion of the tag question in the English sentence is found out as a structural pattern and the parsing is conducted while regarding the portion of the tag question as a mere information having a certain kind of structural arrangement belonging thereto.

In the present embodiment, a unit or block is described in the form of a symbol (starting point indication that this is a unit or block end point).

In the morphemic parsing, the input sentence text is shaped in which the recognition for the block is also conducted. In the present embodiment, "a quotation mark" is designated as "Q" and a brace is designated as "P". For example, there are specified as below:

'...' by (Q'...)',
"..." by (Q"...)",
(...) by ((P...)),
<...> by <(P...)>,
{...} by {(P...)} and
[...] by [(P...)] respectively.

The block recognition is conducted in such a way.

The starting symbol and the end symbol of the block are applied only under the context where the block by these symbols is opened or closed. The part just before the starting signal and just after the end signal should be those other than alphanumerical symbols. The above symbols not corresponding thereto are treated as mere symbols. The blocks may some time be nested provided that they do not intersect with each other.

Upon processing the tag question, if the following word groups succeeds at the instance where the pointer indicates ",", the cluster after "," to "?" is deleted as a unit and a flag as a block is set up. That is, the form of the tag question sentence includes:

", (auxiliary verb)+(personal pronoun) ?"
", (auxiliary verb) n't+(personal pronoun) ?"
", (auxiliary verb)+(personal pronoun)+not ?".

Further, the kinds of auxiliary verb include such as: am, is, are, was, were, do, does, did, have, has, had, will, shall, would, should, can, cannot, could, may, might, must, ought, won't, shan't, need, dare, used. The kinds personal of pronoun includes I, you, he, she, it, we, they.

These are used as the information to the innermost layer block that they belong to. For instance, in an English sentence: you said so, didn't you?, the entire portion is recognized as a block in view of the structural arrangement into [You said so,] <with tag question>. Similarly, in an English sentence:I said, "You said so didn't you?", the quoted sentence "You said so didn't you?" is recognized as a block 1 in view of the structural arrangement and, further, the entire portion is recognized as a block 2 in view of the structure arrangement. That is, [I said,] [You said so,] <attached with tag question>.

The abbreviation word such as "didn't" is treated after developed in a full spell form in accordance with a predetermined table. For the word having a plurality of developed forms, all of them are outputted.

Figure 87:
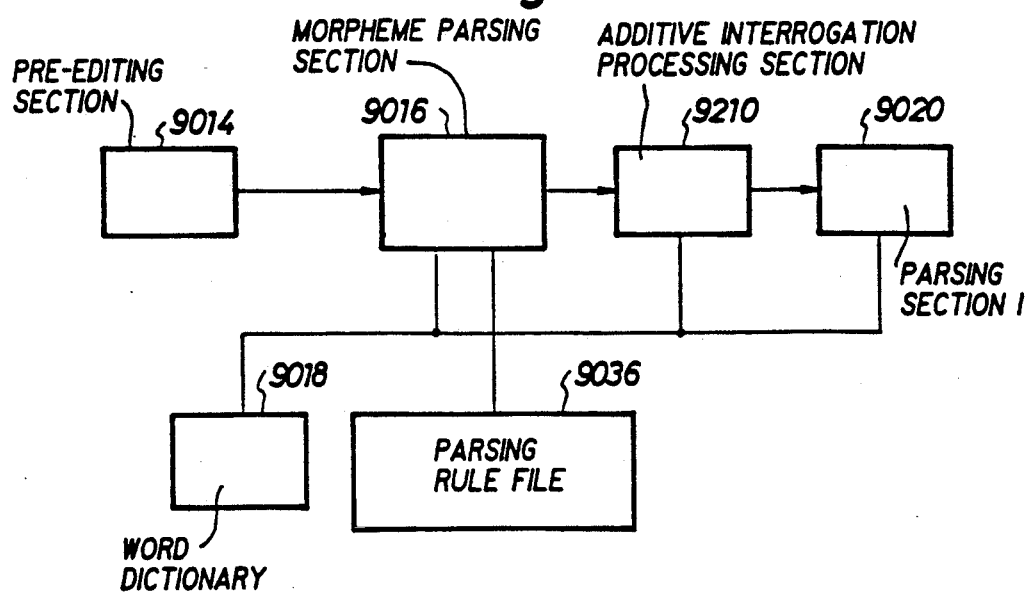

For conducting such a processing for tag question, an tag question processing section 9210 is disposed between the morphological analysis section 9016 and the syntactic analysis section I 9020 in another modification of the present embodiment. FIG. 87 illustrates collectively the concerned sections. In these figures, identical elements with those shown in FIG. 64 carry the same reference numerals.

The tag question processing section 9210 receives the result of the morphological analysis together with the input English sentence from the morphological analysis section 9016 and, as shown in FIG. 88, a block for the sentence is disposed. In the Examples shown in the Figure, the block 0 is (starting:1, end:12, goal:sentence, role:sentence). In this case, the word is represented by the number for the word in this modified embodiment. In this modified embodiment, the block includes, for example, a sentence in addition to clause and group. In this case, the concept of the block also includes a paragraph and the entire sentence, each of which may be regarded as one block.

The collective arrangement of the block for the input English sentence including the tag question may be the same as that in the flow shown in FIG. 81 described above. That is, processing 9300 for preparing the block of the sentence is conducted prior to the start of the processing. For instance, in an English sentence:I said, "It is good, isn't it?", block 0 (start:top of the sentence, end:end of the sentence, role:sentence, goal:sentence) is formed.

Figure 82:
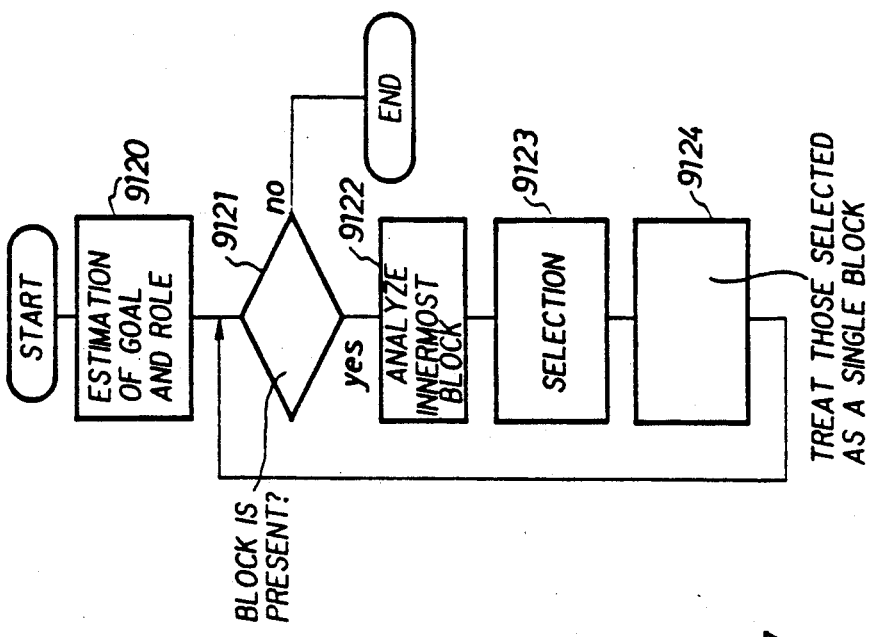

In the syntactic analysis section I 9020, parsing is executed by the same flow as that shown in FIG. 82.

Processing in the tag question processing section 9210 is explained referring to FIGS. 90A and 90B. At first, a pointer is set to the word at the top of the word information (9370). If it is not comma, the pointer is advanced stepwise (9384) and the it is repeated till the end of the sentence (9371). Then, it is checked whether the word next to the comma is a word belonging to the group or the word belonging to the $\beta$ group while leaving the pointer at the position as it is (9373, 9379). In this case, it is defined that those containing an auxiliary verb or a be verb in the part of speech and not in the negative form are words belonging to the α group, whereas those including negative form of auxiliary verb or negative form of be verb in the part of speech are words belonging to the β group. If the word belongs neither of the groups, the pointer is advanced stepwise (9484), and the procedures are repeated till the end of the sentence (9371).

In a case where the word belongs to the α group, pointer advancing step 9384 is executed if the word next to the words of the α group is not a pronoun. If it is a pronoun, it is checked as to if the next word is "not" or not (9375) and, if it is not "not", it is examined whether the word next to the pronoun is an interrogation mark or not (9377). If it not the interrogation mark, the pointer advancing step 9384 is executed. If it is the interrogation mark, the goal is rewritten into "negative sentence" and the role into the "tag question sentence" for the innermost layer block (9378), and the ", . . . ?" is deleted from the information table for the word (9383). The innermost layer block means such blocks that satisfies the condition:starting position ≦ (position for ",") and also satisfies the condition:end position ≧(position for "?") for the block position and with the minimum (end position—starting position).

If the word next to the pronoun is "not" in the step 9375, it is checked if the word next to "not" is an interrogation mark or not (9376). If it is not the interrogation mark, the pointer advancing step 9384 is executed. If it is the interrogation mark, the goal for the innermost layer block is rewritten into "affirmative sentence" while the the role into "tag question sentence" (9382), and ", . . . ?" is deleted from the word information table (9383).

In the step 9379, if the word next to the comma is a word belonging to the β group, the pointer advancing step 9384 is executed if the word next to the β group is not a pronoun. If it is a pronoun, it is examined as to if the word next thereto is an interrogation mark (9381) or not and enters into the pointer advancing step 9384 if it is not the interrogation mark. If it is the interrogation mark, the goal of the innermost layer block is rewritten into "affirmative sentence", while the role into "tag question mark" (9382), and ", . . . ?" is deleted from the word information table (9383). Then, the pointer is advanced stepwise (9384), and the procedures are repeated till the end of the sentence.

For instance, FIG. 88 shows the information for the blocks and the words obtained from the morphological analysis section 9016 to the tag question processing section 9210 for the English sentence I said, "It is good, isn't it?" described above. The block information for the block 1 is (start:4, end:12, goal:optional, role:optional). If it is subjected to tag question processing in the tag question processing section 9210, the block information for the block 1 is rewritten into (start:4, end:12, goal:affirmative sentence, role:tag question sentence) and, at the same time, the word information concerning the tag question #8–#11 is deleted.

What is claimed as new and desired to be secured by Letters Patent of the United States is:

1. A language analyzer for morphemically and syntactically analyzing natural languages used in an automatic translator, comprising:
   memory means for containing therein morpheme data of a predetermined languages and additional data representing information to be referred to in order that a plurality of morphemes are combined with each other;
   first analysis means for morphemically analyzing an inputted character array representing sentences of said language by referring to said morpheme data to break said inputted character array into morphemes and to define respective aspects of said morphemes, having
      means for distinguishing a part of said inputted character array defining a composite morpheme or a block composed of a plurality of morphemes from the other parts of said inputted character array by referring to said additional data and said morpheme data;
      means for treating each of said composite morpheme and said block as a single unit and such that they are regarded as a single morpheme, at the time of syntax analysis, for an inputted character array and for outputting identification as to said one unit;
      exclusion means for creating an excluded block containing composite morpheme data or a block which was part of said input string, in response to output from said distinguishing means; and
   second analysis means for syntactically analyzing said inputted character array by applying syntactic rules to an analysis result of said first analysis means to describe structures of said sentences, having
      means for analyzing said part of character array defining the block in preference to analysis for other parts of character array being outside of said excluded block, and
      means for analyzing said inputted character array after analyzing said part of character array by regarding said excluded block as a single morpheme without applying said syntax rules to a relation between a morpheme outside of said excluded block and a morpheme in said excluded block to reduce the number of improper solutions of syntax analysis.

2. A language analyzer according to claim 1, wherein said memory means contains therein distinguishing indications each of which indicates that a memory reference unit with one of said distinguishing indications is a memory reference unit representing a numerical value.

3. A language analyzer according to claim 2, wherein said language analyze further comprises calculating means for calculating a numerical value, for two or more successive memory reference units with one of said distinguishing indications by referring to said memory means.

4. A language analyzer according to claim 3, wherein when two successive memory reference units each having said distinguishing indication are adjoined by a memory reference unit representing a currency symbol or a dimensional unit, said first analysis means seizes a combination of said calculated numerical value and said memory reference unit representing a currency symbol or a dimensional unit as one composite morpheme.

5. A language analyzer according to claim 1, wherein said first analysis means has semantic nature information providing means for providing a noun phrase which comprises a proper noun with semantic nature information, and means for distinguishing said noun phrase as one composite morpheme.

6. A language analyzer according to claim 5, wherein said providing means provides a noun phrase which comprises a proper noun with the same semantic information as that of a noun adjacent to said proper noun.

7. A language analyzer according to claim 6, wherein said first analysis means has a table for storing said predetermined syntactic patterns, and verifies an inputted character array, with said table in order to distinguish two or more successive memory reference units forming one of said predetermined syntactic patterns from other parts of said inputted character array.

8. A language analyzer according to claim 1, when two or more successive memory reference units in an inputted character array forms one of predetermined syntactic patterns, said first analysis means distinguishes a part of character array corresponding to said successive memory reference units as one composite morpheme having a specific semantic information in accordance with said one of predetermined syntactic patterns.

9. A language analyzer according to claim 1, wherein said first analysis means estimates a grammatical nature and a semantic nature of a derivative in an inputted character array which is not contained in said memory means by an affix of said derivative.

10. A language analyzer according to claim 1, wherein said first analysis means includes means for judging whether the block exists in an inputted character array or not from morpheme contained within said inputted character array and
means for estimating a syntactic attribute and a role of the block according to said morphological aspect when said judging means judges that said block exists in said inputted character array, and said second analysis means analyzes said block first in preference to portions of said inputted character array other than said block.

11. A language analyzer according to claim 10, wherein said predetermined language is English, and said first analysis means distinguishes an appositional expression as a block in view of a morphological aspect of an inputted character array.

12. A language analyzer according to claim 11, wherein said first analysis means distinguishes a portion of an inputted character array which begins with a conjunction which is preceded by a comma and ends with a next period as a block, estimates a syntactic attribute of said block at a clause and estimates a syntactic role of said block at a sentence or a clause.

13. A language analyzer according to claim 11, wherein said first analysis means distinguishes a portion of an inputted character array which begins with a relative which is preceded by a comma and ends with another comma as a block, estimates a syntactic attribute of said block at a clause and estimates a syntactic role of said block at an adverb or an adjective.

14. A language analyzer according to claim 11, wherein said first analysis means distinguishes a portion of an inputted character array which is put between a pair of quotation marks and ends with a period of a block, estimates a syntactic attribute of said block at a clause.

15. A language analyzer according to claim 11, wherein said first analysis means distinguishes a portion of an inputted character array which begins with a proper noun which is followed by a comma and a noun after said comma and ends with a next period or a comma as a block for an appositional expression, estimates a syntactic attribute of said block at a noun phrase and estimates a syntactic role of said block at a noun and an appositional noun.

16. A language analyzer according to claim 11, wherein said first analysis means distinguishes a portion of an inputted character array which begins with a proper noun which is followed by a comma and a succeeded article and ends with a next period or a comma as a block for an appositional expression, estimates a syntactic attribute of said block at a noun phrase and estimates a syntactic role of said block at a noun and an appositional noun.

17. A language analyzer according to claim 11, wherein said first analysis means distinguishes a portion of an inputted character array which is a sequence of capital heading words and ends with a word which is followed by a next word whose head is not a capital as a block for an appositional expression, estimates a syntactic attribute or said block at a noun phrase and estimates a syntactic role of said block at a proper noun.

18. A language analyzer according to claim 11, wherein said first analysis means distinguishes a portion of an inputted character array which begins with a word let's and ends with a next comma and a portion of an inputted character array which begins with words let us which is preceded by a comma and ends with a next period of a comma as blocks, estimates syntactic attributes of said blocks at imperatives and estimates syntactic roles of said blocks at invitations.

19. A language analyzer according to claim 18, wherein said second analysis means parses and inputted character array except a portion thereof distinguished as a block whose syntactic attribute and role are estimated at an imperative and an invitation respectively by said first parsing means.

20. A language analyzer according to claim 10, wherein said first parsing means distinguishes a portion of an inputted character array comprising two or more words coupled by a hyphen as a block at an adjective phrase.

21. A language analyzer according to claim 86, wherein said second analysis means analyzes an inputted character array, except a portion thereof distinguished as a block whose syntactic attribute and role are estimated at an affirmative or a negative sentence and a tag question respectively by said first analysis means.

22. A language analyzer according to claim 10, wherein said predetermined language is English, and said first analysis means distinguishes a portion of an inputted character array which begins with an auxiliary verb or a be verb preceded by a comma and followed by a pronoun and ends with an interrogation mark preceded by said pronoun or begins with a negative form of auxiliary verb or a be verb preceded by a comma and followed by a pronoun and ends with an interrogation mark preceded by said pronoun as a block in view of a morphological aspect of an inputted character array, estimates a syntactic attribute of said block at an affirmative or a negative sentence and estimates a syntactic role of said block at a tag question.

* * * * *

UNITED STATES PATENT AND TRADEMARK OFFICE
CERTIFICATE OF CORRECTION

PATENT NO. : 5,225,981
DATED : July 6, 1993
INVENTOR(S) : Toshihiko Yokogawa

It is certified that error appears in the above-indentified patent and that said Letters Patent is hereby corrected as shown below:

On the title page, Item [22],

The filing date is incorrect, should read: --June 14, 1991--

Column 74, line 42, (claim 21) change "claim 86" to --claim 20--.

Signed and Sealed this

Twentieth Day of September, 1994

Attest:

BRUCE LEHMAN

*Attesting Officer*     *Commissioner of Patents and Trademarks*